US008917767B2

(12) United States Patent
Miyazaki et al.

(10) Patent No.: US 8,917,767 B2
(45) Date of Patent: Dec. 23, 2014

(54) IMAGE DISPLAY APPARATUS, VIDEO SIGNAL PROCESSOR, AND VIDEO SIGNAL PROCESSING METHOD

(75) Inventors: Shinichiro Miyazaki, Kanagawa (JP); Ichiro Murakami, Tokyo (JP); Toru Nishi, Kanagawa (JP)

(73) Assignee: Sony Corporation (JP)

( * ) Notice: Subject to any disclaimer, the term of this patent is extended or adjusted under 35 U.S.C. 154(b) by 236 days.

(21) Appl. No.: 12/226,515

(22) PCT Filed: Feb. 20, 2008

(86) PCT No.: PCT/JP2008/052901
§ 371 (c)(1),
(2), (4) Date: Sep. 29, 2009

(87) PCT Pub. No.: WO2008/102826
PCT Pub. Date: Aug. 28, 2008

(65) Prior Publication Data
US 2010/0034272 A1 Feb. 11, 2010

(30) Foreign Application Priority Data
Feb. 20, 2007 (JP) .............................. P2007-039559

(51) Int. Cl.
*H04N 7/12* (2006.01)
*H04N 5/14* (2006.01)
*G09G 3/34* (2006.01)
*G09G 3/36* (2006.01)
*H04N 7/01* (2006.01)

(52) U.S. Cl.
CPC ............ *H04N 7/0132* (2013.01); *H04N 5/145* (2013.01); *G09G 2310/061* (2013.01); *G09G 2320/0626* (2013.01); *G09G 2360/144* (2013.01); *G09G 2310/024* (2013.01); *G09G 2320/062* (2013.01); *G09G 3/3406* (2013.01); *G09G 2320/0261* (2013.01); *G09G 2320/0606* (2013.01); *H04N 7/012* (2013.01); *G09G 3/3648* (2013.01); *G09G 2320/106* (2013.01); *H04N 7/0112* (2013.01); *G09G 2360/16* (2013.01); *G09G 2340/0435* (2013.01)
USPC ............ 375/240.16; 375/240.12; 375/240.14

(58) Field of Classification Search
CPC ... H04N 7/014; H04N 7/0112; H04N 7/0127; H04N 7/0142; H04N 19/00127; H04N 19/0066; H04N 19/00721; H04N 19/00733; H04N 19/00745; H04N 19/00751; H04N 5/145; H04N 7/0115; H04N 7/012; H04N 7/01
USPC ..................................................... 375/240.16
See application file for complete search history.

(56) References Cited

U.S. PATENT DOCUMENTS 5,929,919 A * 7/1999 De Haan et al. ............... 348/452
7,586,540 B2 * 9/2009 Ogino et al. .................. 348/448
(Continued)

FOREIGN PATENT DOCUMENTS

EP        0909092 A2    4/1999
JP        T08-508138    8/1996
(Continued)

OTHER PUBLICATIONS

Supplementary European Search Report EP08711690, dated Nov. 4, 2010.
(Continued)

*Primary Examiner* — Jessica M Prince
(74) *Attorney, Agent, or Firm* — Lerner, David, Littenberg, Krumholz & Mentlik, LLP

(57) ABSTRACT

The present invention provides an image display apparatus capable of reducing a judder and simultaneously weakening the degree of reducing the judder at the time of converting frame rate of a film signal using motion compensation. At the time of converting frame rate of a video signal by adding N (N: integer of 2 or larger) interpolation frames into between original frames neighboring each other along time base obtained from video images in original frames by using motion compensation so that interpolation positions of the video images in the N interpolation frames are set to a deviated position which is closer to the nearest video image in the original frames rather than positions obtained by equally dividing, into (N+1) portions, magnitude of video image motion between an earlier original frame and a following original frame along the time base.

7 Claims, 48 Drawing Sheets

(56) References Cited

U.S. PATENT DOCUMENTS

| | | |
|---|---|---|
| 2002/0003522 A1 | 1/2002 | Baba et al. |
| 2004/0246242 A1 | 12/2004 | Sasaki |
| 2005/0030272 A1 | 2/2005 | Hosaka |
| 2005/0157792 A1* | 7/2005 | Baba et al. ............... 375/240.16 |
| 2005/0232356 A1 | 10/2005 | Gomi et al. |
| 2005/0275642 A1 | 12/2005 | Aufranc et al. |
| 2006/0146005 A1 | 7/2006 | Baba et al. |
| 2007/0070221 A1 | 3/2007 | Nishi et al. |
| 2007/0140346 A1* | 6/2007 | Chen et al. ............... 375/240.16 |
| 2008/0007614 A1* | 1/2008 | Mizuhashi et al. ........ 348/14.01 |
| 2009/0129688 A1* | 5/2009 | Baba et al. .................... 382/236 |

FOREIGN PATENT DOCUMENTS

| | | |
|---|---|---|
| JP | 08-511406 T | 11/1996 |
| JP | T11-513541 | 11/1999 |
| JP | 2002-158941 A | 5/2002 |
| JP | 2003-036056 A | 2/2003 |
| JP | 2003-244659 A | 8/2003 |
| JP | 2005-049819 A | 2/2005 |
| JP | 2005-160015 A | 6/2005 |
| JP | 2005148521 A | 6/2005 |
| JP | 2006-081150 A | 3/2006 |
| JP | 2007-293039 A | 11/2007 |
| KR | 10-0391192 | 11/2003 |
| WO | WO-2007/136099 A1 | 11/2007 |

OTHER PUBLICATIONS

Office Action from Japanese Application No. 2009-500223, dated Mar. 14, 2013.

Office Action from Japanese Application No. 2009-500222, dated Dec. 6, 2012.

Office Action from Korean Application No. 10-2008-7025266, dated Jan. 28, 2014.

Office Action from Japanese Application No. 2009-500224, dated May 22, 2012.

Office Action from Korean Application No. 10-2008-7024843, dated Aug. 29, 2014.

* cited by examiner

EXAMPLE OF VIDEO SIGNAL PROCESSOR
TO WHICH PRESENT INVENTION IS APPLIED

PRINCIPLE OF ADDRESS CALCULATIN IN INTERPOLATOR

| Out_phase | 0 | 1 | 2 | 3 | 4 |
|---|---|---|---|---|---|
| 2:2 PULLDOWN | Relpos_22_0 [5:0] | Relpos_22_1 [5:0] | Relpos_22_2 [5:0] | Relpos_22_3 [5:0] | |
| 3:2 PULLDOWN | Relpos_32_0 [5:0] | Relpos_32_1 [5:0] | Relpos_32_2 [5:0] | Relpos_32_3 [5:0] | Relpos_32_4 [5:0] |

PARAMETERS OF INTERPOLATION POSITION OF EACH FRAME

| 3:2 PULLDOWN | Relpos_32_0 [5:0] | Relpos_32_1 [5:0] | Relpos_32_2 [5:0] | Relpos_32_3 [5:0] | Relpos_32_4 [5:0] |
|---|---|---|---|---|---|
| STRONG | 0. | 0.2. | 0.4. | 0.6. | 0.8. |
| INTERMEDIATE | 0. | 0.15. | 0.3. | 0.7 | 0.85. |
| WEAK | 0. | 0.1. | 0.2. | 0.8 | 0.9. |

EXAMPLE OF PARAMETERS OF INTERPOLATION POSITION
IN THE CASE OF 3:2 PULLDOWN FILM SIGNAL

FIG. 8

| 2:2 PULLDOWN | Relpos_22_0 [5:0] | Relpos_22_1 [5:0] | Relpos_22_2 [5:0] | Relpos_22_3 [5:0] |
|---|---|---|---|---|
| STRONG | 0. | 0.25. | 0.5. | 0.75. |
| INTERMEDIATE | 0. | 0.15. | 0.3. | 0.85 |
| WEAK | 0. | 0.1. | 0.2. | 0.9 |

EXAMPLE OF PARAMETERS OF INTERPOLATION POSITION
IN THE CASE OF 2:2 PULLDOWN FILM SIGNAL

FIG. 9

EXAMPLE OF VIDEO SIGNAL PROCESSOR TO WHICH PRESENT INVENTION IS APPLIED

| SIGNAL | CHANGE IN VALUE | | | |
|---|---|---|---|---|
| MC ON/OFF (PRESENCE/ABSENCE OF DETECTION OF MOTION VECTOR) | 0⇒1 | 1⇒0 | 0⇒0 | 1⇒1 |
| Reliability(RELIABILITY) | P−Y | P+Y | P+Y | P−Y |

1 VERTICAL PERIOD

1 VERTICAL PERIOD

1 VERTICAL PERIOD

OPERATION AT BLACK INSERTION RATIO 1/6
(A) LCD 
(B) BL 
FIG. 52
OPERATION AT BLACK INSERTION RATIO 3/6
(A) LCD 
(B) BL 
FIG. 53
OPERATION AT BLACK INSERTION RATIO 1/6
(A) LCD 
(B) BL 
FIG. 54
OPERATION AT BLACK INSERTION RATIO 3/6
(A) LCD 
(B) BL 
FIG. 55

IMAGE DISPLAY APPARATUS, VIDEO SIGNAL PROCESSOR, AND VIDEO SIGNAL PROCESSING METHOD

CROSS-RFERENCE TO RELATED APPLICATIONS the present application is a national phase entry under 35 U.S.C. §371 of International Application No. PCT/JP2008/052901 filed Feb. 20, 2008, published in Aug. 28, 2008, which claims priority from Japanese Patent Application No. JP2007-039559 Feb. 20,2007, all of which are incorporated herein by reference.

TECHNICAL FIELD

The present invention relates to a video signal processor and a video signal processing method for converting frame rate of a video signal using motion compensation and to an image display apparatus having such a video signal processor.

BACKGROUND ART

As one of video signal processes for improving picture quality in a television receiver, a DVD player, and the like there is frame rate conversion using motion compensation.

The principle of frame rate conversion will be described using FIGS. 1 to 3 with respect to a video signal captured by a camera for television broadcast (hereinbelow, called a camera signal) and a video signal obtained by telecine converting a film to a television system (hereinbelow, called film signal or cinema signal).

FIG. 1(a) shows original frames A, B, C, and D of a camera signal of an NTSC system. In the case of converting the frame rate of the camera signal to 120 Hz, as shown in FIG. 1(b), an interpolation frame is added at a timing of every ¹⁄₁₂₀ sec between neighboring original frames (between the frames A and B, between the frames B and C, and between the frames C and D).

FIG. 2(a) shows original frames A, B, C, and D of a film signal which is telecine converted (2:2 pulldown) to the PAL system. Each of the original frames is repeated twice. In the case of converting the frame rate of the 2:2 pulldown film signal to 100 Hz, as shown in FIG. 2(b), three interpolation frames are added at ¹⁄₁₀₀ sec intervals between original frames neighboring at 25 Hz cycles (between the frames A and B, between frames B and C, and between frames C and D).

FIG. 3(a) shows original frames A, B, and C of a film signal which is telecine converted (3:2 pulldown) to the NTSC system. The odd-numbered original frames A and C are repeated three times, and the even-numbered original frame B is repeated twice. In the case of converting the frame rate of the 3:2 pulldown film signal to 120 Hz, as shown in FIG. 3(b), four interpolation frames are added at ¹⁄₁₂₀ sec intervals between original frames neighboring at 24 Hz cycles (between the frames A and B and between the frames B and C).

Each of the interpolation frames is generated by interpolating video images of earlier and following original frames. The interpolation is performed by a method of calculating addresses of pixels of the front and rear original frames used for calculating pixel values of an interpolation frame on the basis of parameters of an interpolation position of a video image in each interpolation frame and motion vectors between the front and rear original frames, and then placing weights to the pixel values of the addresses in accordance with interpolation positions.

The frame rate conversion produces an effect of eliminating a motion blur in a camera signal and an effect of reducing a judder (unsmoothness of motion in a video image) in a film signal.

FIGS. 1 to 3 also show interpolation positions of video images in the interpolation frames in the conventional frame rate conversion. As shown in FIG. 1(b), the interpolation position of a video image in the interpolation frames, at the time of converting the frame rate of the NTSC camera signal to 120 Hz, is conventionally set to a position obtained by equally dividing the magnitude of the motion of a video image between front and rear original frames (the size determined by motion vector detection) to two portions, that is, a position of 50% of the magnitude of the motion.

As shown in FIG. 2(b), the interpolation positions of video images in three interpolation frames at the time of converting the frame rate of the 2:2 pulldown film signal to 100 Hz are conventionally set to positions obtained by equally dividing the magnitude of the motion of a video image between front and rear original frames to four portions, that is, positions of 25%, 50%, and 75% of the magnitude of the motion.

As shown in FIG. 3(b), the interpolation positions of video images in four interpolation frames at the time of converting the frame rate of the 3:2 pulldown film signal to 120 Hz are conventionally set to positions obtained by equally dividing the magnitude of the motion of a video image between front and rear original frames to five portions, that is, positions of 20%, 40%, 60%, and 80% of the magnitude of the motion.

FIG. 4 is a diagram showing examples of video images of the 3:2 pulldown film signal subjected to the frame rate conversion in the interpolation positions in related art. The video image of an airplane moves between neighboring original frames A and B. In four interpolation frames, video images of the airplane are interpolated in positions equally dividing the magnitude of the motion into five portions.

In addition, for example, a technique related to such frame rate conversion is proposed in Patent document 1.

Patent document 1: Japanese Unexamined Patent Application Publication No. 2003-189257

DISCLOSURE OF INVENTION

As described above, in the frame rate conversion using motion compensation, conventionally, interpolation positions of a video image in interpolation frames are set to positions obtained by equally dividing the magnitude of a motion of the video image between front and rear original frames.

However, in the case of a film signal, when interpolation is performed in the interpolation positions obtained by equally dividing the magnitude of the motion of the video image between original frames as exemplified in FIG. 4, a judder is largely reduced, and the motion of the video image becomes very smooth. As a result, a person accustomed to a judder in a film signal gets an impression that the taste of the film signal is lost.

Further, in the frame rate conversion using motion compensation, in the case where the motion of a video image between neighboring original frames becomes very fast, the motion vector lies out of a motion vector search range (block matching range), and a large judder occurs. In such a case, there is a problem that since a large judder suddenly occurs while the user is watching a video image in which motion is very smooth, the user feels discomfort.

In addition, hitherto, to make motion of a video image at the time of converting the frame rate of a film signal (cinema signal) smoother, a technique of shifting a pixel position of a field after the frame conversion in the direction of a motion vector has been proposed (refer to Patent Document 1). However, a technique of weakening the degree of reduction of a judder while reducing the judder at the time of converting the frame rate of a film signal is not proposed.

By the way, in the case of performing a video signal process for improving the picture quality such as the frame rate conversion by using a motion vector, when the motion vector lies out of the motion vector search range (block matching range) as above, the motion vector may not be able to be detected well. In such a case, if the motion vector is used as it is, the video signal process may not be performed well. Thus, another issue arises such that picture quality degrades.

Further, in the case of displaying the video signal subjected to the video signal process on a fixed pixel (hold) type display apparatus such as a liquid crystal display, another issue occurs such that a so-called hold blur occurs due to its configuration. It is demanded to reduce the hold blur as much as possible. Since viewability of such a hold blur varies according to circumstances, an improvement method according to circumstances is desired.

The present invention has been achieved in view of such issues, and its first object is to provide an image display apparatus, a video signal processor, and a video signal processing method capable of weakening the degree of reduction of a judder while reducing the judder at the time of converting frame rate of a film signal (cinema signal) using motion compensation.

A second object of the present invention is to provide an image display apparatus, a video signal processor, and a video signal processing method capable of suppressing deterioration in picture quality due to detection precision of a motion vector at the time of performing a predetermined video signal process for improving picture quality.

Further, a third object of the present invention is to provide an image display apparatus capable of reducing a hold blur in accordance with circumstances.

An image display apparatus of the present invention includes: interpolation position setting means for converting frame rate of a video signal by adding N (N: integer of 2 or larger) interpolation frames into between original frames neighboring each other along time base, the N interpolation frames being obtained from video images in original frames by using motion compensation, so that interpolation positions of the video images in the N interpolation frames are set to a deviated position which is closer to the nearest video image in the original frames rather than equalized positions obtained by equally dividing, into (N+1) portions, magnitude of video image motion between an earlier original frame and a following original frame along the time base; and display means for displaying a video image on the basis of video signals in the original frames and video signals in the interpolation frames in which the interpolation positions of the video images are set by the interpolation position setting means.

A video signal processor of the present invention includes interpolation position setting means for converting frame rate of a video signal by adding N (N: integer of 2 or larger) interpolation frames into between original frames neighboring each other along time base, the N interpolation frames being obtained from video images in original frames by using motion compensation, so that interpolation positions of the video images in the N interpolation frames are set to a deviated position which is closer to the nearest video image in the original frames rather than equalized positions obtained by equally dividing, into (N+1) portions, magnitude of video image motion between an earlier original frame and a following original frame along the time base.

In a video signal processing method of the present invention, at the time of converting frame rate of a video signal by adding N (N: integer of 2 or larger) interpolation frames into between original frames neighboring each other along time base, the N interpolation frames being obtained from video images in original frames by using motion compensation, interpolation positions of the video images in the N interpolation frames are set to a deviated position which is closer to the nearest video images in the original frames rather than positions obtained by equally dividing, into (N+1) portions, magnitude of video image motion between an earlier original frame and a following original frame along the time base.

In the image display apparatus, the video signal processor, and the video signal processing method of the present invention, in the case of adding N (N: integer of 2 or larger) interpolation frames into between original frames, interpolation positions of the video images in the interpolation frames are set not to positions obtained by equally dividing magnitude of video image motion between an earlier original frame and a following original frame as shown in FIG. 4 as a technique of related art but to deviated position closer to the nearest video image in the original frames rather than the equally divided positions.

As described above, when the interpolation position is set so as to be deviated toward the video image of the original frame closer to the interpolation frame, in an interpolation frame closer to the front original frame in an earlier and a following original frames, the interpolation position is deviated toward the video image of the front original frame. On the other hand, in an interpolation frame closer to the rear original frame, the interpolation position is deviated toward the video image of the rear original frame.

Consequently, the interval between the positions of the interpolated video images in the interpolation frame closer to the front original frame and the interpolation frame closer to the rear original frame is larger as compared with that in the case of related art where the equally divided positions are set as the interpolation positions. Thus, since there are interpolation frames in which the interval between the interpolation positions of the video images is larger than that of the case of related art, unsmoothness of the motion of the video image between the interpolation frames is more conspicuous than that in the case of related art.

According to the image display apparatus, the video signal processor, and the video signal processing method of the present invention, in the case of adding N interpolation frames between the original frames, interpolation positions of the video images in the interpolation frames are set to, not positions obtained by equally dividing magnitude of video image motion between an earlier original frame and a following original frame but, deviated position closer to the nearest video image in the original frames rather than the equally divided positions. Thus, since there are interpolation frames in which the interval between the interpolation positions of the video images is larger than that of the case of the relate art, unsmoothness of the motion of the video image between the interpolation frames is more conspicuous than that in the case of related art. Therefore, when performing the frame rate conversion of the film signal using motion compensation, while reducing a judder by the frame rate conversion, the degree of reduction can be lowered more than the case of related art.

BRIEF DESCRIPTION OF DRAWINGS

FIG. 8 A diagram showing values of the interpolation position parameters in the case of a 3:2 pulldown film signal.

FIG. 9 A diagram showing values of the interpolation position parameters in the case of a 2:2 pulldown film signal.

FIG. 52 A timing chart showing an example of a black insertion ratio in the black inserting process on the frame unit basis.

FIG. 53 A timing chart showing another example of the black insertion ratio in the black inserting process on the frame unit basis.

FIG. 54 A timing chart showing an example of the black insertion ratio in the black inserting process in combination of the black insertion line unit basis and the frame unit basis.

FIG. 55 A timing chart showing another example of the black insertion ratio in the black inserting process in combination of the black insertion line unit basis and the frame unit basis.

BEST MODE(S) FOR CARRYING OUT THE INVENTION

Embodiments of the present invention will be described in detail hereinbelow with reference to the drawings.

[First Embodiment]

Figure 5:
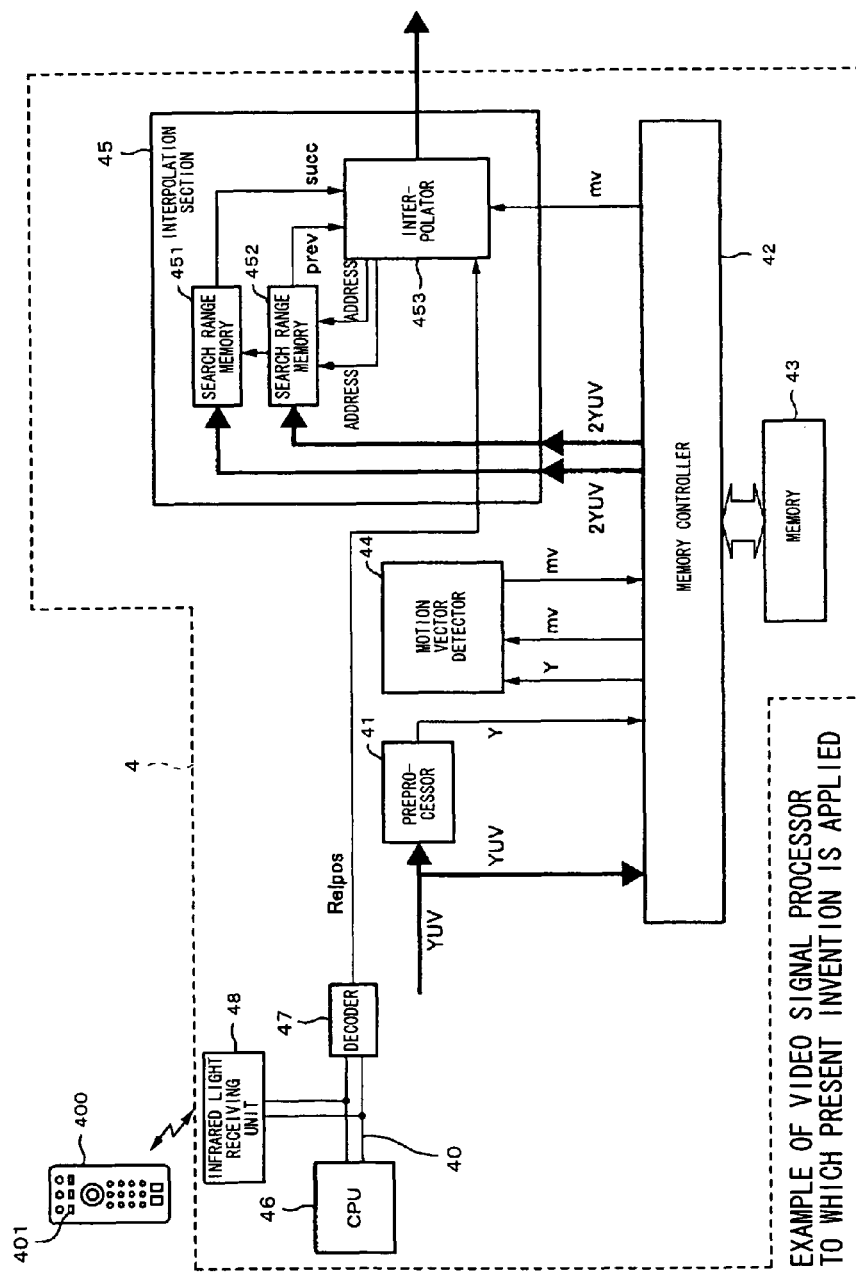
FIG. 5 A block diagram showing an example of a circuit configuration of a video signal processor according to a first embodiment of the invention.

FIG. 5 is a block diagram showing an example of the circuit configuration of a video signal processor (video signal processor 4) according to a first embodiment of the present invention. The video signal processor 4 is built in a television receiver. A digital component signal YUV subjected to processes such as tuning and decoding by a tuner, a decoder, and the like which are not shown is supplied to the video signal processor 4.

The digital component signal YUV supplied to the video signal processor 4 is input to a preprocessor 41 and sequentially written to a memory 43 via a memory controller 42.

The preprocessor 41 performs a process of separating a luminance signal Y from the digital component signal YUV. The luminance signal Y separated by the preprocessor 41 is also sequentially written in the memory 43 via the memory controller 42.

Figure 1:
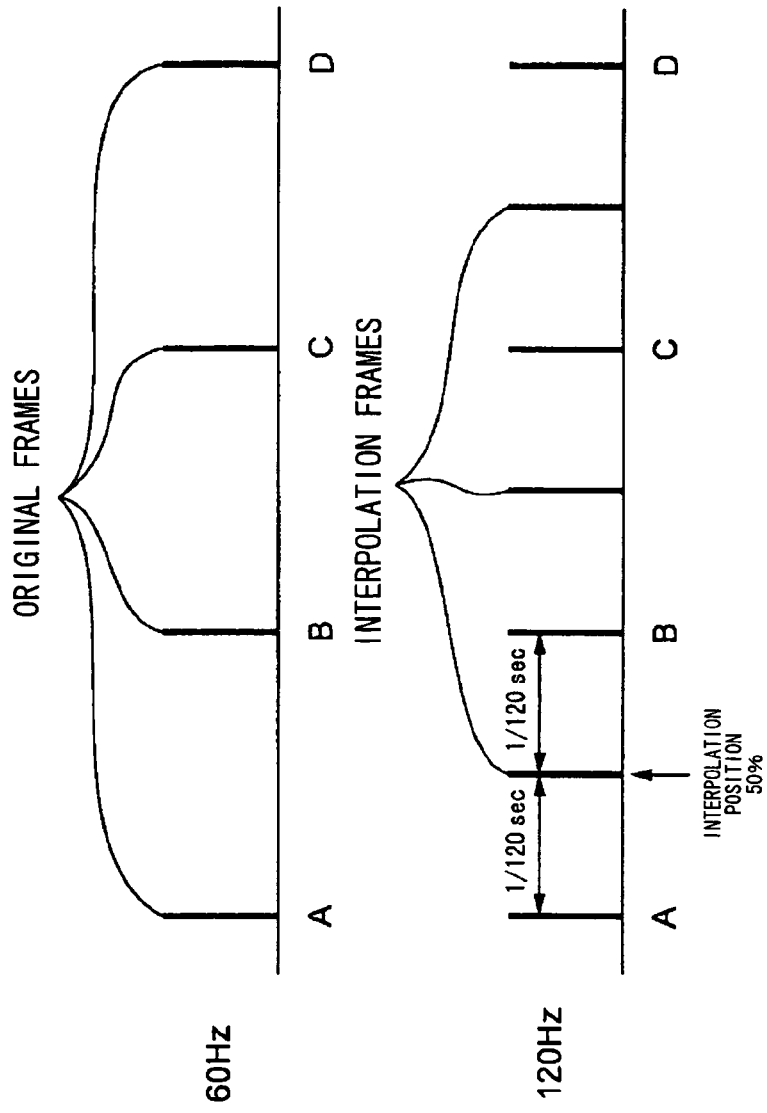
FIG. 1 Diagrams showing the principle of frame rate conversion of a camera signal and interpolation positions in related art.
Figure 2:
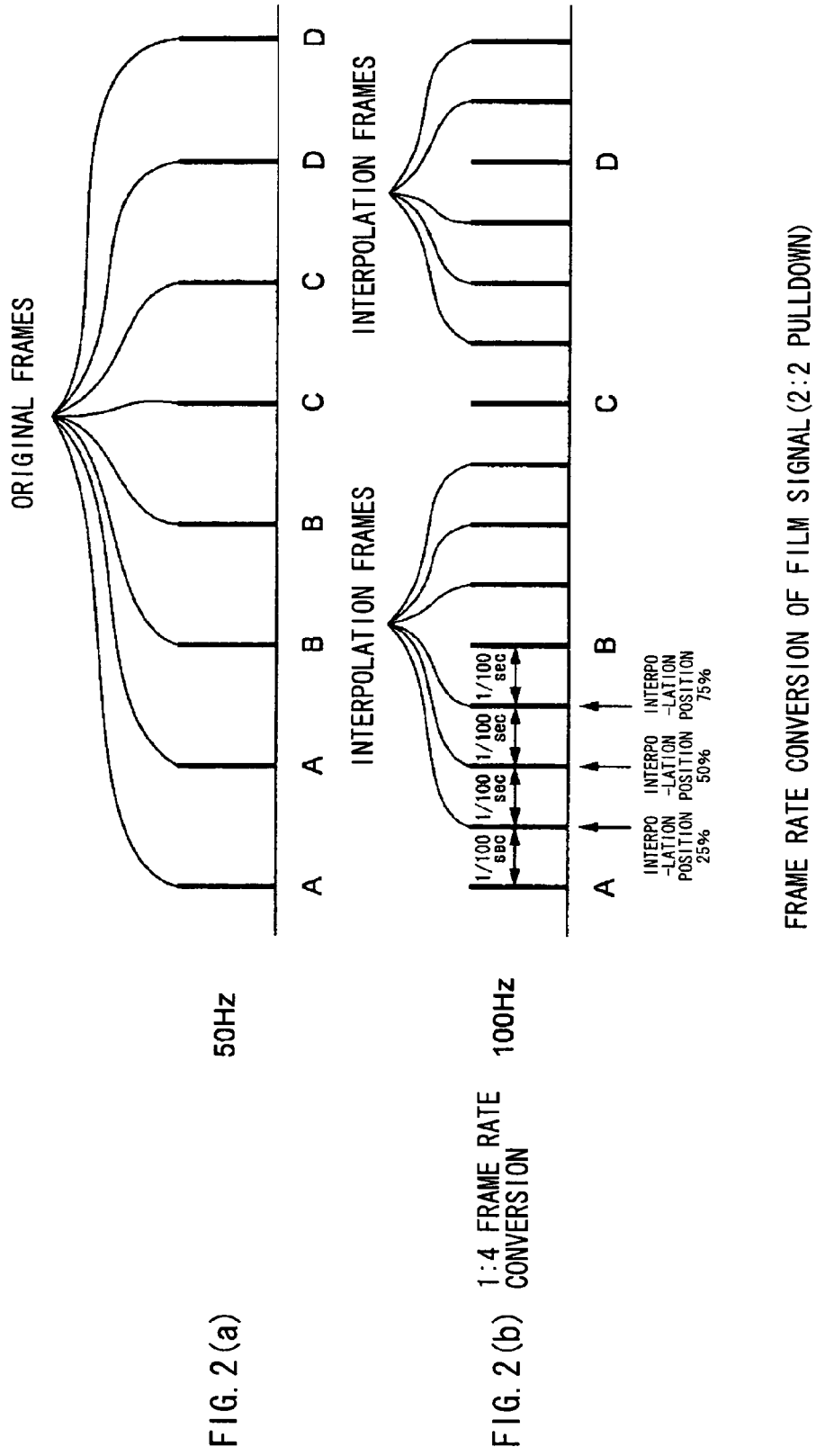
FIG. 2 Diagrams showing the principle of frame rate conversion of a film signal and interpolation positions in related art.
Figure 3:
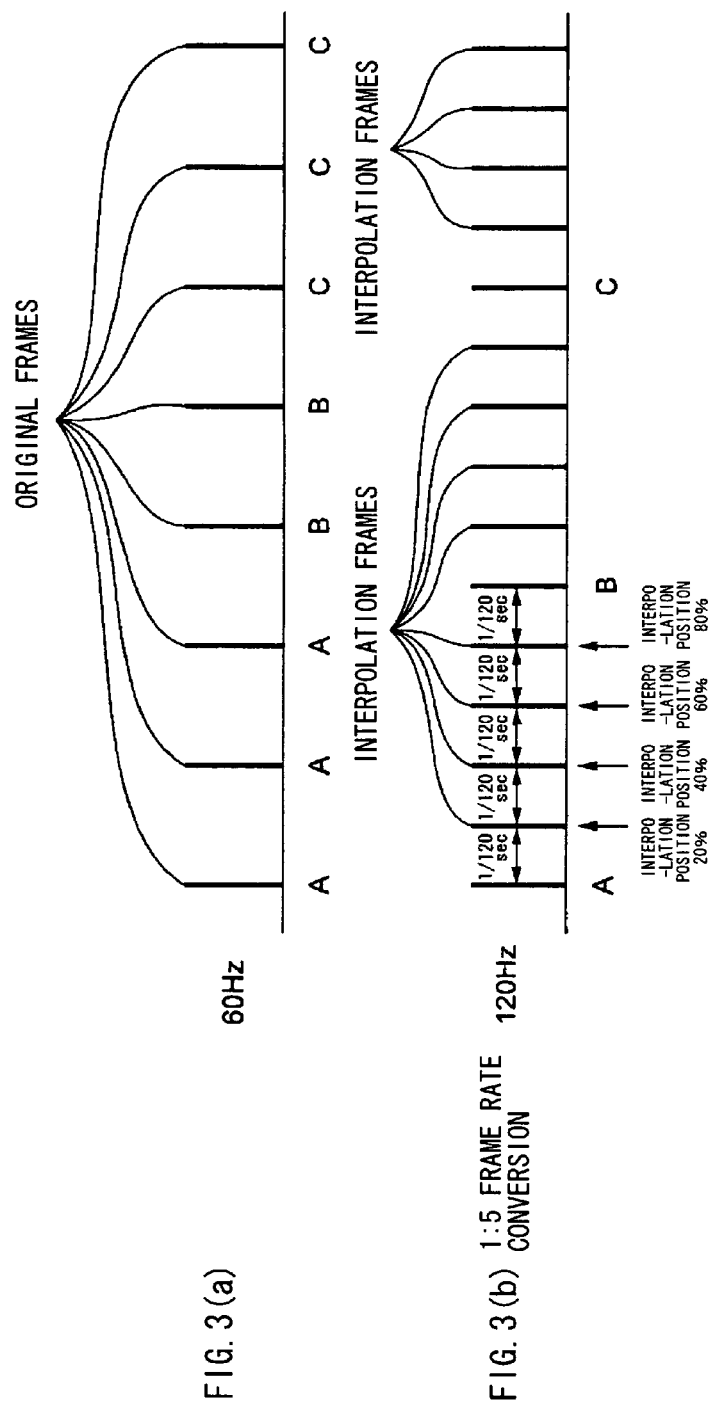
FIG. 3 Diagrams showing the principle of frame rate conversion of a film signal and interpolation positions in related art.

The luminance signal Y written in the memory 43 is sequentially read by the memory controller 42 (as shown in FIGS. 2 and 3, in the case of a film signal in which the same original frame is repeated twice or three times, the same original frame is read only once) and is sent to a motion vector detector 44. The motion vector detector 44 performs a motion vector detecting process by block matching using the luminance signal Y of the present frame and the luminance signals Y of the immediately preceding and subsequent frames.

A motion vector mv of each of the frames detected by the motion vector detector 44 is written in the memory 43 via the memory controller 42. After that, the motion vector mv is read from the memory 43 and sent again to the motion vector detector 44 so as to be referred to in motion vector detection of the following frame.

Further, the memory controller 42 reads the digital component signals YUV written in the memory 43 at double speed, in two series while deviating the signals from each other by one frame (in the case of a film signal in which the same original frame is repeated twice or three times as shown in FIGS. 2 and 3, the same original frame is read only once). Further, the memory controller 42 reads the motion vector mv indicative of motion between the two frames at double speed. The two series of digital component signals 2YUV and the motion vector mv read in such a manner are transmitted to an interpolation section 45.

The interpolation section 45 is provided with two series of search range memories 451 and 452 and an interpolator 453. One of the two series of digital component signals 2YUV from the memory controller 42 is written to the search range memory 451 and the other is written to the search range memory 452. The motion vector mv from the memory controller 42 is input to the interpolator 453.

Further, from a CPU 46 in the television receiver, an interpolation position parameter Relpos indicative of the interpolation position of a video image in an interpolation frame is supplied to the interpolation section 45 via an I²C bus 40 as a serial bus and a decoder 47 for parallel converting the serial signal (the details of the interpolation position parameter Relpos will be described later). The interpolation position parameter Relpos is also input to the interpolator 453.

On the basis of the motion vector mv and the interpolation position parameter Relpos, the interpolator 453 calculates addresses of pixels in original frames in the search range memories 451 and 452 used for calculating pixel values of an interpolation frame.

Figures 6, 7:
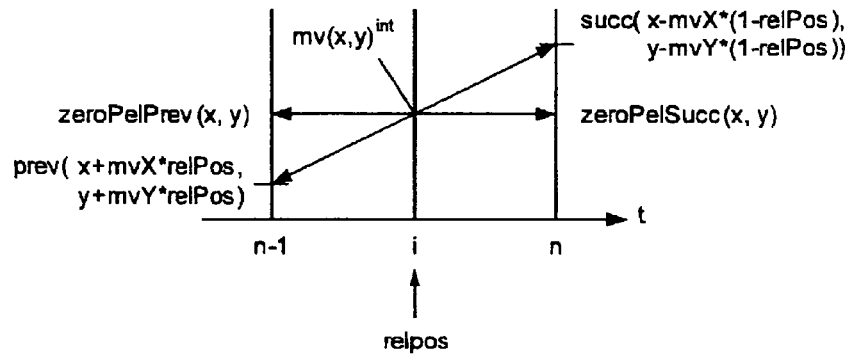
FIG. 6 A diagram showing the principle of address calculation by interpolator.
FIG. 7 A diagram showing interpolation position parameters supplied from a CPU.

FIG. 6 is a diagram conceptually showing the principle of the address calculation. n−1 indicates, in the vertical axis direction, an address (the position in the x direction and the y direction on the screen) of each of pixels of an original frame which comes earlier out of the two original frames deviated by one frame which are written in the search range memories 451 and 452. n indicates, in the vertical axis direction, an address of each of pixels of the later original frame out of the two original frames.

i indicates the address of each of pixels in the interpolation frame in the vertical axis direction. The horizontal axis indicates time and shows timing of the interpolation frame i between the original frames n−1 and n (here, as an example, the timing corresponding to the interpolation frame in the center out of the three interpolation frames in FIG. 2(b)). Relpos indicates an interpolation position parameter supplied for generation of the interpolation frame i.

mv(x,y)int shows the motion vector mv between the original frames n−1 and n with respect to the address (x, y) of a pixel which is being generated at present (called reference pixel) in each of pixels of the interpolation frame i. zeroPelPrev(x,y) indicates the value of a pixel in the reference address (x, y) in the original frame n−1. zeroPelSucc(x, y) indicates the value of a pixel in the reference address (x, y) in the original frame n.

The interpolator 453 obtains the addresses of the pixels in the original frames n−1 and n used for calculating the pixel value of the reference address (x, y) by the following formula (1) on the basis of the reference address (x, y), a component mvX in the x direction of the motion vector mv(x,y)int, a component mvY in the y direction of the motion vector mv(x, y)int, and the interpolation position parameter Relpos.

[Mathematical Formula 1]

Address of pixel in original frame n−1=(x+ mvX·Relpos,y+mvY·Relpos)

Address of pixel in original frame n==(x−mvX·(1− Relpos),y−mvY·(1−Relpos)) (1)

The interpolator 453 sends the addresses obtained as described above to the search range memories 451 and 452 and reads pixel values prev and succ of the addresses. Then using the pixel values prev and succ and the interpolation position parameter Relpos, a pixel value Out of the reference address (x, y) of the interpolation frame i is calculated by the following formula (2).

[Mathematical Formula 2]

Out=prev·(1−Relpos)+succ·Relpos (2)

By executing such calculation sequentially on each of pixels of the interpolation frame i (sequentially updating the value (x, y) of the reference address), the interpolation frame i is generated.

Next, the interpolation position parameter Relpos supplied from the CPU 46 to the interpolation section 45 will be described. FIG. 7 is a diagram showing the interpolation position parameter Relpos supplied from the CPU 46. In the case where a 2:2 pulldown film signal (refer to FIG. 2(a)) is supplied as the digital component signal YUV to the video signal processor 4 of FIG. 5, the CPU 46 supplies parameters of four phases of Relpos_22_0, Relpos_22_1, Relpos_22_2, and Relpos_22_3 every 1/100 sec (that is, at 1/25 sec cycles). Each of the parameters of the phases is made of six bits ([5:0] in the diagram indicates six bits).

Relpos_22_0 is a parameter for outputting the earlier one of the two original frames deviated from each other by one frame in the search range memories 451 and 452 from the interpolator 453. Relpos_22_1 to Relpos_22_3 are parameters for generating three interpolation frames at 1/100 sec intervals as shown in FIG. 2(b) between the two original frames.

In the case where the 2:2 pulldown film signal is supplied, the same original frame is held for 1/25 sec in the search range memories 451 and 452 (FIG. 5). Then, during 1/25 sec, the interpolator 453 calculates an interpolation frame by the formulae (1) and (2) on each of the parameters of each of phases Relpos_22_0, Relpos_22_1, Relpose_22_2, and Relpos_22_3. By repeating the process at 1/25 sec cycles, the 2:2 pulldown film signal is frame-rate-converted.

On the other hand, in the case where a 3:2 pulldown film signal (refer to FIG. 3(a)) is supplied as the digital component signal YUV to the video signal processor 4 of FIG. 5, the CPU 46 supplies interpolation position parameters of five phases Relpos_32_0, Relpos_32_1, Relpos_32_2, Relpos_32_3, and Relpos_32_4 every 1/120 sec (that is, at 1/24 sec cycles).

Relpos_32_0 is a parameter for outputting the earlier one of the two original frames deviated from each other by one frame in the search range memories 451 and 452 from the interpolator 453. Relpos_32_1 to Relpos_32_4 are parameters for generating four interpolation frames at 1/120 sec intervals as shown in FIG. 3(b) between the two original frames.

In the case where the 3:2 pulldown film signal is supplied, the same original frame is held for 1/24 sec in the search range memories 451 and 452. Then, during 1/24 sec, the interpolator 453 calculates an interpolation frame by the formulae (1) and (2) on each of the parameters of each of phases Relpos_32_0, Relpos_32_1, Relpose_32_2, Relpos_32_3, and Relpos_32_4. By repeating the process at 1/24 sec cycles, the 3:2 pulldown film signal is frame-rate-converted.

The value of the interpolation position parameter Relpos is selected by the user. Specifically, as shown in FIG. 5, a remote controller 400 attached to the television receiver is provided with an interpolation position adjustment button 401 for switching and selecting the value of the interpolation position parameter Relpos in three levels of "strong, medium, and weak".

A signal indicative of the selection result by the interpolation position adjustment button 401 is received from the remote controller 400 by an infrared light receiving unit 48 in the television receiver. When the signal is transmitted to the CPU 46 via the I²C bus 40, the CPU 46 sets the value of the interpolation position parameter Relpos according to the selection result.

FIG. 8 is a diagram showing the values of the interpolation position parameters Relpos set by the CPU 46 in accordance with the selection result of the interpolation position adjustment button 401 in the case where the 3:2 pulldown film signal is supplied. In the case where "strong" is selected by the interpolation position adjustment button 401, the values of Relpos_32_0, Relpos_32_1, Relpos_32_2, Relpos_32_3, and Relpos_32_4 are set to 0, 0.2, 0.4, 0.6, and 0.8, respectively.

Since the value of the parameter Relpos_32_0 of the first phase is 0, the earlier one of the two original frames in the search range memories 451 and 452 is output as it is from the interpolator 453 from the formulae (1) and (2).

Further, since the values of the parameters Relpos_32_1, Relpos_32_2, Relpos_32_3, and Relpos_32_4 of the second, third, fourth, and fifth phases change uniformly by 0.2 that is 0.2, 0.4, 0.6 and 0.8, from the formulae (1) and (2), the interpolation positions of video images in the four interpolation frames generated between the two original frames in the search range memories 451 and 452 are the same as the interpolation positions in related art shown in FIG. 3(b). The positions are obtained by uniformly dividing the magnitude of a motion of a video image between the two original frames into five portions, that is, positions of 20%, 40%, 60%, and 80% according to the magnitude of the motion.

In the case where "medium" is selected by the interpolation position adjustment button 401, the values of Relpos_32_0, Relpos_32_1, Relpos_32_2, Relpos_32_3, and Relpos_32_4 are set to 0, 0.15, 0.3, 0.7, and 0.85, respectively. Since the value of the parameter Relpos_32_0 of the first phase is 0, like in the case of "strong", the earlier one of the two original frames in the search range memories 451 and 452 is output as it is from the interpolator 453.

On the other hand, the values 0.15 and 0.3 of the parameters Relpos_32_1 and Relpos_32_2 of the second and third phases (as shown in FIG. 3(b), parameters for generating an interpolation frame closer to the preceding original frame of the four interpolation frames between the neighboring original frames) smaller than the values 0.2 and 0.4 in the case of "strong".

The values 0.7 and 0.85 of the parameters Relpos_32_3 and Relpos_32_4 of the fourth and fifth phases (as shown in FIG. 3(b), parameters for generating an interpolation frame closer to the subsequent one of the four interpolation frames between the neighboring original frames) larger than the values 0.6 and 0.8 in the case of "strong".

By the values of the parameters Relpos_32_1 to Relpos_32_4, in the case of "medium", the interpolation positions of the video image in the four interpolation frames generated between the two original frames in the search range memories 451 and 452 are positions of 15%, 30%, 70%, and 85% with respect to the magnitude of the motion of the video image between the two original frames. That is, the interpolation positions of the video images in the four interpolation frames are not positions (the same interpolation positions as those in related art) obtained by equally dividing the magnitude of the motion of the video image between the two original frames like in the case of "strong" but are positions closer to the video images in the original frames close to the interpolation frames than the equally divided positions.

In the case where "weak" is selected by the interpolation position adjustment button 401, the values of Relpos_32_0, Relpos_32_1, Relpos_32_2, Relpos_32_3, and Relpos_32_4 are set to 0, 0.1, 0.2, 0.8, and 0.9, respectively. The values 0.1 and 0.2 of the parameters of the second and third phases (parameters for generating interpolation frames closer to the front original frame, in the four interpolation frames between the neighboring original frames) are smaller than the values 0.15 and 0.3 in the case of "medium".

Further, the values 0.8 and 0.9 of the parameters of the fourth and fifth phases (parameters for generating interpolation frames closer to the rear original frame, in the four interpolation frames between the neighboring original frames) are larger than the values 0.7 and 0.85 in the case of "medium".

By the values of the parameters Relpos_32_1 to Relpos_32_4, in the case of "weak", the interpolation positions of the video image in the four interpolation frames generated between the two original frames in the search range memories 451 and 452 are positions of 10%, 20%, 80%, and 90% according to the magnitude of the motion of the video image between the two original frames. That is, the interpolation positions of the video images in the four interpolation frames are positions one layer nearer to the video image in the original frame closer to the interpolation frames as compared with the case of "medium".

FIG. 9 is a diagram showing the values of the interpolation position parameters Relpos set by the CPU 46 in accordance with the selection result of the interpolation position adjustment button 401 in the case where the 2:2 pulldown film signal is supplied. In the case where "strong" is selected by the interpolation position adjustment button 401, the values of Relpos_22_0, Relpos_22_1, Relpos_22_2, and Relpos_22_3 are set to 0, 0.25, 0.5, and 0.75, respectively.

Since the value of the parameter Relpos_22_0 of the first phase is 0, the earlier original frame of the two original frames in the search range memories 451 and 452 is output as it is from the interpolator 453.

Further, since the values of the parameters Relpos_22_1, Relpos_22_2, and Relpos_22_3 of the second, third, and fourth phases change uniformly by 0.25 thas is 0.25, 0.5, and 0.75, from the formulae (1) and (2), the interpolation positions of video images in the three interpolation frames generated between the two original frames in the search range memories 451 and 452 are the same as the interpolation positions in related art shown in FIG. 2(b). The positions are obtained by uniformly dividing the magnitude of a motion of a video image between the two original frames into four portions, that is, positions of 25%, 50%, and 75% according to the magnitude of the motion.

In the case where "medium" is selected by the interpolation position adjustment button 401, the values of Relpos_22_0, Relpos_22_1, Relpos_22_2, and Relpos_22_3 are set to 0, 0.15, 0.3, and 0.85, respectively. Since the value of the parameter Relpos_22_0 of the first phase is 0, like in the case of "strong", the earlier one of the two original frames in the search range memories 451 and 452 is output as it is from the interpolator 453.

On the other hand, the value 0.15 of the parameter Relpos_22_1 of the second phase (as shown in FIG. 2(b), this is a parameter for generating an interpolation frame closer to the preceding original frame in the three interpolation frames between the neighboring original frames) is smaller than the value 0.25 in the case of "strong".

Further, as shown in FIG. 2(b), the parameter Relpos_22_2 of the third phase is a parameter for generating an interpolation frame right in the middle of the front original frame and the rear original frame in the three interpolation frames between the neighboring original frames. Here, by classifying the middle interpolation frame as an interpolation frame nearer to the front original frame, the value of the parameter Relpos_22_2 becomes the value 0.3 smaller than the value 0.5 in the case of "strong".

Further, the value 0.85 of the parameter Relpos_22_3 of the fourth phase (as shown in FIG. 2(b), this is a parameter for generating an interpolation frame nearer to the rear original frame in the three interpolation frames between the neighboring original frames) is larger than the value 0.75 in the case of "strong".

By the values of the parameters Relpos_22_1 to Relpos_22_3, in the case of "medium", the interpolation positions of the video image in the three interpolation frames generated between the two original frames in the search range memories 451 and 452 are positions of 15%, 30%, and 85% according to the magnitude of the motion of the video image between the two original frames. That is, the interpolation positions of the video images in the three interpolation frames are not positions (the same interpolation positions as those in related art) obtained by equally dividing the magnitude of the motion of the video image between the two original frames like in the case of "strong" but are positions closer to the video images in the original frame nearer to the interpolation frames than the equally divided positions.

In the case where "weak" is selected by the interpolation position adjustment button 401, the values of Relpos_22_0, Relpos_22_1, Relpos_22_2, and Relpos_22_3 are set to 0, 0.1, 0.2, and 0.9, respectively. The values 0.1 and 0.2 of the parameters of the second and third phases (parameters for generating interpolation frames nearer to the front original frame, in the three interpolation frames between the neighboring original frames) are further smaller than the values 0.15 and 0.3 in the case of "medium".

Further, the value 0.9 of the parameter of the fourth phase (parameter for generating an interpolation frame nearer to the rear original frame, in the three interpolation frames between the neighboring original frames) is larger than the value 0.85 in the case of "medium".

By the values of the parameters Relpos_22_1 to Relpos_22_3, in the case of "weak", the interpolation positions of the video image in the three interpolation frames generated between the two original frames in the search range memories 451 and 452 are positions of 10%, 20%, and 90% according to the magnitude of the motion of the video image between the two original frames. That is, the interpolation positions of the video images in the three interpolation frames are positions nearer to the video image in the original frame closer to the interpolation frames as compared with the case of "medium".

Figure 4:
FIG. 4 A diagram exemplifying video images of the film signal subjected to frame rate conversion in the interpolation positions in related art.
Figure 10:
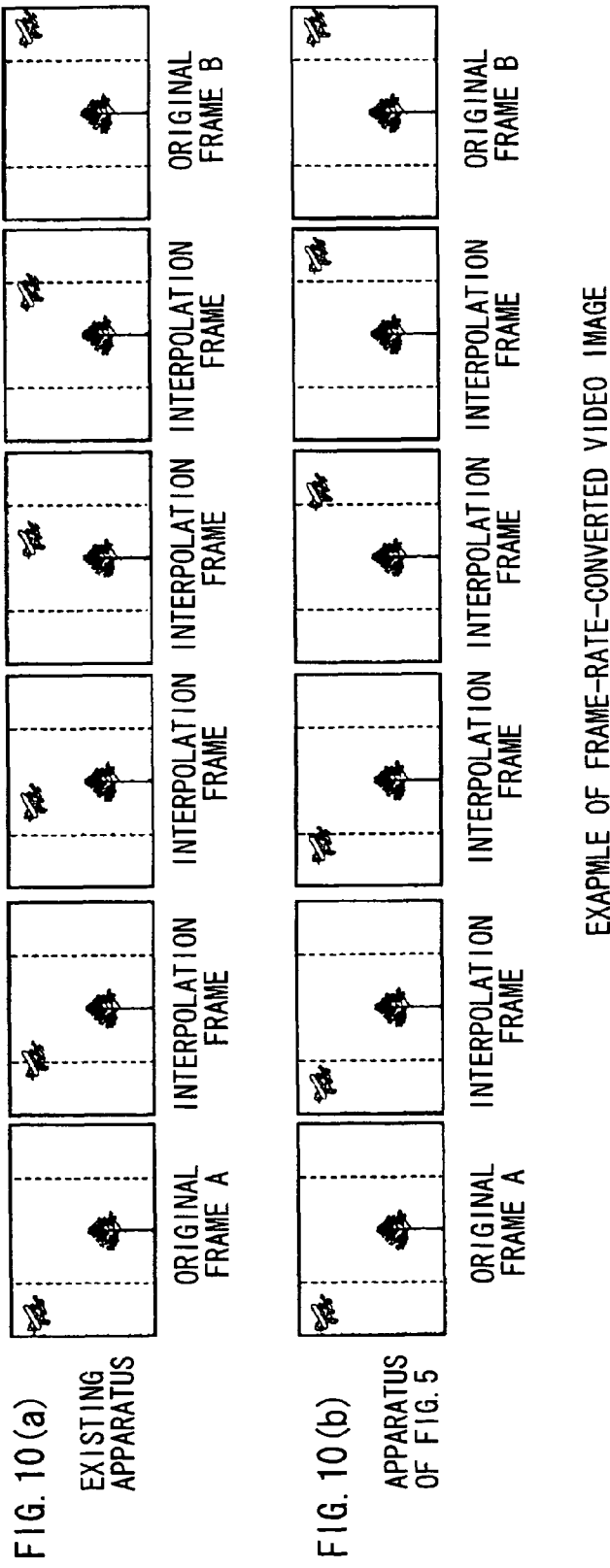
FIG. 10 Diagrams showing video images of film signals subjected to the frame rate conversion using the apparatus of FIG. 5.

FIG. 10 are diagrams showing, using the video images of the same original frame as that of FIG. 4 as an example, video images (FIG. 10(b)) subjected to the frame rate conversion in the case where the 3:2 pulldown film signal is supplied to the video signal processor 4 of FIG. 5 and "weak" is selected by the interpolation position adjustment button 401 in comparison with video images (FIG. 10(*a*)) in interpolation positions in related art.

As shown in FIG. 10(*b*), in two interpolation frames closer to the front original frame A among four interpolation frames, the image of an airplane is positioned nearer to the original frame A as compared with that in the case of related art. On the other hand, in two interpolation frames closer to the rear original frame B, the image of the airplane is positioned nearer to the original frame B as compare with that in the case of related art. Therefore, the interval between the positions of the images of the airplane of the second and third interpolation frames is larger than that of related art.

As described above, in the video signal processor 4, when "weak" or "medium" is selected by the interpolation position adjustment button 401, the interpolation position in an interpolation frame nearer to the front original frame in the front and rear original frames is shifted toward the video image of the front original frame. The interpolation position in an interpolation frame nearer to the rear original frame is shifted toward the video image of the rear original frame.

Consequently, as also shown in FIG. 10, between the interpolation frames nearer to the front original frame and the interpolation frames nearer to the rear original frame, the interval of positions of vide images interpolated is larger than that in the case of related art.

As described above, the interpolation frames whose interpolation positions of the video images are apart from each other more than the case of related art get to exist. Consequently, unsmoothness of the motion of the video image between the interpolation frames is more conspicuous than the case of related art. Therefore, at the time of performing the frame rate conversion of the film signal, while reducing a judder by the frame rate conversion, the degree of reduction is able to be lowered more than the case of related art.

In addition, in the case where the user watches a video image of a film signal by the television receiver, some users prefer the case where the judder is reduced largely to make the motion of the video image smoother, and some users prefer the case where judder remains to some extent because this is more like an image of a film signal. Consequently, a user who prefers smoother motion of a video image selects "strong" with the interpolation position adjustment button 401. A user who prefers an image where judder remains to some extent selects "weak" or "medium" with the interpolation position adjustment button 401. Thus, the degree of reduction of judder can be selected according to the preference of each user.

Further, as described above in "Background Art", in the frame rate conversion using motion compensation, in the case where motion of a video image between neighboring original frames becomes very quick, the motion vector lies out of the motion vector search range, so that a large judder occurs. In such a case as well, by decreasing the degree of reducing a judder by selecting "weak" or "medium" with the interpolation position adjustment button 401, even when a large judder occurs because the user is watching a video image with certain degree of judder, the user feels less strange than the conventional case where a large judder suddenly occurs in a video image in which the motion is very smooth.

In addition, in the frame rate conversion using motion compensation, it is known that, as a side effect, a phenomenon (called Halo) such that noise like shimmer is seen in the contour of a video image of a moving human or the like occurs. The Halo becomes more conspicuous as the position of the video image to be interpolated is apart from the position of the video image in the original frame. On the contrary, when "weak" or "medium" is selected with the interpolation position adjustment button 401, the position of a video image to be interpolated becomes nearer to the video image in the original frame, so that the Halo can also be suppressed.

In addition, in the example of FIG. 5, the remote controller 400 is provided with the interpolation position adjustment button 401 for switching and selecting the value of the interpolation position parameter Relpos in three levels of "strong, medium, and weak". However, as another example, operating means such as a volume switch for selecting the value of the interpolation position parameter Relpos that continuously (steplessly) changes the value within the range of "strong" to "weak" in FIGS. 8 and 9 may be provided for the remote controller 400 or the television receiver body. In this case, to further decrease the minimum change amount of the value of the interpolation position parameter Relpos, the number of bits of the interpolation position parameter Relpos supplied from the CPU 46 may be set to be larger than six bits (for example, about eight bits).

Figure 11:
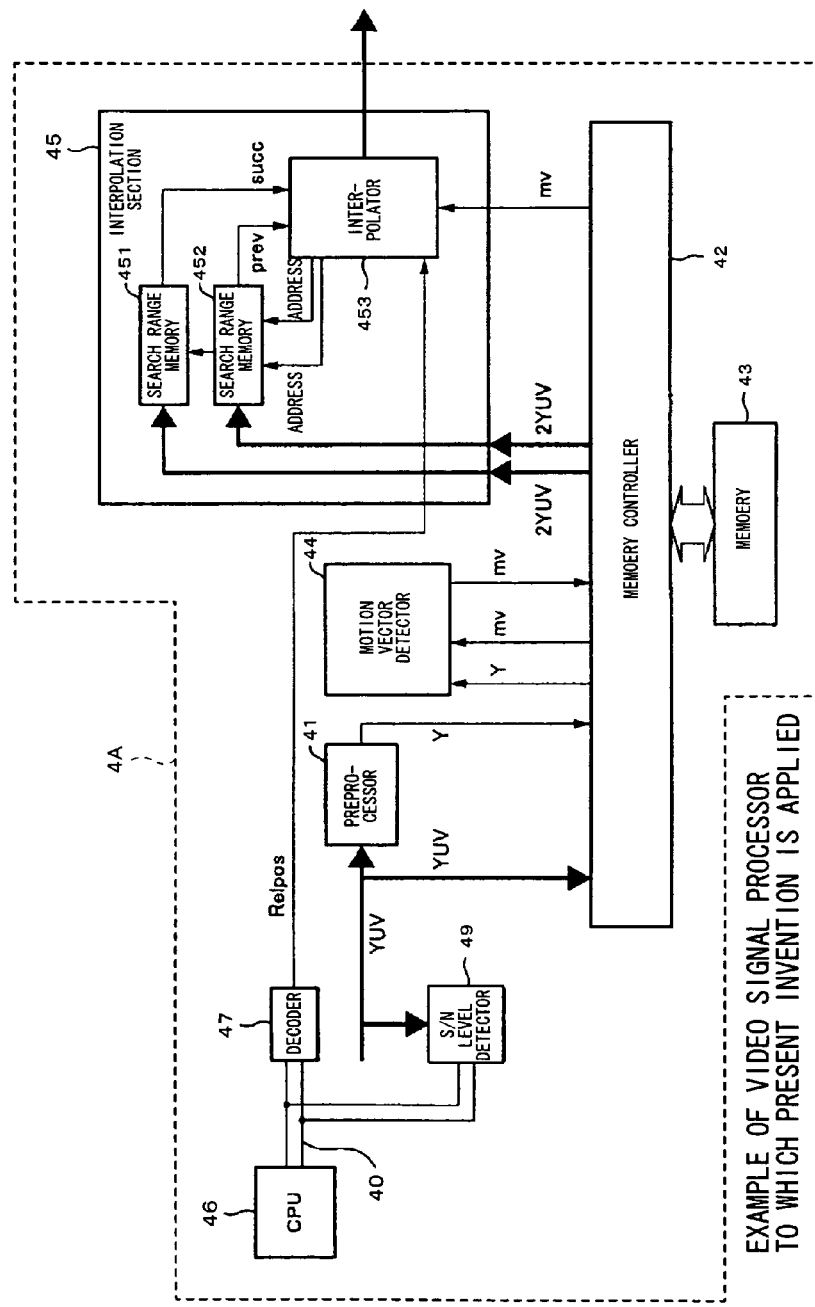
FIG. 11 A block diagram showing an example of the circuit configuration of a video signal processor according to a modified example of the first embodiment.

Next, FIG. 11 is a block diagram showing an example of the circuit configuration of a video signal processor (video signal processor 4A) according to a modified example of the embodiment. The same reference numerals are designated to the same components as those of the video signal processor 4 shown in FIG. 5, and their description will not be repeated.

In the video signal processor 4A, the S/N level of the digital component signal YUV supplied to the video signal processor 4A is detected by an S/N level detector 49. Then, a signal indicative of the detection result is sent to the CPU 46 via the I$^2$C bus 40.

In the frame rate conversion using the motion compensation, as described above, the phenomenon (Halo) occurs such that noise like shimmer appears in the contour of a video image of a moving human or the like. The Halo becomes more conspicuous as an interpolation position of a video image is apart from the position of the video image in the original frame. In addition, the Halo occurs more as the S/N level of a video signal decreases (the noise level increases).

In a memory in the CPU 46, information indicative of an S/N level of a predetermined value which is preset as a border of whether a Halo occurs easily or not is pre-stored. In the case where the detection result of the S/N level detector 49 is higher than the predetermined level, the CPU 46 sets the interpolation position parameter Relpos supplied to the interpolation section 45 to the value of "strong" in FIGS. 8 and 9. On the other hand, when the detection result of the S/N level detector 49 is equal to or less than the predetermined level, the CPU 46 sets the interpolation position parameter Relpos supplied to the interpolation section 45 to the value of "weak" (or "medium") in FIGS. 8 and 9.

Thereby, in the case where the S/N level of the digital component signal YUV to be supplied is high (in the case where Halo does not easily occur), the motion of a video image is able to be made smooth. In the case where the S/N level is low (in the case where Halo easily occurs), by setting the interpolation position of the video image nearer to the video image of the original frame, the Halo is able to be suppressed.

Figure 12:
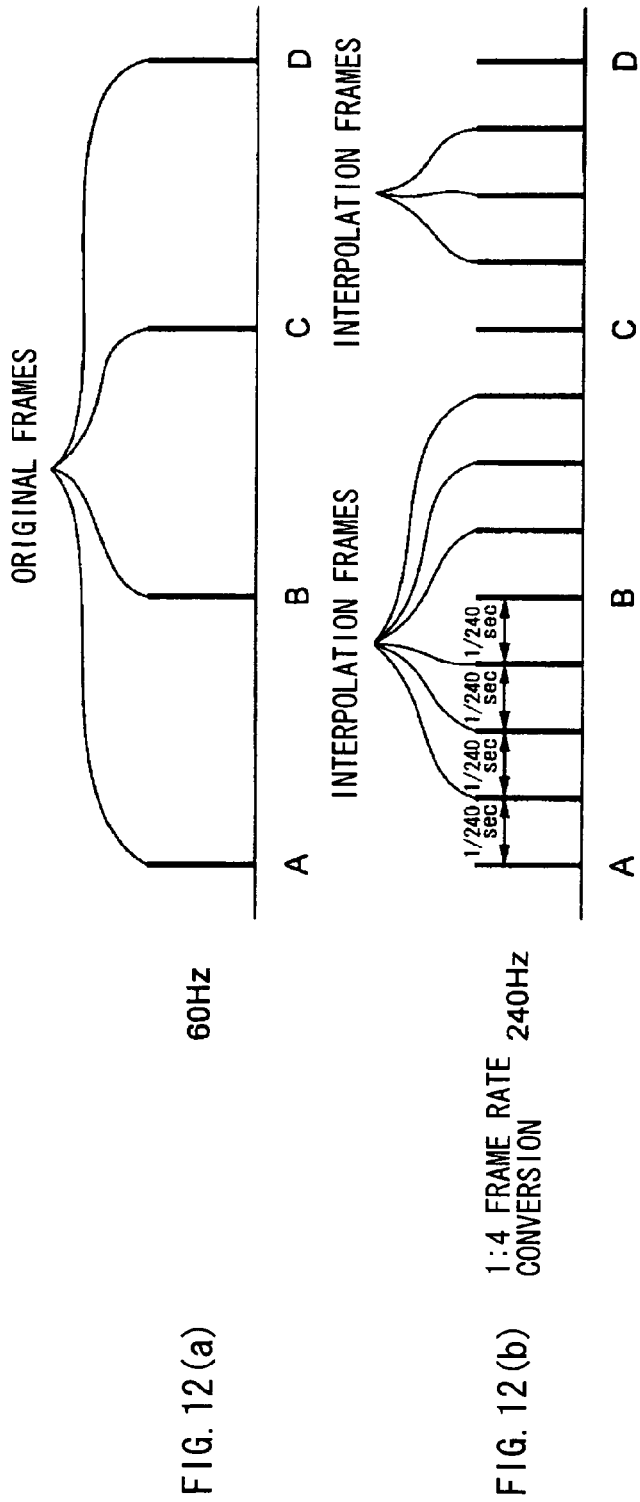
FIG. 12 Diagrams showing frame rate conversion to 240 Hz of a camera signal.

In addition, the case of frame-rate converting the film signal is exemplified in the embodiment. However, for example, also in a camera signal, in the case of converting the frame rate of the camera signal of the NTSC system to 240 Hz as shown in FIG. 12, three interpolation frames are added at $\frac{1}{240}$ sec intervals between neighboring original frames (between the frames A and B, between the frames B and C, and between the frames C and D). Although not shown, in the case of converting the frame rate of a camera signal in the PAL system to 200 Hz, three interpolation frames are added at 1/200 sec intervals between neighboring original frames. The present invention may be applied also to the case of converting a camera signal to a high frame rate as described above.

Further, in the embodiment, the example of setting the value of the interpolation position parameter Relpos by selecting operation of the user and the example of setting value of the interpolation position parameter Relpos in accordance with the S/N level of a video signal have been described. However, as yet another method of setting the value of the interpolation position parameter Relpos, for example, information of genres of television broadcast programs received at present is obtained from an EPG (Electronic Program Guide) and the value of the interpolation position parameter Relpos may be set according to the genre (for example, the value of "strong" in FIGS. 8 and 9 is set in a genre in which motion of a video image is slow, and the value of "weak" or "medium" in FIGS. 8 and 9 is set in a genre in which motion of a video image is fast).

Alternatively, the value of the interpolation position parameter Relpos may be set to the value of "weak" or "medium" in FIGS. 8 and 9 by fact reset.

Further, the values of "weak" and "medium" shown in FIGS. 8 and 9 are just an example. Obviously, another value in which the interpolation position of a video image in each interpolation frame is in a position nearer to the video image of the original frame closer to the interpolation frame may be set.

Furthermore, in the embodiment, the example of applying the present invention to the video signal processor in the television receiver has been described. However, the invention is also applicable to any video signal processor for converting the frame rate of a video signal by using motion compensation such as a video signal processor in a DVD player.

[Second Embodiment]

A second embodiment of the present invention will now be described.

Figure 13:
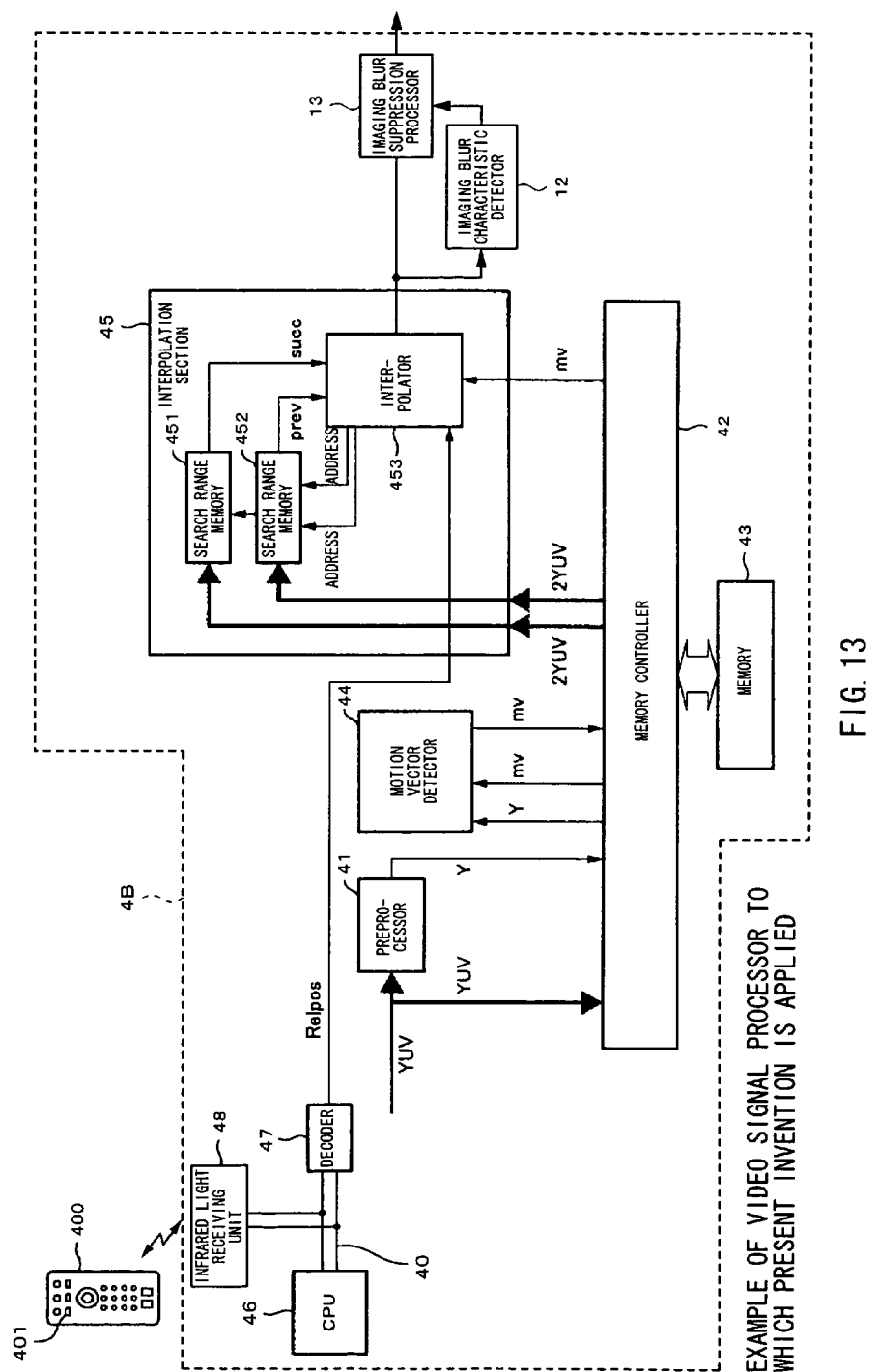
FIG. 13 A block diagram showing an example of the configuration of a video signal processor according to a second embodiment of the present invention.

FIG. 13 shows an example of the configuration of a video signal processor (video signal processor 4B) of the second embodiment. The same reference numerals are designated to the same components as those of the foregoing embodiment, and their description will not be repeated.

The video signal processor 4B executes various image processes on moving image data in an access unit basis. The access unit is a unit of a moving image such as a frame or a field and, concretely, refers to, for example, an entire frame or a part of a frame constituting a moving image. In this case, the frame denotes here a single stationary image. Therefore, the entire frame corresponds to a frame. However, in the following, for simplicity of explanation, it is assumed that the video signal processor 4B executes various image processes on moving image data on the frame unit basis.

As shown in FIG. 13, the video signal processor 4B is obtained by further providing the video signal processor 4A (including the interpolation section 45 (high frame rate converting unit)) described in the first embodiment with an imaging blur characteristic detector 12 and an imaging blur suppression processor 13.

To the interpolation section 45, as described in the first embodiment, for example, a moving image signal such as a television broad signal is input as moving image data in the frame unit.

In addition, in the following, in the case where the moving image and moving image data corresponding to the moving image do not have to be discriminated from each other, they will be simply called a moving image collectively. Similarly, in the case where a frame and frame data corresponding to the frame do not have to be discriminated from each other, they will be simply called a frame.

In the case where a moving image at a first frame rate is input, the interpolation section 45 performs high frame rate converting process on the moving image and supplies a moving image of a second frame rate higher than the first frame rate, obtained as a result of the process, to the imaging blur characteristic detector 12 and the imaging blur suppression processor 13.

The high frame rate converting process is a process executed in the case where the first frame rate at the time of input is lower than the second frame rate at the time of output (display). It is a process of converting the first frame rate to the second frame rate higher than the first frame rate by creating a new frame and inserting it between frames constructing a moving image at the time of input.

In this case, the first frame rate refers to a frame rate of a moving image at the time point when the moving image is input to the interpolation section 45. Therefore, the first frame rate can be an arbitrary frame rate. In this case, for example, it is a frame rate when a moving image is captured by a not-shown imaging apparatus, that is, an imaging frame rate.

Further, in the embodiment, as an example of the high frame rate converter for performing such high frame rate converting process, the interpolation section 45 in the first embodiment will be described (in the case of adding N pieces of interpolation frames between neighboring original frames, as the interpolation positions of the video image in the interpolation frames, not positions obtained by equally dividing the magnitude of the motion of the video image between front and rear original frames, but positions closer to the video images of original frames nearer to the interpolation frames than the equally dividing positions are set). In place of the interpolation section 45, a normal high frame rate converter (which sets, as video image interpolation positions in interpolation frames, positions obtained by equally dividing the magnitude of the motion of the video image between the front and rear original frames) may be provided.

The imaging blur characteristic detector 12 detects the value of a parameter indicative of the characteristic of an imaging blur with respect to each of the frames constructing a moving image supplied from the interpolation section 45. The detection result of the imaging blur characteristic detector 12, that is, the value of the parameter indicative of the characteristic of the imaging blur is supplied to the imaging blur suppression processor 13.

Furthermore, the parameter indicative of the characteristic of the imaging blur is not particularly limited but various parameters are able to be employed. Concrete examples of the parameter indicative of the characteristic of an imaging blur will be described later. For example, in the case of using the absolute value of a travel vector (motion vector) as the characteristic of the imaging blur, the imaging blur characteristic detector 12 may include the motion vector detector 44 described in the first embodiment.

Further, the number of detected values of the parameter indicative of the characteristic of the imaging blur in one frame is also not limited. For example, only one value of the parameter indicative of the characteristic of an imaging blur may be detected per frame. The value of the parameter indicative of the characteristic of the imaging blur may be detected for each of the pixels constructing the frame. It is also possible to divide one frame into some blocks and detect the value of the parameter indicative of the characteristic of the imaging blur for each of the divided blocks.

The imaging blur suppression processor 13 corrects the value of each of pixels constructing a frame to be processed on the basis of a value corresponding to the frame to be processed in the values of the parameter detected by the imaging blur characteristic detector 12 with respect to each of the frames constructing a moving image supplied from the interpolation section 45. Namely, according to the characteristic (the value of the parameter) of the imaging blur in the frame to be processed, the imaging blur suppression processor 13 corrects each of the pixel values of the frame to be processed so as to suppress the imaging blur. That is, using the detected value of the parameter, the imaging blur suppressing process of suppressing deterioration in picture quality caused by the imaging blur included in each of the frames supplied from the interpolation section 45 is performed.

Thereby, a moving image in which the imaging blur is suppressed by correcting each of the pixel values of each of the frames and which is converted to the second frame rate higher than the first frame rate at the time of input is output from the imaging blur suppression processor 13 to the outside of the video signal processor 4B.

In addition, in the example of FIG. 13, the set of the imaging blur characteristic detector 12 and the imaging blur suppression processor 13 is used in combination with the interpolation section 45. Naturally, the set may be used by itself, or can be used in combination with a not-shown another function block (another video image signal processor for performing a predetermined image process).

That is, only by the set of the imaging blur characteristic detector 12 and the imaging blur suppression processor 13, the effect of suppressing the imaging blur can be produced. However, to make the effect more conspicuous, it is preferable to combine the set of the imaging blur characteristic detector 12 and the imaging blur suppression processor 13 with the interpolation section 45 as described above. The reason will be described below.

A blur recognized by a human when a moving image displayed on a not-shown display apparatus is formed as an image on the retina of the human is a combination of a hold blur which occurs when the human follows and sees a moving object included in the moving image and an imaging blur added at the time of capturing the moving image.

The characteristic of the imaging blur is expressed as a low-pass filter as will be described later with reference to FIG. 16 and the like. Specifically, an image signal with the imaging blur is a signal equivalent to a signal obtained by passing an image signal without an imaging blur (ideal image signal) through the low-pass filter. Therefore, the frequency characteristic of the image signal with the imaging blur is worse than that of the image signal without the imaging blur. That is, generally, the higher the frequency is, the lower the gain of the image signal with the imaging blur is as compared with that of the image signal without the imaging blur.

The characteristic of the hold blur is also expressed as the low-pass filter like the characteristic of the imaging blur. That is, an image signal with the hold blur is a signal equivalent to a signal obtained by passing an image signal without a hold blur (the image signal with the imaging blur) through the low-pass filter. Therefore, the frequency characteristic of the image signal with the hold blur is worse than that of the image signal without the hold blur. That is, generally, the higher the frequency is, the lower the gain of the image signal with the hold blur is as compared with that of the image signal without the hold blur. However, the hold blur occurs only in the case where the display apparatus is a fixed-pixel (hold) display apparatus.

Therefore, by performing the high frame rate converting process on the image signal with the imaging blur whose frequency characteristic has already deteriorated due to the imaging blur, the hold blur is able to be suppressed. However, even if the high frame rate converting process is performed, the deterioration of the imaging blur is unchanged and, finally, the effect of suppressing the blur on the retina of a human is halved. This will be described with reference to FIG. 14.

Figure 14:
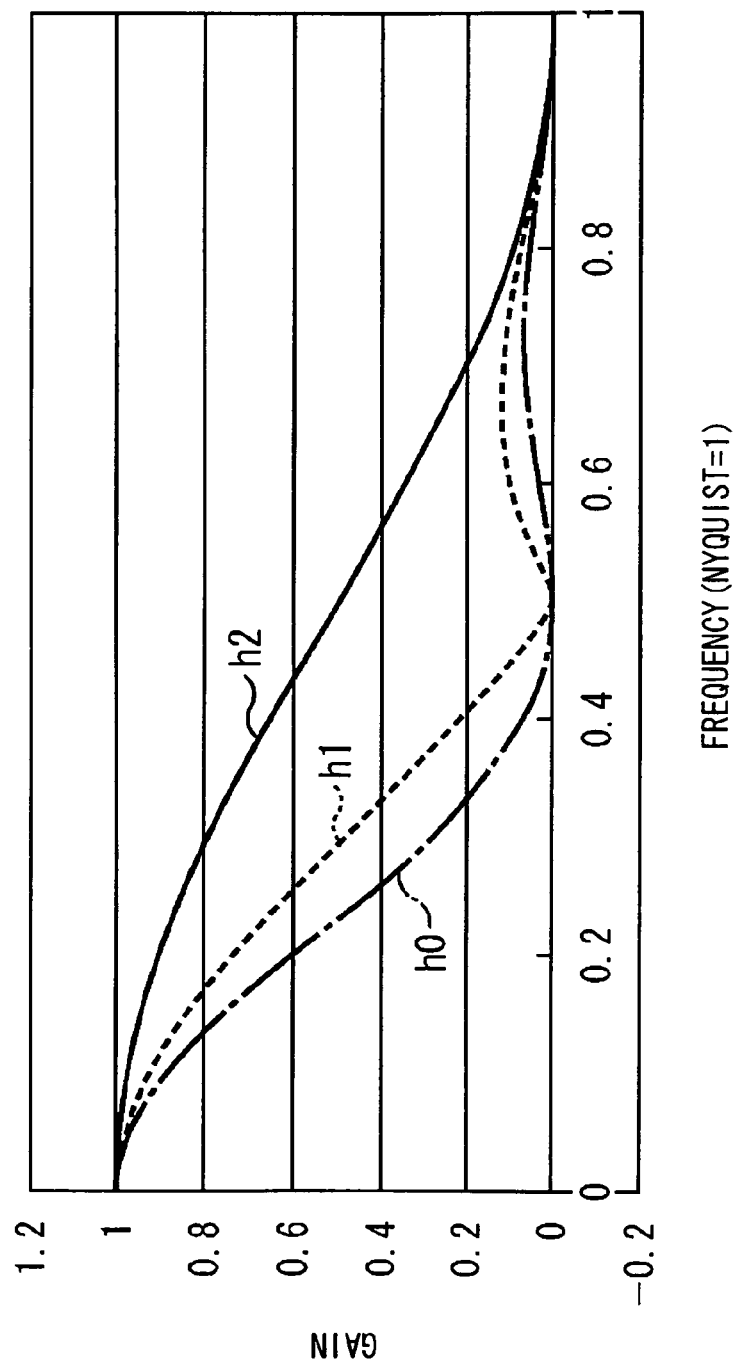
FIG. 14 A diagram showing an example of a frequency characteristic of a blur in an image formed on the retina of a human.

FIG. 14 shows a frequency characteristic of a blur in an image formed on the retina of a human in the case where an image of a real object moving at a travel speed 4 [pixel/frame] is captured in an image capture range of an image capturing apparatus (hereinbelow, called a camera). In FIG. 14, the horizontal axis denotes frequency, and the vertical axis indicates gain. The values on the horizontal axis denote relative values in the case where the Nyquist frequency is 1.

In FIG. 14, a curve h0 indicated by an alternate long and short dash line shows the frequency characteristic of a blur in an image formed on the retina of a human, in the case where a process for reducing blurs (including the imaging blur and the hold blur) is not performed. Specifically, in the case where a moving image, which is input to the video signal processor 4B in the example of FIG. 13, is directly supplied to the display apparatus and displayed without being input to the video signal processor 4B (without being processed), the frequency characteristic of a blur in an image formed on the retina of a human who sees the moving image is the curve h0.

In contrast, for example, when the display speed is doubled by the high frame rate converting process, only the hold blur is reduced. As a result, the frequency characteristic of a blur in an image formed on the retina of a human becomes a curve h1 shown by a dotted line in the diagram. Specifically, in the case where a moving image which is input to the video signal processor 4B in FIG. 13 is subjected to the high frame rate converting process in the interpolation section 45 and is supplied to the display apparatus and displayed without being input to the imaging blur suppression processor 13 (without reducing the imaging blur), the frequency characteristic of a blur in an image formed on the retina of a human who sees the moving image is a curve h1.

Further, for example, when the present invention is applied, the display speed is doubled by the high frame rate converting process (the hold blur is reduced), and the degree of the imaging blur is halved, the frequency characteristic of a blur in an image formed on the retina of a human becomes a curve h2 indicated by the solid line in the diagram. Specifically, in the case where a moving image which is input to the video signal processor 4B in FIG. 13 is subjected to the high frame rate converting process in the interpolation section 45, subject to imaging blur suppression by the imaging blur suppression processor 13, and is supplied to the display apparatus and displayed, the frequency characteristic of a blur in an image formed on the retina of a human who sees the moving image is the curve h2.

It is understood from comparison between the curves h1 and h2 that reduction in the hold blur by the high frame rate converting process is insufficient for reduction in the characteristic of the blur on the retina of a human, and further reduction in the imaging blur is necessary. However, as described above, in the technique of related art, the high frame rate converting process is simply performed without considering necessity of reduction in the imaging blur.

Therefore, the video signal processors of the present invention, in the embodiment of FIG. 13 and embodiments of FIGS. 35 and 36 and the like which will be described later is provided with not only the interpolation section 45 but also the imaging blur characteristic detector 12 and the imaging blur suppression processor 13 in order to reduce the imaging blur, that is, to improve the characteristic of the blur on the retina of a human from the curve h0 to curve h2 in FIG. 14. However, as described in the embodiment of FIGS. 37 and 38, the imaging blur characteristic detector 12 is not an essential component for the video signal processor of the present invention.

That is, the imaging blur suppression processor 13 corrects each of the pixel values of each of frames to be processed on the basis of the value corresponding to the frames to be processed in the values of parameters indicative of characteristics of the imaging blur detected by the imaging blur characteristic detector 12, thereby suppressing deterioration in the image caused by the imaging blur in the frames subjected to the high frame rate conversion. In other words, by supplying an image signal output from the video signal processor of the present invention such as the video signal processor 4B to the not-shown display apparatus, the display apparatus is able to display a clear image in which the image deterioration (blur image) is suppressed as an image corresponding to the image signal.

As described above, it is preferable to combine the set of the imaging blur characteristic detector 12 and the imaging blur suppression processor 13 with the interpolation section 45.

Next, with reference to the flowchart of FIG. 15, the image process of the video signal processor 4B having the functional configuration of FIG. 13 will be described.

In step S1, the interpolation section 45 inputs a moving image of the first frame rate.

In step S2, the interpolation section 45 converts the frame rate of the moving image to the second frame rate higher than the first frame rate.

When the moving image converted from the first frame rate to the second frame rate is supplied from the interpolation section 45 to the imaging blur detector 12 and the imaging blur suppression processor 13, the process advances to step S3.

In step S3, the imaging blur characteristic detector 12 detects one or more values of parameters indicative of the characteristics of the imaging blur in each of the frames constructing the moving image.

When the one or more values of parameters indicative of the characteristics of the imaging blur in each of the frames constructing the moving image are supplied from the imaging blur characteristic detector 12 to the imaging blur suppression processor 13, the process advances to step S4.

In step S4, with respect to each of the frames constructing the moving image supplied from the interpolation section 45, the imaging blur suppression processor 13 corrects each of the pixel values of the frame to be processed on the basis of one or more values corresponding to the frame to be processed among the values of the parameter detected by the imaging blur detector 12.

In step S5, the imaging blur suppression processor 13 outputs the moving image obtained by correcting the pixel values of each of the frames and changing the first frame rate to the second frame rate.

Figure 15:
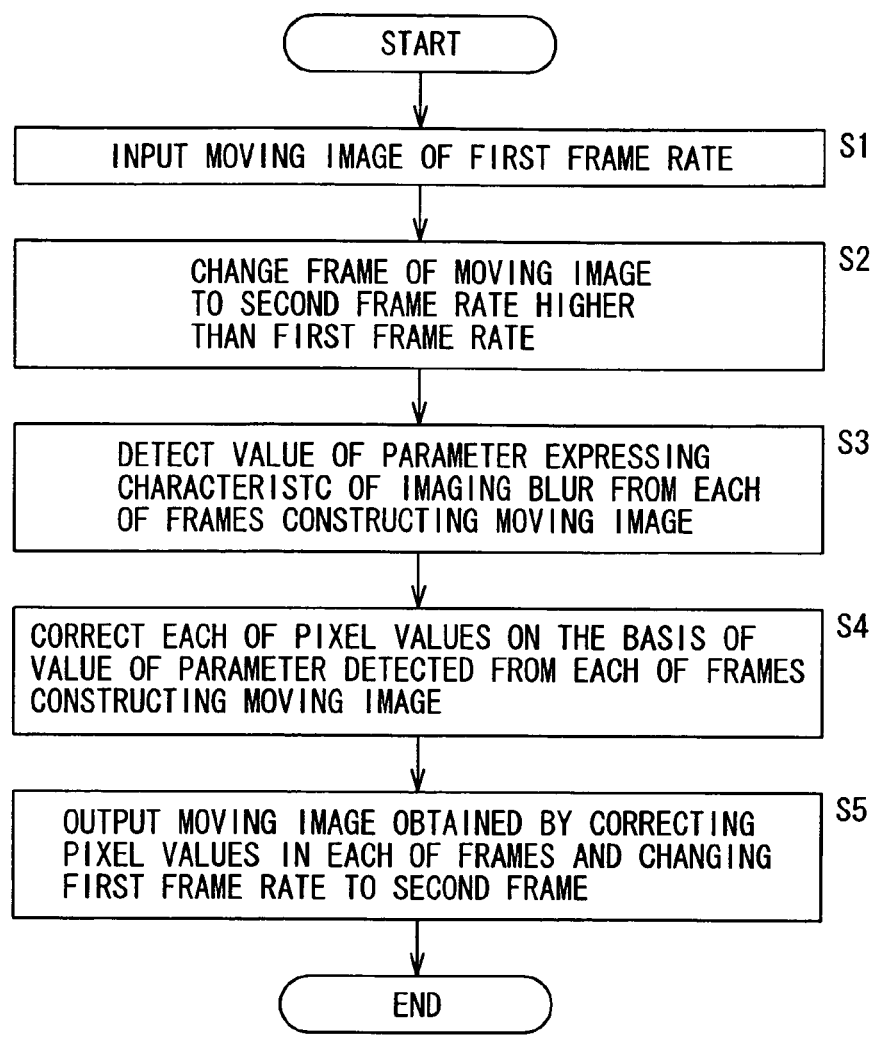
FIG. 15 A flowchart explaining an example of image process executed by the video signal processor of FIG. 13.

After that, the image process of FIG. 15 is finished.

In addition, in the above description, for simplicity of the explanation, the processes in the steps S1 to S5 are performed on the moving image unit basis. In reality, however, the frame is often the process unit.

In the image process of FIG. 15, the fact that the process unit of the steps is a moving image is equivalent to the fact that the condition of moving the step to be processed in the steps S1 to S5 to the next step is a condition that the process of the step to be processed is performed on an entire moving image.

On the other hand, in the image process of FIG. 15, the fact that the process unit in each of the steps is a frame is equivalent to the fact that the condition of moving the step to be processed in the steps S1 to S5 to the next step is a condition of performing the process of the step to be processed on an entire frame. In other words, the state where the process unit in each of the steps is a frame is equivalent to the state where the continuous processes in the steps S1 to S5 on each of the frames are executed independently from (in parallel with) another frame. In this case, for example, when the process in the step S3 is executed on a first frame, the process in the step S2 on the second frame different from the above may be executed in parallel.

Further, in reality, it often happens that each of pixels constructing a frame to be processed is sequentially set as a pixel to be noted as an object of the process (hereinbelow, called a target pixel) and, at least, the processes in the steps S3 and S4 are sequentially performed on the target pixel. That is, the process unit in the steps S3 and S4 is often a pixel.

In the following, therefore, it will be also assumed that the processes in the steps S3 and S4 are performed on the pixel unit basis. Specifically, the process in the step S3 is a process of the imaging blur characteristic detector 12. The process in the step S4 is a process of the imaging blur suppression processor 13. Therefore, the following description will be given on assumption that the process unit of the imaging blur characteristic detector 12 and the imaging blur suppression processor 13 is a pixel.

Next, details of the imaging blur suppression processor 13 in the video signal processor 4B in FIG. 13 will now be described. Concretely, for example, an embodiment of the imaging blur suppression processor 13 in the case of using the absolute value of a travel vector (motion vector) as a parameter indicative of the characteristic of the imaging blur will be described.

In addition, in the following, the absolute value of the travel vector (motion vector) will be called travel speed, and the direction of the travel vector (motion vector) will be called a travel direction. The travel direction can be any direction on a two-dimensional plane. Naturally, in the case where any direction on a two-dimensional plane becomes the travel direction, the video signal processor 4B of FIG. 13 can similarly execute various processes which will be described later. However, in the following, for simplicity of explanation, it is assumed that the travel direction is the lateral direction.

In the case where the travel speed is used as a parameter indicative of the characteristic of the imaging blur, for example, for each of the frames constructing a moving image, the imaging blur characteristic detector 12 sequentially sets each of the pixels constructing the frame to be processed as a target pixel, sequentially detects a travel vector in the target pixel, and sequentially supplies the travel vector as a value of the parameter indicative of the characteristic of the imaging blur in the target pixel to the imaging blur suppression processor 13.

Therefore, for example, for each of the frames constructing a moving image, the imaging blur suppression processor 13 sequentially sets each of the pixels constructing the frame to be processed as a target pixel, and sequentially corrects the pixel value of the target pixel on the basis of the travel speed in the target pixel supplied from the imaging blur characteristic detector 12.

Here, the reason why the travel speed can be employed as a parameter indicative of the characteristic of the imaging blur will be described.

The characteristic of the imaging blur can be generally expressed in the form that it depends on the travel speed of a subject.

In addition, in the case where a subject itself moves in a real space and a camera is fixed, the travel speed of the subject naturally includes the travel speed of a subject (image) in a frame when the subject is captured by the camera. Further, the travel speed of the subject here includes travel speed relative to the subject (image) in the frame when the subject is captured by the camera in the case where the subject is fixed in the real space and the camera is moved by a hand shake or the like or in the case where both the subject and the camera move in the real space.

Therefore, the characteristic of the imaging blur can be expressed in the form that it depends on the travel speed in each of pixels constructing an image of a subject.

The travel speed in a pixel refers to a spatial distance between a pixel in a frame to be processed and a pixel (correspondence point) in the preceding frame. For example, in the case where a spatial distance between a pixel in a frame to be processed and a corresponding pixel (correspondence point) in the immediately preceding frame (temporally by one) is v pixels (v denotes an arbitrary integer value equal to or larger than 0), the travel speed in the pixel is v [pixels/frame].

In this case, if predetermined one of the pixels constructing an image of a subject is set as a target pixel, the characteristic of the imaging blur in the target pixel can be expressed in the form that it depends on the travel speed v [pixels/frame] in the target pixel.

Figure 16:
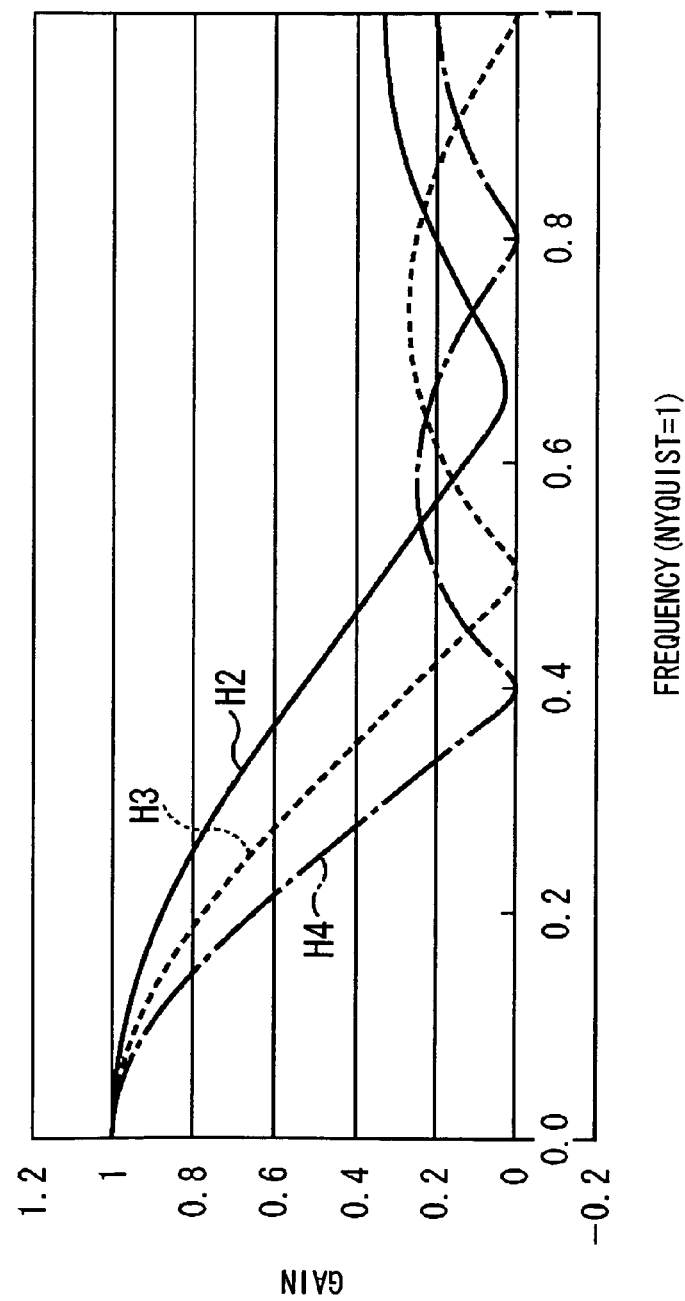
FIG. 16 A diagram showing an example of the frequency characteristic of an imaging blur according to a travel vector (travel speed, motion vector).

More concretely, for example, in the case where the travel speed of the target pixel is 2, 3, and 4 [pixels/frame], the frequency characteristics of the imaging blur in the target pixel can be expressed by curves H2, H3, and H4, respectively, in FIG. 16.

That is, FIG. 16 shows the frequency characteristics of the imaging blur in the target pixel in the case where the travel speed in the target pixel is 2, 3, and 4 [pixels/frame]. In FIG. 16, the horizontal axis shows frequency, and the vertical axis shows gain. However, the values on the horizontal axis show relative values in the case where the Nyquist frequency is 1.

The reason why the travel speed can be employed as a parameter indicative of the characteristic of the imaging blur has been described above.

By the way, as understood from the frequency characteristics H2 to H4 in FIG. 16, when the characteristic of an imaging blur in a target pixel is expressed in a space region, it can be expressed by a moving average filter (low-pass filter).

Specifically, when a transfer function indicative of the moving average filter (low-pass filter) (hereinbelow, called transfer function of the imaging blur) is written as H, an ideal image signal in the case where no imaging blur supposedly occurs (hereinbelow, called a signal without an imaging blur) is expressed as F in a frequency area, and an actual image signal output from a camera, that is, an image signal in which an imaging blur occurs (hereinbelow, called a signal with an imaging blur) is expressed as H in the frequency area, a signal G with the imaging blur is expressed as the following equation (3).

$$G = H \times F \quad (3)$$

An object of the invention is to remove (suppress) the imaging blur. To achieve the object, it is sufficient to forecasting calculation the signal F from the signal G with the imaging blur which is known and the transfer function H of the imaging blur which is known. That is, it is sufficient to execute the following equation (4) of forecasting calculation.

$$F = \text{inv}(H) \times G \quad (4)$$

In the equation (4), inv(H) indicates inverse function of the transfer function H of the imaging blur. Since the transfer function H of the imaging blur has the characteristic of a low-pass filter, the inverse function inv(H) of the transfer function H naturally has the characteristic of a high-pass filter.

Further, as described above, the characteristic of the transfer function H of the imaging blur varies according to the travel speed. Concretely, for example, when the travel speed in the target pixel is 2, 3, and 4 [pixels/frame], the frequency characteristic of the transfer function H of the imaging blur in the target pixel becomes different characteristics as shown by curves H2, H3, and H4, respectively, in FIG. 16.

Thereby, the imaging blur suppression processor 13 can achieve the object of the present invention, that is, the object of removing (suppressing) the imaging blur by changing the characteristic of the transfer function H of the imaging blur in accordance with the travel speed, obtains the inverse function inv(H) of the transfer function H whose characteristic was changed, and executes the computing process of the equation (4) using the inverse function inv(H).

Alternately, since the computation of the equation (4) is computation of a frequency region, to achieve the object of the present invention, the imaging blur suppression processor 13 may execute a process in a space region equivalent to the computing process of the equation (4). Concretely, for example, the imaging blur suppression processor 13 may execute the following first to third processes.

In the first process, according to the travel speed in a target pixel supplied from the imaging blur characteristic detector 12, the characteristic of the moving average filter (low-pass filer) expressing the imaging blur in the target pixel is converted. Concretely, for example, moving average filters are prepared for plural travel speeds in a one-to-one corresponding manner. A process of selecting one filter corresponding to the travel speed in the target pixel is an example of the first process.

The second process is a process made of the following processes 2-1 to 2-3.

The process 2-1 is a process of displaying the moving average filter in frequency by performing Fourier transform on the moving average filter whose characteristic is converted by the first process. Concretely, for example, in the case where the transfer speed in the target pixel is 2, 3, and 4 [pixels/frame], the process of obtaining the curves H2, H3, and H4 in FIG. 16 is the process 2-1. From the viewpoint of the frequency region, the process of obtaining the transfer function H of the imaging blur in the target pixel is the process 2-1.

The process 2-2 is a process of calculating the inverse of the moving average filter which is frequency indicated by the process 2-1. That is, from the viewpoint of the frequency region, the process of generating the inverse function inv(H) of the transfer function H of the imaging blur expressed by the above-mentioned equation (4) is the process 2-2.

The process 2-3 is a process of performing the inverse Fourier transform on the inverse of the moving average filter which is calculated by the process 2-2 and is frequency indicated. That is, a process of generating a high-pass filter (Wiener filter or the like) corresponding to the inverse function inv(H) is the process 2-3. In other words, the process of generating an inverse filter of the moving average filter is the process 2-3. In the following, the high-pass filter generated by the process 2-3 will be called an inverse moving average filter.

The third process is a process of inputting, as an input image, an image signal g in the space region corresponding to the signal G in the equation (4) in the frequency range with the imaging blur, and applying the inverse moving average filter generated by the process 2-3 on the image signal g. By the third process, an image signal f in the space region corresponding to the signal F in the equation (4) in the frequency region without the imaging blur is reconstructed (forecasting-calculated). Concretely, for example, a process of correcting the pixel value of the target pixel by applying the inverse moving average filter on a predetermined block including the target pixel in the frame to be processed is the third process.

Figure 17:
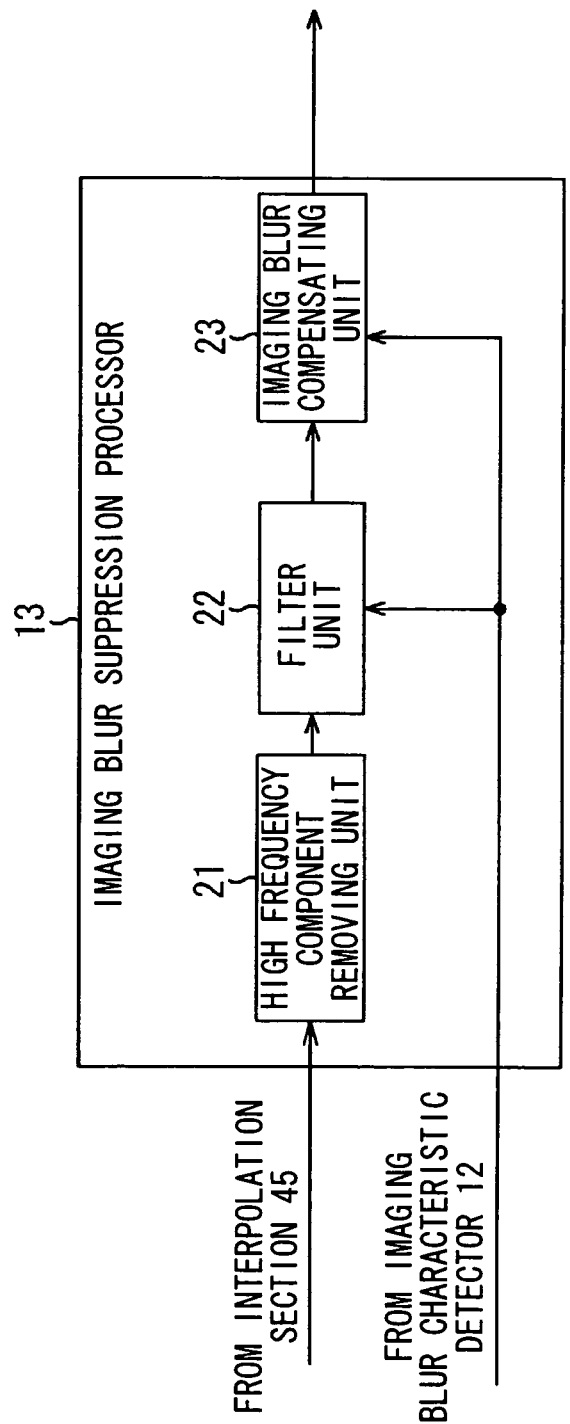
FIG. 17 A block diagram showing an example of a functional configuration of an imaging blur suppression processor in the video signal processor of FIG. 13.

An embodiment of the functional configuration of the imaging blur suppression processor 13 capable of executing the first to third processes has been already invented by the inventor of the present invention and is disclosed in FIG. 17 submitted together with the application of Japanese Patent Application No. 2004-234051.

However, in the case where the imaging blur suppression processor 13 has the configuration of FIG. 17 presented together with the application of Japanese Patent Application No. 2004-234051, a first issue as described below newly occurs. That is, as also shown by the frequency characteristics H2 to H4 in FIG. 16, the moving average filter (its frequency characteristic) indicative of the imaging blur includes the frequency at which the gain becomes zero. Consequently, it is difficult for the imaging blur suppression processor 13 to generate a complete inverse filter of the moving average filter (complete inverse moving average filter). As a result, the first issue that noise increases newly occurs.

Further, the process of applying the high-pass filter (inverse moving average filter) on the image signal like the third process can also be regarded as a process of making an edge sharp. As an image forming technique for "making an edge sharp", conventionally, there are, techniques called LTI, sharpness and the like. Accordingly, such a conventional technique can be obviously applied to the imaging blur suppression processor 13.

However, in the case of applying such a conventional technique to the imaging blur suppression processor 13, the following second to fifth issues newly occur.

That is, the LTI is a technique of related art disclosed in Japanese Unexamined Patent Application Publication No. 2000-324364 and the like. According to the Japanese Unexamined Patent Application Publication No. 2000-324364, the LTI is a technique in which by replacing the luminance (pixel value) of the target pixel with the luminance (pixel value) of a pixel neighboring the target pixel by a hard switch, the luminance of the target pixel is corrected, thereby sharpening an edge. Therefore, due to the characteristic, the LTI has a second issue such that durability against noise is low, and a process image may be damaged by noise. There is also a third issue that all of edges are sharpened regardless of image data prior to the LTI.

In addition, since the techniques of related art (LTI and sharpness) are used for image formation, the techniques have a fourth issue that the process is similarly performed also on a still picture in which no imaging blur occurs and a fifth issue that the process is uniformly performed irrespective of the amount of an imaging blur.

Accordingly, the inventors of the present invention have invented the imaging blur suppression processor 13 having, for example, the functional configuration shown in FIG. 17 of the present invention to solve the issues described above in "Problems to be solved by the Invention" along with the first to fifth issues. That is, FIG. 17 shows an example of the functional configuration of the imaging blur suppression processor 13 to which the present invention is applied.

In the example of FIG. 17, the imaging blur suppression processor 13 is configured to have a high frequency removing unit 21, a filter unit 22, and an imaging blur compensating unit 23.

In addition, in the following, at least in the description of the imaging blur suppression processor 13, signals input to the functional blocks (including computing units such as an adder) constructing the imaging blur suppression processor 13 will be called input signals collectively irrespective of an input unit such as a moving image, each of frames constructing a moving image, and a pixel value of each of pixels constructing each frame. Similarly, signals output from the functional blocks will be called output signals collectively regardless of an output unit. In other words, in the case where an input unit and an output unit have to be discriminated from each other, description will be given using the unit (mainly, the pixel value). In the other case, description will be given simply using an input signal or an output signal.

As shown in FIG. 17, an output signal of the interpolation section 45 is supplied to the high frequency component removing unit 21 as an input signal to the imaging blur suppression processor 13. An output signal of the imaging blur characteristic detector 12 is supplied to the filter unit 22 and the imaging blur compensating unit 23. An output signal of the high frequency component removing unit 21 is supplied to the filter unit 22. An output signal of the filter unit 22 is supplied to the imaging blur compensating unit 23. An output signal of the imaging blur compensating unit 23 is output to the outside as an output signal indicative of the final process result of the imaging blur suppression processor 13.

The details of the high frequency component removing unit 21, the filter unit 22, and the imaging blur compensating unit 23 will be described in the order.

First, with reference to FIGS. 18 and 19, the details of the high frequency component removing unit 21 will be described.

Figure 18:
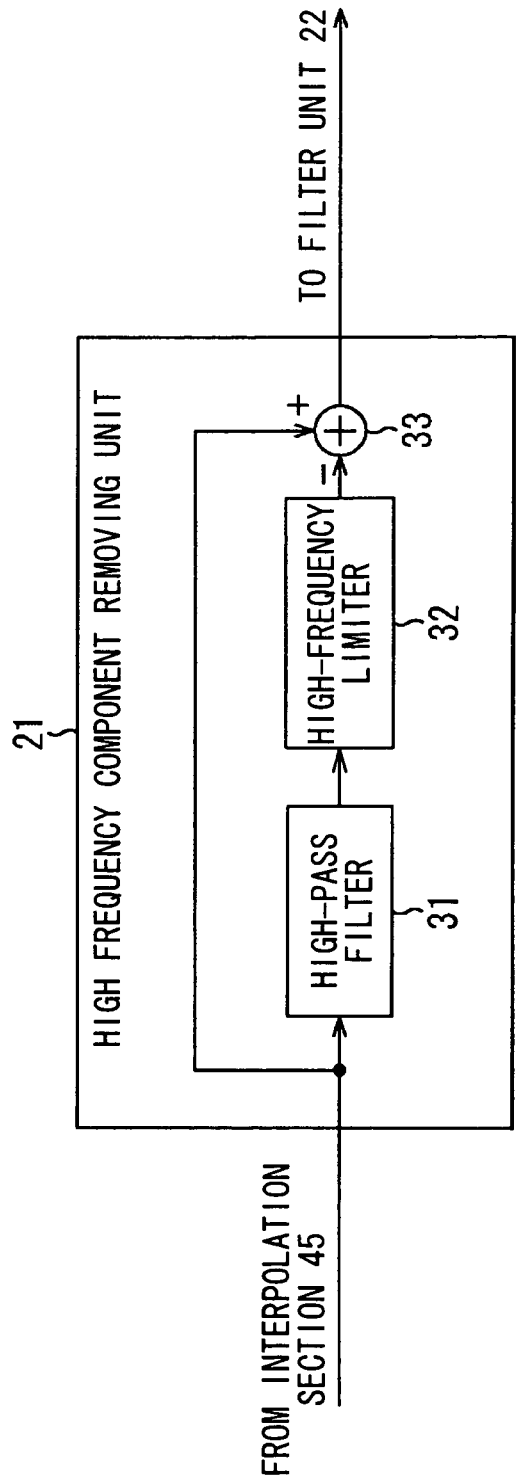
FIG. 18 A block diagram showing an example of the functional configuration of a high frequency component removing unit in the imaging blur suppression processor of FIG. 17.

FIG. 18 shows an example of a detailed functional configuration of the high frequency component removing unit 21. FIG. 19 shows the characteristic of a high-frequency limiter 32 which will be described later in the high frequency component removing unit 21 in FIG. 18.

In the example of FIG. 18, the high frequency component removing unit 21 is configured to have a high-pass filter 31, the high-frequency limiter 32, and a subtractor 33.

As shown in FIG. 18, an output signal of the interpolation section 45 is supplied as an input signal to the high frequency component removing unit 21 to each of the high-pass filter 31 and the subtractor 33.

The high-pass filter 31 has the function of an HPF (High-Pass Filter). Therefore, the high-pass filter 31 extracts a high frequency component from an input signal of the high frequency component removing unit 21 and supplies it to the high-frequency limiter 32.

Figure 19:
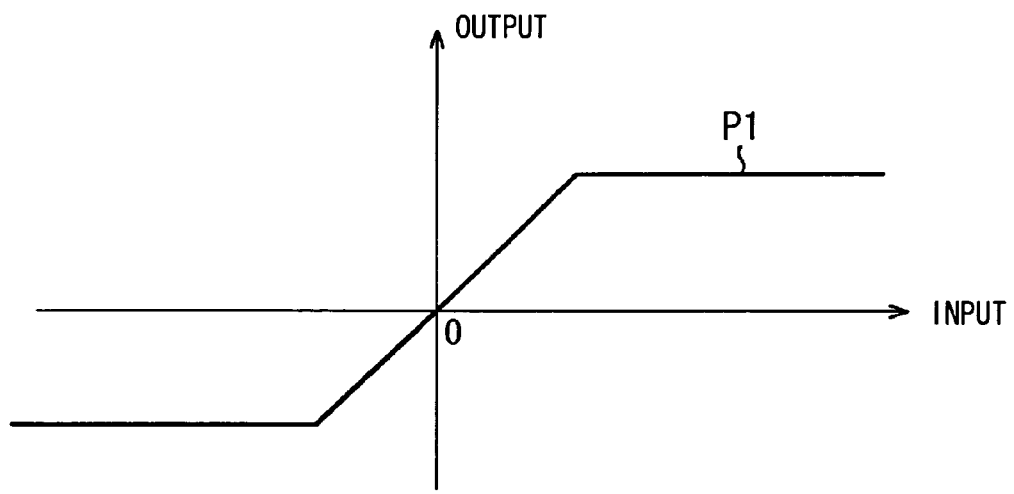
FIG. 19 A diagram showing an example of the characteristic of a high-frequency limiter in the high frequency component removing unit of FIG. 18.

The high-frequency limiter 32 has a function shown by a curve P1 in FIG. 19, assigns the high frequency component supplied from the high-pass filter 31 as an input parameter to the function, and supplies an output of the function (output of FIG. 19) to the subtractor 33. That is, as easily understood from the shape of the curve P1 in FIG. 19, the high-frequency limiter 32 limits the value of the high frequency component (input) supplied from the high-pass filter 31 in the case where the value is a predetermined value or larger, or a predetermined value or less. In other words, the high-frequency limiter 32 has a characteristic shown by the curve P1 in FIG. 19.

Referring again to FIG. 18, the subtractor 33 calculates the difference between the input signal of the high frequency component removing unit 21 and the high frequency component limited by the high-frequency limiter 32, and supplies a derived differential signal as an output signal of the high frequency component removing unit 21 to the filter unit 22.

In such a manner, high frequency components such as noise are removed from an input signal in the high-frequency component removing unit 21, and a signal obtained as a result is supplied as an output signal to the filter unit 22.

Next, referring to FIGS. 20 to 22, the details of the filter unit 22 will be described.

Figure 20:
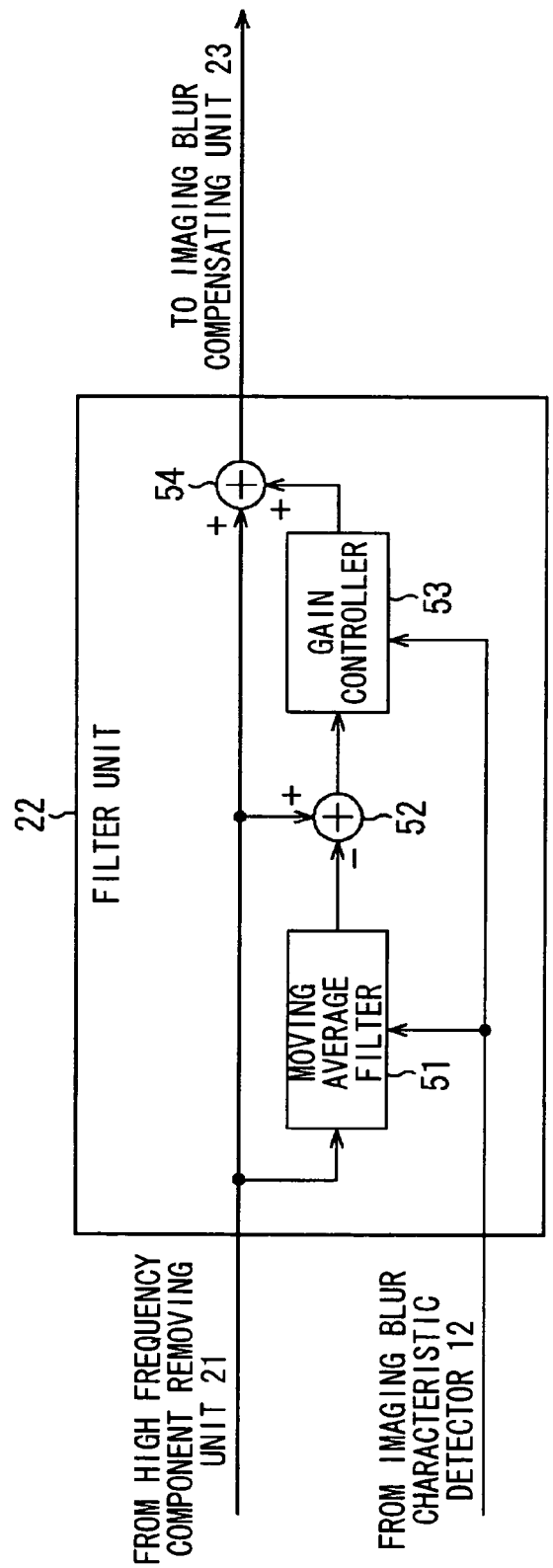
FIG. 20 A block diagram showing an example of the functional configuration of a filter unit in the imaging blur suppression processor of FIG. 17.

FIG. 20 shows an example of a detailed functional configuration of the filter unit 22. FIG. 21 shows an example of a detailed functional configuration of a gain controller 53 which will be described later, in the filter unit 22 in FIG. 20. FIG. 22 shows the characteristic of an adjustment amount determining unit 64 which will be described later, in the gain controller 53 in FIG. 21.

In the example of FIG. 20, the filter unit 52 includes a moving average filter unit 51 to an adder 54.

As shown in FIG. 20, an output signal of the high frequency component removing unit 21 is supplied as an input signal of the filter unit 22 to each of the moving average filter unit 51, a subtractor 52, and the adder 54. Further, an output signal of the imaging blur characteristic detector 12 is supplied to each of the moving average filter unit 51 and the gain controller 53.

The moving average filter unit 51 applies moving average filtering to the input signal of the filter unit 22. More specifically, the moving average filter unit 51 applies the moving average filter on each of pixel values of a predetermined block including the target pixel in a frame to be processed in an input signal of the filter unit 22, thereby correcting the pixel value of a target pixel. At this time, the moving average filter unit 51 converts the characteristic of the moving average filter in accordance with the travel speed in the target pixel in the output signal of the imaging blur characteristic detector 12. Concretely, for example, in the case where the travel speed in the target pixel is 2, 3, and 4 [pixels/frame], in view of the frequency region, the moving average filter unit 51 converts the characteristic of the moving average filter to those shown by the curves H2, H3, and H4, respectively, in FIG. 16. The pixel value of the target pixel corrected by the moving average filter unit 51 is supplied to the subtractor 52.

At this time, the moving average filter unit 51 can also change the number of taps (the target pixel and predetermined pixels neighboring the target pixel) used in the case of applying the moving average filter on the target pixel in accordance with the travel speed in the target pixel in the output signal of the imaging blur characteristic detector 12. Concretely, for example, the moving average filter unit 51 varies the number of taps so as to be increased (that is, so as to increase range to be averaged) as the travel speed increases. The imaging blur compensating unit 23 uses the result of the moving average filter using taps of the number according to the travel speed, thereby enabling correction of higher precision, that is, correction capable of further suppressing the imaging blur to be performed.

The subtractor 52 obtains the difference between a pixel value before correction of the target pixel in the input signal of the filter unit 22 and the pixel value of the target pixel corrected by the moving average filter unit 51, and supplies the difference value to the gain controller 53. Hereinafter, the output signal of the subtractor 52 is called the difference between signals before and after the moving average filter.

The gain controller 53 adjusts the value of the difference between signals before and after the moving average filter, and supplies, as an output signal, the adjusted difference between signals before and after the moving average filter to the adder 54. Details of the gain controller 53 will be described later with reference to FIG. 21.

The adder 54 adds the input signal of the filter unit 22 and the output signal of the gain controller 53, and supplies the addition signal as an output signal to the imaging blur compensating unit 23. Specifically, regarding the target pixel, to the target pixel, the adder 54 adds, as a correction amount, the adjusted value of the difference between the signals before and after the moving average filter of the target pixel to the pixel value of the target pixel prior to the correction, and supplies the addition value as the pixel value of the corrected target pixel to the imaging blur compensating unit 23 on the outside.

The process in the space region in the filter unit 22 as described above will be performed as follows in view of the frequency region.

That is, in the case where the difference between the signals before and after the moving average filter as the output signal of the subtractor 52 is considered in the frequency region, when attention is paid to a predetermined frequency, the gain of the output signal of the subtractor 52 becomes as follows. Specifically, at the noted frequency, the differential gain between the gain of the input signal of the filter unit 22 and the gain of the input signal passed through the moving average filter becomes the gain of the output signal of the subtractor 52. The gain of the output signal of the subtractor 52 will be called the differential gain between gains before and after the moving average filter.

Further, the differential gain between gains before and after the moving average filter is adjusted by the gain controller 53. The gain adjustment will be described later.

Therefore, in the case where the output signal of the filter unit 22 (adder 54) in the example of FIG. 20 is considered in the frequency region, when attention is paid to a predetermined frequency, the gain of the output signal is an addition gain obtained by adding the gain of the input signal and the differential gain between gains before and after the moving average filter after the gain adjustment. That is, at each of the frequencies, the gain of the output signal is higher than that of the input signal by the amount of the differential gain of signals before and after the moving average filter after the gain adjustment.

In other words, the filter unit 22 as a whole executes a process basically equivalent to a process of applying a high-pass filter.

Figure 21:
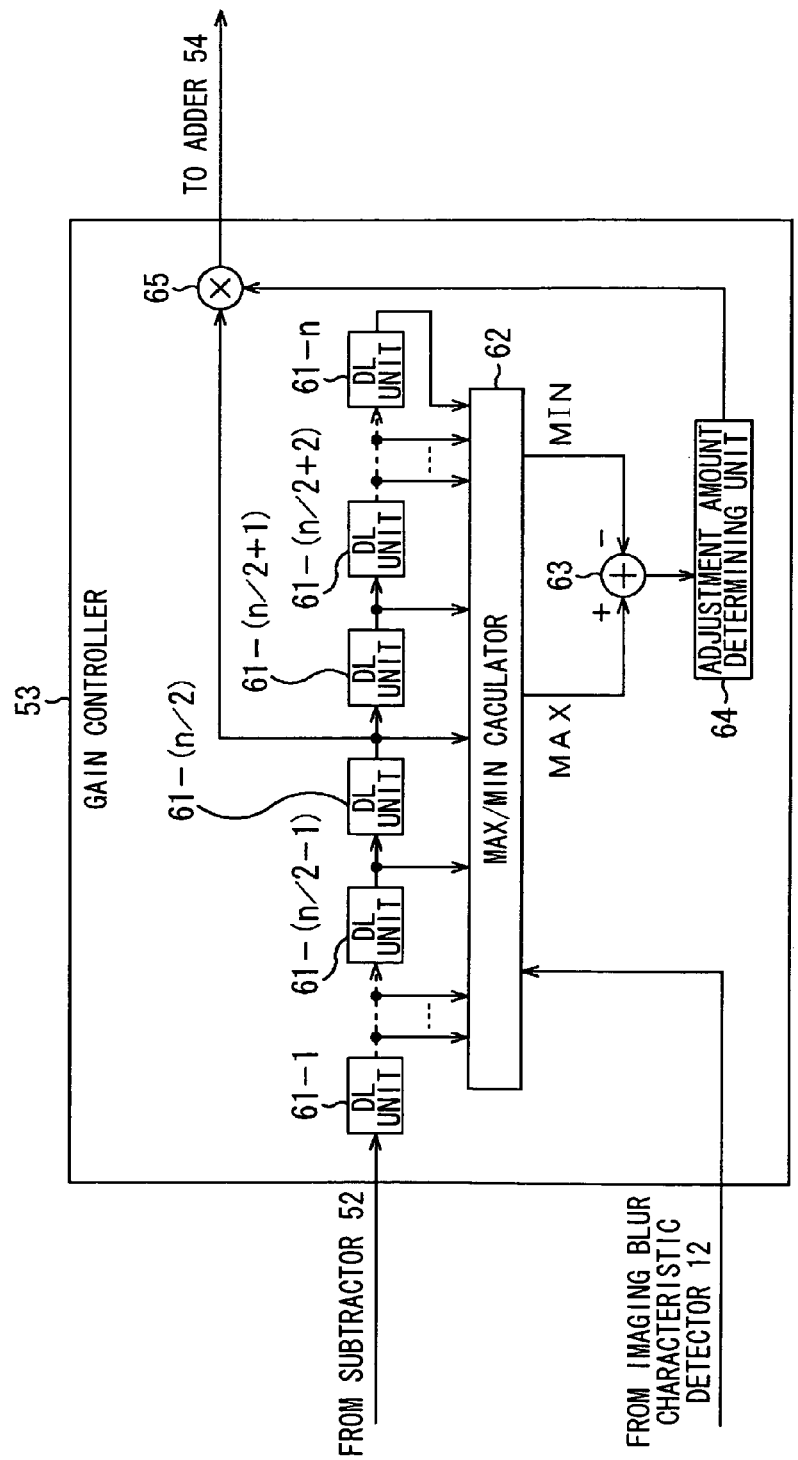
FIG. 21 A block diagram showing an example of the functional configuration of a gain controller in the filter unit in FIG. 20.

Referring to FIG. 21, the details of the gain adjuster 53 will be herein described.

In an example of FIG. 21, the gain controller 53 has delay units 61-1 to 61-n (hereinbelow, called DL units 61-1 to 61-n as shown in FIG. 21), a MAX/MIN calculator 62, a subtractor 63, an adjustment amount determining unit 64, and a multiplier 65.

As shown in FIG. 21, the difference of signals before and after the moving average filter as an output signal of the subtractor 52 is supplied as an input signal to the gain controller 53 to the DL unit 61-1. The output signal of the imaging blur characteristic detector 12 is supplied to the MAX/MIN calculator 62.

With such a configuration, the gain adjuster 53 can suppress ringing which occurs in a place where the level of a signal is high.

The detailed functional configuration (connection mode of functional blocks) of the gain controller 53 and its operation will be described together below.

The DL units 61-1 to 61-n are connected in the order. When an output signal of a preceding DL unit is supplied as an input signal to a DL unit, the DL unit delays the input signal by predetermined delay time, and supplies the resultant signal as an output signal to a subsequent DL unit. The output signals of the DL units 61-1 to 61-n are supplied also to the MAX/MIN calculator 62. An output of the DL unit 61-(n/2) is also supplied to the multiplexer 65.

Values corresponding to n pixels arranged successively in the travel direction (in this case, the lateral direction) using the target pixel as a center in the difference between the signals before and after the moving average filter as an input signal of the gain controller 53 are sequentially input to the DL unit 61-1 in the arrangement order of the pixels from right to left. Therefore, after time n times as long as delay time nearly elapses since then, one differential value between neighboring pixels in the n pixels arranged successively in the lateral direction using the target pixel as a center is output from each of the DL units 61-1 to 61-n and supplied to the MAX/MIN calculator 62. Further, the differential value between neighboring pixels of the target value is output from the DL unit 61-(n/2) and is supplied to the MAX/MIN calculator 62 as described above and is also supplied to the multiplier 65.

In addition, the number n of DL units 61-1 to 61-n is, though not limited, the highest value [pixels/frame] of the travel speed in this case. It is also assumed that the travel speed in the target pixel supplied from the imaging blur characteristic detector 12 is v [pixels/frame]. In this regard, v is an arbitrary integer value of 0 or larger.

The MAX/MIN calculator 62 determines, as a calculation range, a range including the target pixel as a center and including differential values of neighboring pixels in the v pixels of the amount corresponding to the travel speed. The MAX/MIN calculator 62 obtains a maximum value MAX and a minimum value MIN from v differential values of neighboring pixels included in the calculation range from the n differential values supplied from the DL units 61-1 to 61-n, and supplies the maximum value MAX and the minimum value MIN to the subtractor 63.

In addition, the range including the target pixel as a center and including differential values of neighboring pixel in the v pixels of the amount corresponding to the travel speed is set as the calculation range for the following reason. That is, ringing exerts an influence by the number of taps of the high-pass filter, in other words, by the amount corresponding to the travel speed.

The subtractor 63 obtains the difference between a maximum value MAX and a minimum value MIN supplied from the MAX/MIN calculator 62 and supplies the differential value (=MAX−MIN) to the adjustment amount determining unit 64.

It is known that the larger the differential value (=MAX−MIN) becomes, the larger ringing around the target pixel becomes. That is, the difference (=MAX−MIN) is a value as the index of magnitude of the ringing around the target pixel.

Then, the adjustment amount determining unit 64 determines the adjustment amount on the differential values of the pixels neighboring the target pixel on the basis of the differential value (=MAX−MIN) supplied from the subtractor 63, and supplies it to the multiplier 65.

Figure 22:
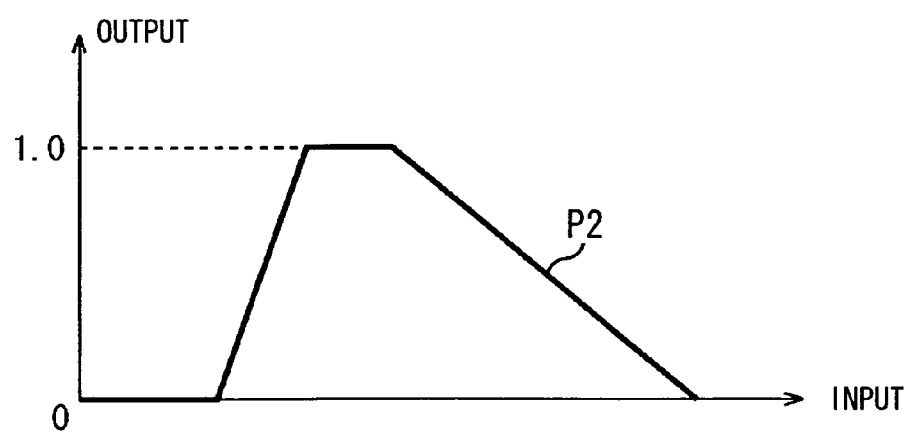
FIG. 22 A diagram showing an example of the characteristic of an adjustment amount determining unit in the gain controller in FIG. 21.

Specifically, for example, the adjustment amount determining unit 64 holds a function indicated by the curve P2 in FIG. 22, assigns the differential value (=MAX−MIN) supplied from the subtractor 63 as an input parameter to the function, and supplies an output of the function (the output of FIG. 22) as the adjustment amount on the differential values of pixels neighboring the target pixel to the multiplier 65. That is, as easily understood from the shape of the curve P2 in FIG. 22, after the differential value (=MAX−MIN) supplied from the subtractor 63 exceeds a predetermined value, the adjustment amount (output) decreases in order to suppress occurrence of ringing. In other words, the adjustment amount determining unit 64 has the characteristic shown by the curve P2 in FIG. 22.

Referring again to FIG. 21, the multiplier 65 multiplies the differential value between the signals neighboring the target pixel supplied from the DL unit 61-(n/2) with the adjustment amount supplied from the adjustment amount determining unit 64 (in the example of FIG. 22, the value in the range of 0 to 1), and supplies the resultant value as the differential value between the adjusted signals neighboring the target pixel. That is, the difference values between the neighboring pixels adjusted are sequentially supplied as output signals of the gain controller 53 to the adder 54.

As described above, when the differential value (=MAX−MIN) as an output signal of the subtractor 63 exceeds a predetermined value, as the differential value (=MAX−MIN) increases, the adjustment amount (output) decreases toward 1 to 0. Therefore, in the case where the differential value (=MAX−MIN) as an output signal of the subtractor 63 is equal to or larger than a predetermined value, an adjustment value which is less than 1 is multiplied to the differential amount of pixels neighboring the target pixel. Thus, the difference of the pixels neighboring the target pixel is adjusted so as to be decreased. As a result, ringing around the target pixel is suppressed.

In view of the frequency region, it can be said, eventually, that the process in the space region in the gain controller 53 is a process of adjusting the differential gain between gains before and after the moving average filter in order to suppress ringing.

Next, referring to FIGS. 23 to 31, the details of the imaging blur compensating unit 23 will be described.

Figure 23:
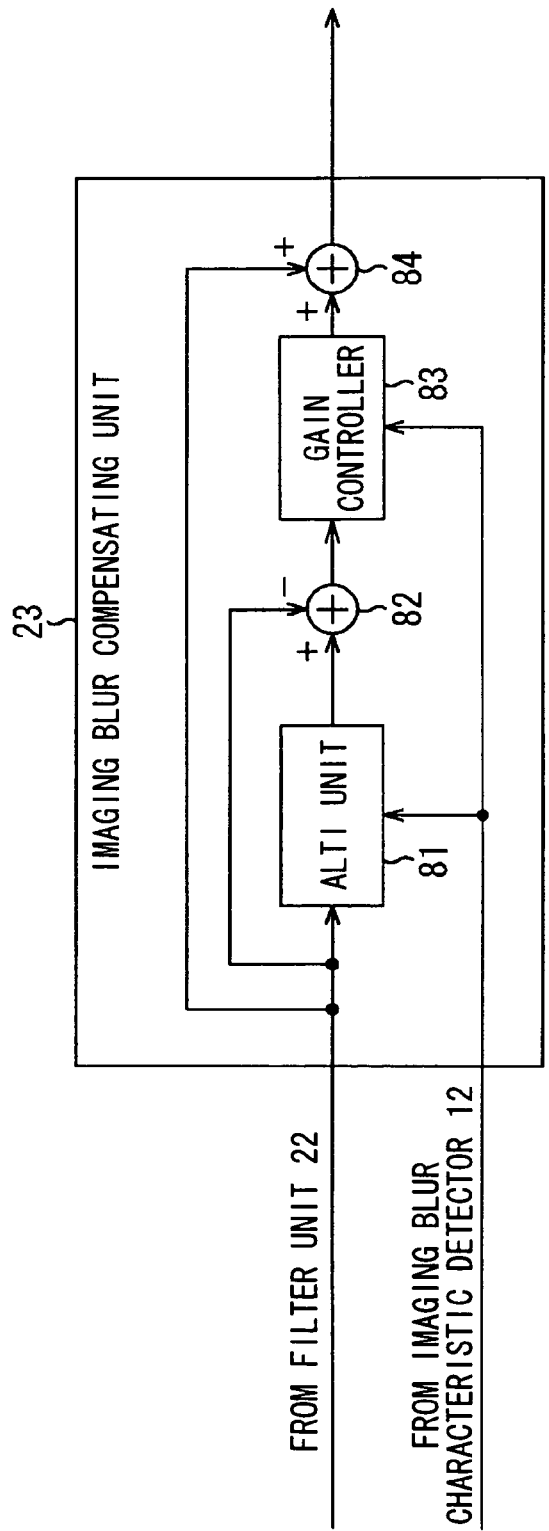
FIG. 23 A block diagram showing an example of the functional configuration of an imaging blur compensating unit in the imaging blur suppression processor of FIG. 17.

FIG. 23 shows an example of a detailed functional configuration of the imaging blur compensating unit 23.

In the example of FIG. 23, the imaging blur compensating unit 23 is configured to have an ALTI unit 81, a subtractor 82, a gain controller 83, and an adder 84.

As shown in FIG. 23, an output signal of the filter unit 22 is input, as an input signal of the imaging blur compensating unit 23, to the ALTI unit 81, the subtractor 82, and the adder 84. An output signal of the imaging blur characteristic detector 12 is supplied to the ALTI unit 81 and the gain controller 83.

Paying attention to the pixel value of a target pixel in an input signal of the imaging blur compensating unit 23, each of the ALTI 81 to the adder 84 will be hereinafter described.

In addition, as described above, the pixel value of a target pixel at the stage when it is supplied to the imaging blur compensating unit 23 is often different from that at the stage when it is input to the imaging blur suppression processor 13 in FIG. 17 since it is already corrected by the high frequency component removing unit 21 and the filter unit 22. Further, as will be described later, the pixel value of the target pixel is properly corrected also in the imaging blur compensating unit 23. Then, to avoid confusion, during explanation of the imaging blur compensating unit 23, each pixel value at the stage when it is input to each functional block will be called an input pixel value, and a pixel value at the stage when it is output from each functional block will be called an output pixel value. Further, there is a case that, with respect to the same pixel, a plurality of different pixel values are input from a plurality of preceding functional blocks. In such a case, the pixel value closer to an original (mainly, a pixel value before correction) will be called an input pixel value, and the other pixel values will be called output pixel values of a subsequent functional block. For example, although the details will be described later, different values are supplied as pixel values of the target pixel from the ALTI unit 81 and the external filter unit 22 to the subtractor 82. Therefore, the pixel value supplied from the external filter unit 22 will be called an input pixel value, and the pixel value supplied from the ALTI unit 81 will be called an output pixel value of the ALTI unit 81.

The ALTI unit 81 determines a correction amount according to the travel speed in the target pixel supplied from the imaging blur characteristic detector 12, adds the correction amount to the input pixel value of the target pixel, and supplies the added value as an output pixel value of the target pixel to the subtractor 82. The more details of the ALTI unit 81 will be described later with reference to FIG. 24.

The subtractor 82 calculates the difference between the output pixel value of the target pixel of the ALTI unit 81 and the input pixel value of the target pixel, and supplies the differential value (hereinbelow, called a target pixel differential value) to the gain controller 83.

The gain controller 83 adjusts the target pixel differential value supplied from the subtractor 82 in accordance with the travel speed in the target pixel supplied from the imaging blur characteristic detector 12, and supplies the adjusted target pixel differential value as a final correction amount for the target pixel to the adder 84.

The adder 84 adds the final correction amount from the gain controller 83 to the input pixel value of the target pixel, and outputs the added value as an output pixel value of the target pixel to the outside. That is, the output pixel value of the target pixel of the adder 84 is output as the pixel value of the target pixel finally corrected by the imaging blur suppression compensating unit 23 to the outside.

The details of each of the ALTI unit 81 and the gain controller 83 in the imaging blur compensating unit 23 will be described below in the order.

First, referring to FIGS. 24 to 29, the details of the ALTI unit 81 will be described.

Figure 24:
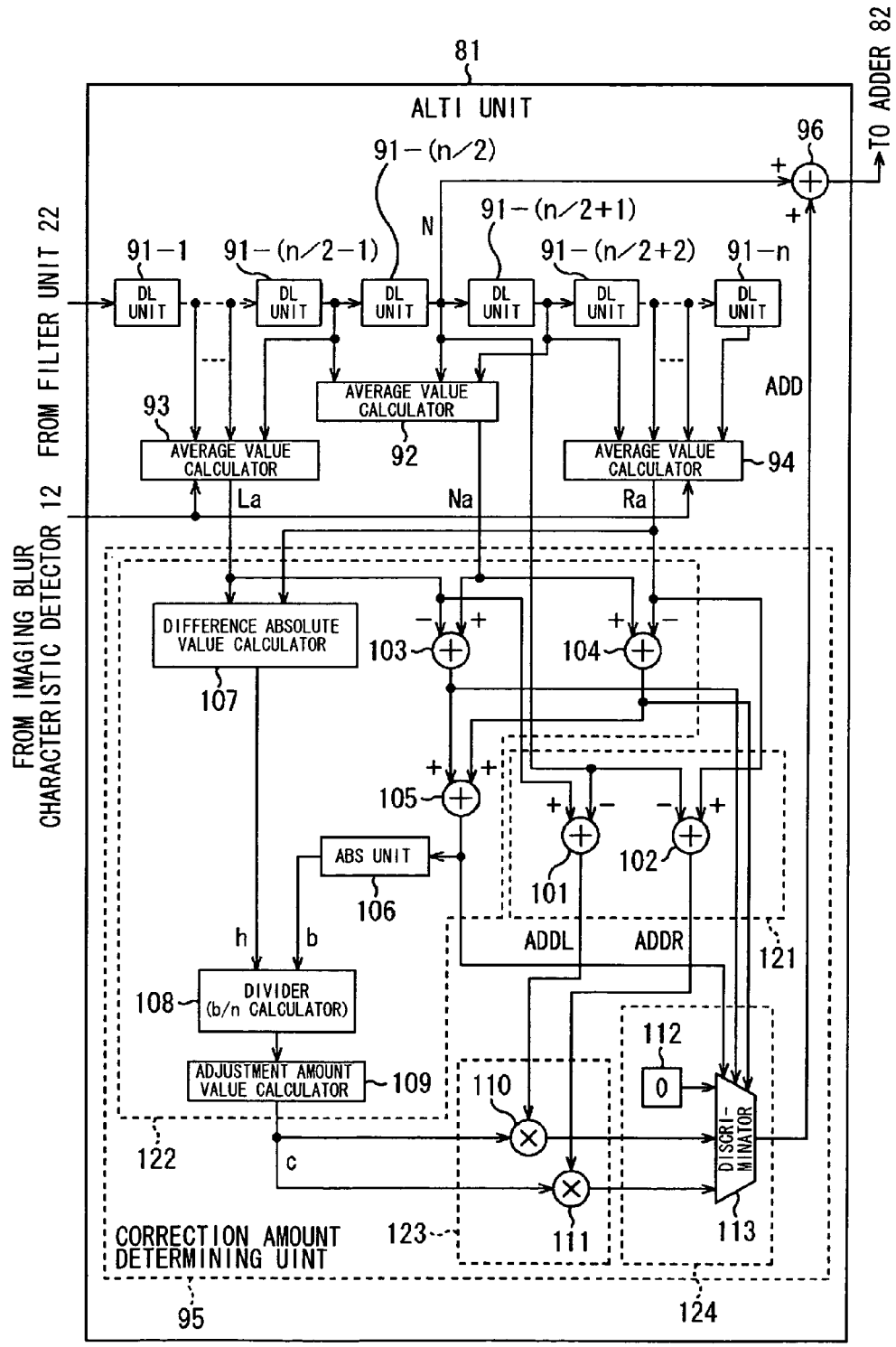
FIG. 24 A block diagram showing an example of the functional configuration of an ALTI unit in the imaging blur compensating unit in FIG. 23.

FIG. 24 shows an example of a detailed functional configuration of the ALTI unit 81.

In an example of FIG. 24, the ALTI unit 81 is configured to have delay units 91-1 to 91-n (hereinbelow, called DL units 91-1 to 91-n as shown in FIG. 24), average value calculators 92 to 94, a correction amount determining unit 95, and an adder 96.

The detailed functional configuration (connection mode of functional blocks) of the ALTI unit 81 and its operation will be described below.

The DL units 91-1 to 91-n are connected in the order. Each of the DL units 91-1 to 91-n delays each of the pixel values output from a preceding DL unit by predetermined delay time, and outputs the resultant signal to a subsequent DL unit. Each of the pixel values output from the DL units 91-1 to 91-(n/2-1) is supplied to the average value calculator 93. The pixel values output from the DL units 91-(n/2-1), 91-(n/2), and 91-(n/2+1) are supplied to the average value calculator 92. The pixel values output from the DL units 91-(n/2+1) to 91-n are supplied to the average value calculator 94. The pixel value output from the DL unit 91-(n/2) is also supplied to the correction amount determining unit 95 and the adder 96.

Each pixel value of n pixels arranged successively in the travel direction (in this case, the lateral direction) using the target pixel as a center are sequentially input to the DL unit 91-1 in the arrangement order of the pixels from right to left. Therefore, after time n times as long as delay time nearly elapses since then, the pixel value of each of the n pixels arranged successively in the lateral direction using the target pixel as a center is output from each of the DL units 91-1 to 91-n.

In addition, description will be given on assumption that the pixel values at the stage when they are output from the DL units 91-1 to 91-n are input pixel values to the ALTI unit 81.

Concretely, an input pixel value N of the target pixel is output from the DL unit 91-(n/2). The input pixel value of each of the n/2-1 pixels arranged successively on the left side of the target pixel is output from each of the DL units 91-1 to 91-(n/2-1). On the other hand, the input pixel value of each of the n/2-1 pixels arranged successively on the right side of the target pixel is output from each of the DL units 91-(n/2+1) to 91-n.

In addition, the number n of DL units 91-1 to 91-n is, though not limited, the highest value [pixels/frame] of the travel speed in this case. It is also assumed that the travel speed in the target pixel supplied from the imaging blur characteristic detector 12 is v [pixels/frame] as in the above example.

Therefore, to the average value calculator 92, the input pixel value N of the target pixel, the input pixel value of the pixel on the left side of the target pixel, and the input pixel value of the pixel on the right side of the target pixel are input. Therefore, the average value calculator 92 calculates an average value Na of the input pixel value N of the target pixel, the input pixel value of the pixel on the left side of the target pixel, and the input pixel value of the pixel on the right side of the target pixel (hereinbelow, called an average pixel value Na of the target pixel), and supplies the average value Na to the correction amount determining unit 95.

In addition, as the details will be described later, a correction amount ADD of the target pixel determined by the correction amount determining unit 95 is adjusted by a predetermined adjustment amount c. The adjustment value c is not a fixed value but a variable value determined by a predetermined process (hereinbelow, called an adjustment amount determining process). In the embodiment, in the adjustment amount determining process, the average pixel value Na of the target pixel is used for the following reason. Although the input pixel value N of the target pixel can be used as it is in the adjustment amount determining process, in this case, if noise is included in the target pixel, an image to be processed may be broken. That is, the reason is to prevent breakage of an image to be processed.

To the average value calculator 93, the input pixel values of n/2-1 pixels successively arranged on the left side of the target pixel are supplied. Then, the average value calculator 93 selects k pixels (where k is about v/2) which is about the half of the travel speed in order in the left direction of the pixel on the left side of the target pixel, and determines a range including the input pixel values of the selected k pixels as a calculation range. Then, the average value calculator 93 calculates an average value La of the k input pixel values included in the calculation range (hereinbelow, called the average pixel value La of the left pixels) in the supplied n/2-1 input pixel values, and supplies the average value La to the correction amount determining unit 95.

On the other hand, to the average value calculator 94, the input pixel values of the n/2-1 pixels arranged successively on the right side of the target pixel are supplied. Then, the average value calculator 94 selects k pixels in order in the right direction of the pixel on the right side of the target pixel, and determines a range including the input pixel values of the selected k pixels as a calculation range. Then, the average value calculator 94 calculates an average value Ra of the k input pixel values included in the calculation range (hereinbelow, called the average pixel value Ra of the right pixels) in the supplied n/2-1 input pixel values, and supplies it to the correction amount determining unit 95.

As the details will be described later, the average pixel value La of the left pixels and the average pixel value Ra of the right pixels are used for the adjustment amount determining process and a process for determining a candidate of the correction amount (hereinbelow, called candidate determining process).

That is, in the LTI of related art disclosed in Japanese Unexamined Patent Application Publication No. 2000-324364, the differential value between the input pixel value of one pixel (hereinbelow, called left pixel) apart from the target pixel by a predetermined distance in the left direction and the input pixel value of the target pixel is determined as a first candidate of the correction amount. Further, the differential value between the input pixel value of one pixel (hereinbelow, called right pixel) apart from the target pixel by a predetermined distance in the right direction and the input pixel value of the target pixel is determined as a second candidate of the correction amount. Then, one of the first and second candidates is determined as a correction amount as it is without being adjusted. Consequently, the LTI of related art has an issue such that if noise is included in the input pixel value of the left pixel or the right pixel, the correction amount (two candidates) may not be properly determined.

Therefore, to solve the issue, that is, to properly determine candidates of the correction amount, in the candidate determining process of the embodiment, the input pixel value of one pixel such as a left pixel or right pixel is not simply used, but the average pixel value La of the left pixels and the average pixel value Ra of the right pixels are used.

However, there is the case that the change direction of each input pixel value included in the calculation range is not constant, that is, the change direction may increase and then decrease, or decreases and then increases. In other words, there is the case that the polarity of the gradient of a line connecting points indicative of input pixel values included in the calculation range (points 131 to 134 and the like of FIG. 25 which will be described later) is inverted on a plane using the pixel positions in the horizontal direction as the horizontal axis and using the pixel values as the vertical axis (for example, a plane of FIG. 25 which will be described later). In such a case, a new issue occurs such that even if a simple average value of input pixel values included in the calculation range is employed as the average pixel value La of the left pixels or the average pixel value Ra of the right pixels, a correction amount (candidate) may not be properly determined.

Therefore, to solve the new issue, in the embodiment, each of the average value calculators 93 and 94 updates an input pixel value $\beta$ indicated by a first point after polarity inversion in the input pixel values included in the calculation range to a pixel value $\gamma$ by computing the right side of the following equation (5) using an input pixel value $\alpha$ indicated by a second point before polarity inversion. Each of the average value calculators 93 and 94 regards the input pixel value of the pixel indicated by the first point as the updated pixel value $\gamma$, and calculates the average pixel value La of left pixels or the average pixel value Ra of right pixels.

$$\gamma = \alpha - H \times f(H) \quad (5)$$

Figure 25:
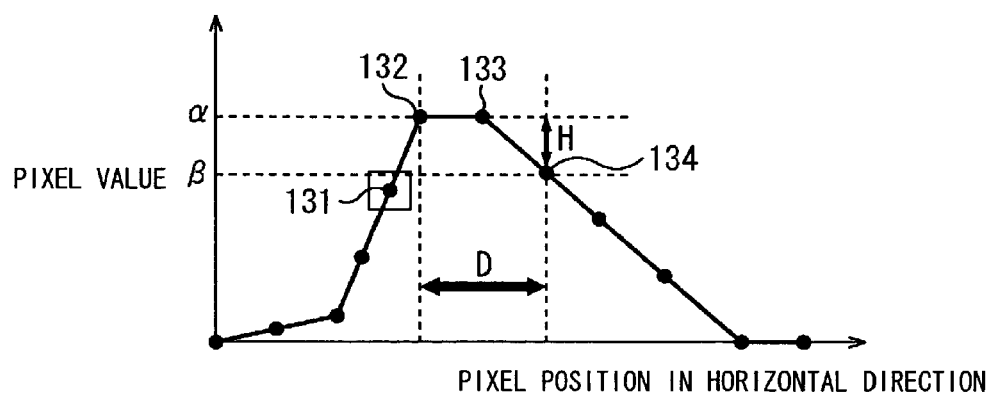
FIG. 25 A diagram illustrating an example of an object to be processed of the ALTI unit of FIG. 24 to explain a method of correcting a pixel value in the case of computing average of pixel values of a group of pixels arranged successively on the right side of a target pixel.

In the equation (5), as shown in FIG. 25, H denotes the differential value ($=\alpha-\beta$) between the pixel value $\alpha$ of the second point (point 133 in the diagram) before polarity inversion and the pixel value $\beta$ of the first point (point 134 in the diagram) after polarity inversion.

That is, FIG. 25 shows an example of pixel values of 12 pixels arranged successively in the horizontal direction including the target pixel 131. In FIG. 25, the horizontal axis indicates "pixel position in the horizontal direction", and the vertical axis indicates "pixel values". In the example of FIG. 25, the calculation range of the average value calculator 94, that is, the calculation range of the average pixel value Ra of right pixels is a range D including the pixel values $\alpha$, $\alpha$, and $\beta$ indicated by the three points 132 to 133 on the right side of point 131 indicative of the target pixel.

From the example of FIG. 25, it is understood that the polarity of the gradient from point 133 to point 134 is determined. To be specific, the point 134 is the first point after the polarity inversion, and the point 133 is the second point before the polarity determination. Therefore, in the example of FIG. 25, the average value calculator 94 varies the input pixel value indicated by the point 134 from the pixel value $\beta$ to the pixel value $\gamma$ by assigning the difference value $H(=\alpha-\beta)$ between the input pixel value $\alpha$ indicated by the point 133 and the input pixel value $\beta$ indicated by the input pixel value $\alpha$ and the point 134 to the right side of the equation (5). Then, the average value calculator 94 calculates the average pixel value Ra of right pixels using the updated pixel value $\gamma$ as the input pixel value of the pixel indicated by the point 134 in the calculation range D and using the original pixel value $\alpha$ as it is as each of input pixel values of the other points 132 and 133. That is, $Ra=(\alpha+\alpha+\gamma)/3$ is computed.

Figure 26:
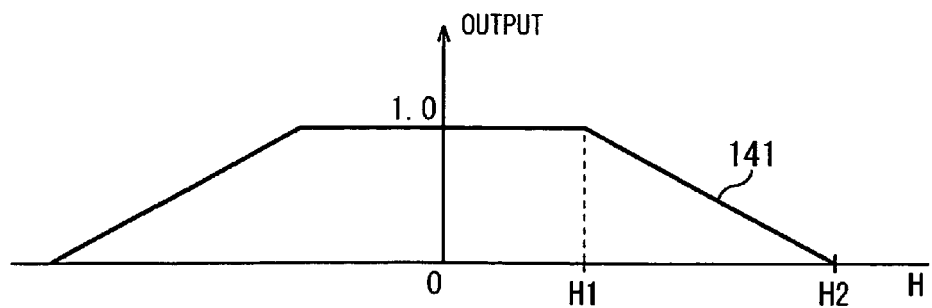
FIG. 26 A diagram for supplementarily explaining the pixel value correcting method in the case of computing average of pixel values of a group of pixels arranged successively on the right side of the target pixel.

In the embodiment, in computation of the right side of the equation (5), a function having the characteristic like line 141 of FIG. 26 is used as the function f(H).

As shown in FIG. 26, in the case where the differential value H between the pixel value $\alpha$ before polarity inversion and the pixel value $\beta$ after polarity inversion is equal to a value H2 or larger, an output of the function f(H) is zero. In addition, when the differential value H is large, it means that the gradient after polarity inversion is sharp. Therefore, in the case where the gradient after polarity inversion is sharp to certain extent or more, that is, in the case where the differential value H is the value H2 or larger, the pixel value $\gamma$ updated by the equation (5) becomes the pixel value $\alpha$. That is, as shown in FIG. 25, in the case where the gradient after polarity inversion is sharp to certain extent or more, the average pixel value Ra of right pixels in the calculation range D is calculated using the pixel value $\alpha$ in place of the pixel value $\beta$ as the input pixel value of the pixel indicated by the point 134 after polarity inversion. That is, $Ra=(\alpha+\alpha+\alpha)/3=\alpha$ is computed and the average pixel value Ra of right pixels is determined as the pixel value $\alpha$.

On the other hand, as shown in FIG. 26, in the case where the differential value H between the pixel value $\alpha$ before polarity inversion and the pixel value $\beta$ after polarity inversion is equal to the value H1 or less, an output of the function f(H) becomes 1. In addition, when the differential value H is small, it means that the gradient after polarity inversion is gentle. Therefore, in the case where the gradient after polarity inversion is gentle to certain extent or more, that is, in the case where the differential value H is equal to the value H1 or less, the pixel value $\gamma$ updated by the equation (5) becomes the pixel value $\beta$. That is, in the case where the gradient after polarity inversion is gentle to certain extent or more, although not shown, the average pixel value Ra of right pixels in the calculation range D is calculated using the pixel value $\beta$ as it is as the input pixel value indicated by the point 134 after polarity inversion. That is, $Ra=(\alpha+\alpha+\beta)/3$ is computed and the average pixel value Ra of right pixels is determined as the pixel value $\{(\alpha+\alpha+\beta)/3\}$.

In addition, when the gradient after polarity inversion is gentle to certain extent or more, the original pixel value P is used as it is without updating the pixel value indicated by the point 134 after polarity inversion for the following reason. That is, in the case where the gradient after polarity inversion is gentle to certain extent or more, the possibility that polarity inversion occurs due to noise is high. In this case, by obtaining an average without updating the input pixel values, the appropriate average pixel value Ra of right pixels without noise can be obtained.

The case of calculating the average pixel value Ra of right pixels has been described above using the concrete example of FIG. 25. Also in the other cases, for example, in the case of calculating the average pixel value La of left pixels, the input pixel value of the pixel indicated by the point after polarity inversion is updated from the pixel value $\beta$ to the pixel value $\gamma$ similarly by the equation (5).

Referring again to FIG. 24, the number of taps (the number of pixel values) used in the case of calculating the average value in each of the average value calculators 92 to 94 is fixed in the above example. However, it may be varied, for example, according to the travel speed in the target pixel in the output signal of the imaging blur characteristic detector 12. Concretely, for example, it may be varied so as to increase the number of taps (that is, to increase the width of average) as the travel speed increases. The results of the average value calculators 92 to 94 using taps of the number according to the travel speed as described above are used by the correction amount determining unit 95 which will be described later, thereby enabling a correction amount for performing higher-precision correction, that is, correction capable of further suppressing the imaging blur to be determined.

The correction amount determining unit 95 determines the correction amount ADD by using the input pixel value N of the target pixel from the DL unit 91-(n/2), the average pixel value Na of the target pixel from the average value calculator 92, the average value La of left pixels from the average value calculator 93, and the average pixel value Ra of right pixels from the average value calculator 94, and supplies the correction amount ADD to the adder 96.

The adder 96 adds the correction amount ADD from the correction amount determining unit 95 to the input pixel value N of the target pixel from the DL unit 91-(n/2), and supplies the addition result as an output pixel value of the target pixel, that is, a corrected pixel value of the target pixel to the adder 82 on the outside of the ALTI unit 82.

Here, before explaining an example of a detailed functional configuration of the correction amount determining unit 95, the process of the ALTI unit 81 will be described with reference to the flowchart of FIG. 27.

In step S21, the ALTI unit 81 sets a target pixel.

In step S22, the DL units 91-1 to 91-n of the ALTI unit 81 obtain n pieces of neighboring input pixel values around the input pixel value N of the target pixel as a center.

In step S23, the average value calculator 92 of the ALTI unit 81 calculates the average pixel value Na of the target pixel and supplies it to the correction amount determining unit 95 as described above.

In step S24, the average value calculator 93 in the ALTI unit 82 calculates the average pixel value La of left pixels and supplies it to the correction amount determining unit 95 as described above.

In step S25, the average value calculator 94 in the ALTI unit 82 calculates the average pixel value Ra of right pixels and supplies it to the correction amount determining unit 95 as described above.

In addition, as obvious from FIG. 24, each of the average value calculators 92 to 94 executes the process independently of others. Therefore, the order of processes in the steps S23 to S25 is not limited to the example of FIG. 27 but may be arbitrary order. That is, in reality, the processes in the steps S23 to S25 are executed in parallel and independently of others.

In step S26, the correction amount determining unit 95 in the ALTI 82 determines two candidates ADDL and ADDR of the correction amount by using the input pixel value N of the target pixel from the DL unit 91-(n/2), the average pixel value La of left pixels from the average value calculator 93, and the average pixel value Ra of right pixels from the average value calculator 94. That is, the process of step S26 is the above-described candidate determining process. The candidates ADDL and ADDR of the correction amount are output signals from subtractors 101 and 102 which will be described later. As for the details of the candidate determining process in step S26 and the candidates ADDL and ADDR of the correction amount will be described later.

In step S27, the correction amount determining unit 95 determines the adjustment amount c by using the average pixel value Na of the target pixel from the average value calculator 92, the average pixel value La of the left pixels from the average value calculator 93, and the average pixel value Ra of the right pixels from the average value calculator 94. That is, the process in step S27 is the above-described adjustment amount determining process. The adjustment amount c denotes an output signal of the adjustment amount value calculator 109 which will be described later. The details of the adjustment amount determining process in step S27 and the adjustment amount c will be described later.

Furthermore, as the details will be described later, in reality, the processes in the steps S26 and S27 are executed in parallel and independently of each other. That is, the order of the processes in the steps S26 and S27 is not limited to the example of FIG. 27 but may be arbitrary order.

In step S28, the correction amount determining unit 95 adjusts each of the values of the candidates ADDL and ADDR by using the adjustment amount c. In the following, the process in the step S28 will be called the adjusting process. The details of the adjusting process will be described later.

In step S29, the correction amount determining unit 95 determines (selects), as the correction amount ADD, predetermined one of the candidates ADDL and ADDR whose values are adjusted by the adjustment amount c in accordance with a predetermined discrimination condition, and supplies the correction amount ADD to the adder 96. In the following, the process in the step S29 will be called a correction amount selecting process. The details (including the discrimination condition) of the correction amount selecting process will be described later.

In step S30, the adder 96 in the ALTI unit 81 adds the correction amount ADD to the input pixel value N of the target pixel and outputs the resultant value as the output pixel value of the target pixel to the adder 82 on the outside.

In step S31, the ALTI unit 81 determines whether the process has been completed on all of the pixels or not.

In the case where it is determined in the step S31 that the process has not been finished yet on all of the pixels, the process returns to the step S21, and the following processes are repeated. Specifically, next time, another pixel is set as the target pixel, the correction amount ADD is added to the input pixel value N of the target pixel, and the resultant addition value is output as the output pixel value of the target pixel to the adder 82 on the outside. Naturally, each of the pixel value N and the correction amount ADD often varies among the pixels.

After all of the pixels are set as the target pixels and the loop process in the steps S21 to S31 is repeatedly executed for each of the set target pixels as above, it is determined in step S31 that the process on all of the pixels is finished and the process of the ALTI unit 81 is finished.

Figure 27:
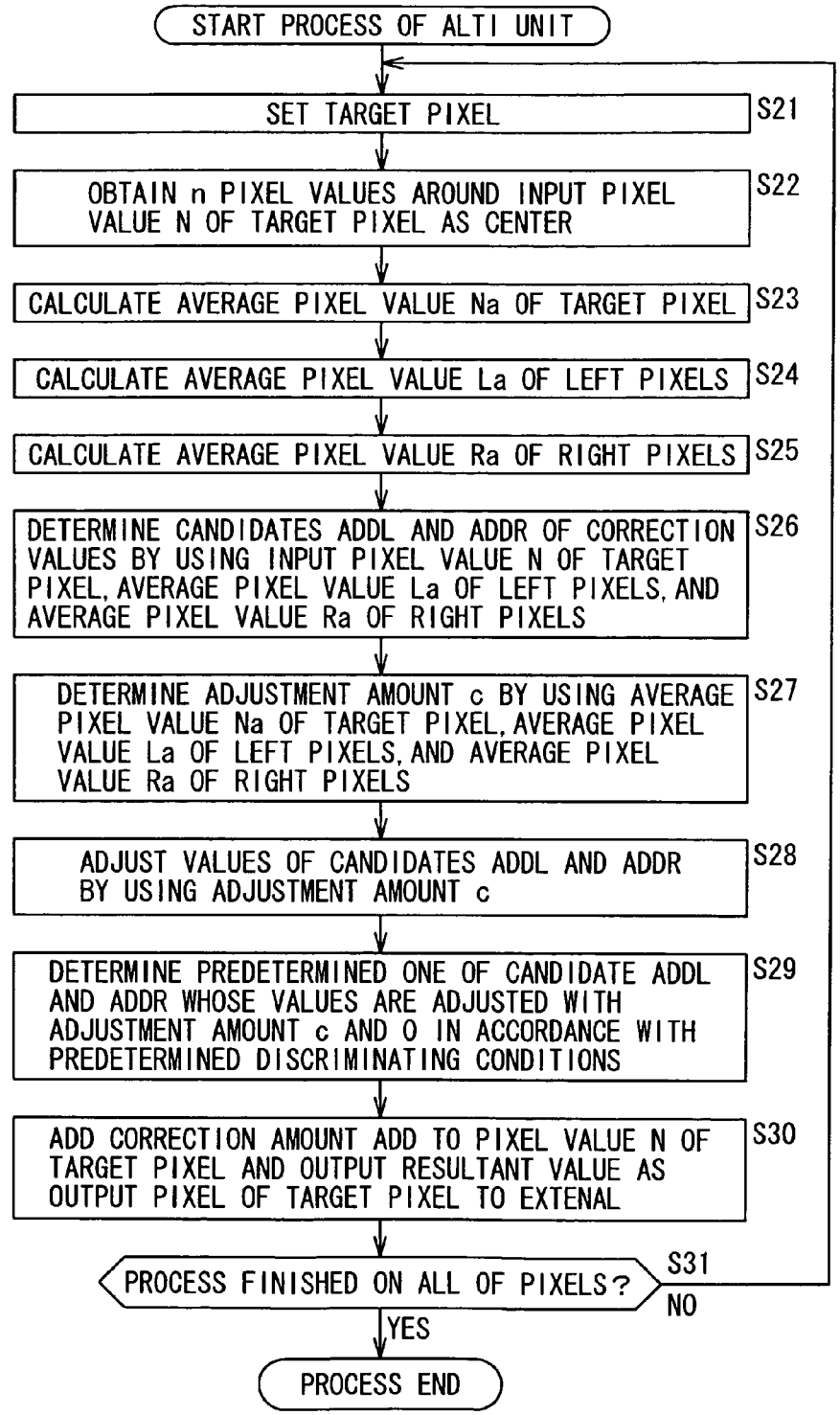
FIG. 27 A flowchart explaining an example of processes of the ALTI unit of FIG. 24.

In this case, since the ALTI unit 81 is a component of the imaging blur suppression processor 13 in FIG. 13, the process of the ALTI unit 81 in FIG. 27 is executed as a part of the process of the step S4 in FIG. 15.

As described above, the correction amount determining unit 95 executes the processes in the steps S26 to S29. Therefore, referring again to FIG. 24, while describing an example of the detailed functional configuration of the correction amount determining unit 95, the details of the processes in the steps S26 to S29 will be also described.

As shown in FIG. 24, the correction amount determining unit 95 is provided with the adders 101 and 102 in order to execute the above-described candidate determining process in the step S26 in FIG. 27. In other words, the candidate determining unit 121 constructed by the subtractors 101 and 102 executes the candidate determining process in the step S26.

The subtractor 101 calculates the differential value (=La−N) between the average pixel value La of left pixels from the average value calculator 93 and the input pixel value N of the target pixel from the DL unit 91-(n/2) and supplies the differential value as the candidate ADDL of the correction amount to a multiplier 110.

Furthermore, as will be described later, in the case where the candidate ADDL of the correction amount is determined as the correction amount ADD without being adjusted (multiplied with the adjustment amount c=1), the adder 96 adds the correction amount ADD(=La−N) to the input pixel value N of the target pixel and the resultant value (=La) is output to the outside. That is, in the case where the candidate ADDL (=La−N) of the correction amount is used as it is as the correction amount ADD, the pixel value of the target pixel is corrected (replaced) from the original pixel value N to the average pixel value La of left pixels.

The subtractor 102 calculates the differential value (=Ra−N) between the average pixel value Ra of right pixels from the average value calculator 94 and the input pixel value N of the target pixel from the DL unit 91-(n/2) and supplies the differential value as the candidate ADDR of the correction amount to a multiplier 111.

Furthermore, as will be described later, in the case where the candidate ADDR of the correction amount is determined as the correction amount ADD without being adjusted (multiplied with the adjustment amount c=1), the adder 96 adds the correction amount ADD(=Ra−N) to the input pixel value N of the target pixel and the resultant addition value (=Ra) is output to the outside. That is, in the case where the candidate ADDR (=Ra−N) of the correction amount is used as it is as the correction amount ADD, the pixel value of the target pixel is corrected (replaced) from the original pixel value N to the average pixel value Ra of right pixels.

In addition, as shown in FIG. 24, the correction amount determining unit 95 is provided with components from a subtractor 103 to an adjustment amount value calculator 109 in order to execute the adjustment amount determining process in the step S27 in FIG. 27. In other words, an adjustment amount determining unit 122 constructed by the subtractor 103 to the adjustment amount determining unit 109 executes the adjustment amount determining process in the step S27.

The subtractor 103 calculates the differential value (=Na−La) between the average pixel value Na of the target pixel from the average value calculator 92 and the average pixel value La of left pixels from the average value calculator 93 and supplies the differential value to an adder 105.

The subtractor 104 calculates the differential value (=Na−Ra) between the average pixel value Na of the target pixel from the average value calculator 92 and the average pixel value Ra of right pixels from the average value calculator 94 and supplies the differential value to the adder 105.

The adder 105 calculates the sum of output signals of the subtractors 103 and 104 and outputs the calculation result to an ABS unit 106.

The ABS unit 106 calculates an absolute value b of the output signal of the adder 105 and supplies the absolute value b to a divider 108.

In other words, in a plane using the pixel values as the vertical axis and using pixel positions in the horizontal direction as the horizontal axis, a quadratic differential value at a second point on a line connecting a first point indicative of the average pixel value La of left pixels, the second point indicative of the average pixel value Na of the target pixel, and a third point indicative of the average pixel value Ra of right pixels is computed by the subtractors 103 and 104 and the adder 105. The absolute value b of the quadratic differential value is computed by the ABS unit 106, and supplied to the divider 108. Therefore, the absolute value b output from the ABS unit 106 will be called the quadratic differential absolute value b below.

In the case where a straight line connecting the first point indicative of the average pixel value La of left pixels and the third point indicative of the average pixel value Ra of right pixels is used as a boundary line, the quadratic differential value b is a value indicative of the distance of the second point indicative of the average pixel value Na of the target pixel from the boundary line in the vertical axis direction.

Consequently, the correction amount determining unit 95 adjusts each of the values of the candidates ADDL and ADDR of the correction amount in accordance with the magnitude of the quadratic difference absolute value b, and determines one of the candidates ADDL and ADDR as the correction amount ADD. That is, when the adder 96 outputs, as the output pixel value of the target pixel, the addition value between the input pixel value N of the target pixel and the correction amount ADD adjusted according to the magnitude of the quadratic differential absolute value b, an edge portion in the output signal (the frame to be processed) of the adder 96 can be made gentle.

However, even if the quadratic differential absolute values b are the same, when the absolute value h of the difference between the average pixel value La of left pixels and the average pixel value Ra of right pixels, that is, the distance h between the first and third points in the vertical axis direction in the above-described plane (hereinbelow, called height h) varies, the meaning of the magnitude of the quadratic differential absolute value b naturally varies. Specifically, even if the quadratic differential absolute value b is the same, in the case where the magnitude is much smaller than the height h, in other words, in the case where a division value (=b/h) obtained by dividing the quadratic differential value b by the height h is small, it can be determined that the possibility of occurrence of noise around the target pixel is high. On the other hand, even if the quadratic differential absolute values b are the same, in the case where the magnitude is not so small as compared with the height h, in other words, in the case where the division value (=b/h) has certain magnitude or more, it can be determined that the possibility of occurrence of noise around the target pixel is low.

Therefore, if the values of the candidates ADDL and ADDR are adjusted according to the simple magnitude of the quadratic differential absolute value b, the correction amount ADD of the input pixel value N of the target pixel becomes the same value irrespective of whether noise occurs or not. Thus, a new issue occurs such that the input pixel value N of the target pixel may not be properly corrected.

Therefore, to solve the new issue, the adjustment amount determining unit 122 of the correction amount determining unit 95 of the embodiment is provided with the components from the subtractor 103 to the ABS unit 106 and, in addition, a difference absolute value calculator 107, the divider (b/h calculator) 108, and the adjustment amount value calculator 109.

The differential absolute value calculator 107 calculates the difference value between the average pixel value La of left pixels from the average value calculator 93 and the average pixel value Ra of right pixels from the average value calculator 94, further calculates the absolute value h (h=|La−Na|) of the difference value, that is, the height h, and supplies the height h to the divider 108.

The divider 108 divides the quadratic differential absolute value b from the ABS unit 106 by the height h from the difference absolute value calculator 107 and provides the division value (=b/h) to the adjustment amount value calculator 109. That is, the division value (=b/h) can be said as a value obtained by normalizing the quadratic differential absolute value b by the height h. Therefore, the division value (=b/h) will be called a normalized quadratic differential value (=b/h).

The adjustment amount value calculator 109 calculates the adjustment amount c for the candidates ADDL and ADDR on the basis of the normalized quadratic differential value (=b/h) from the divider 108, and supplies it to the multipliers 110 and 111.

Figure 28:
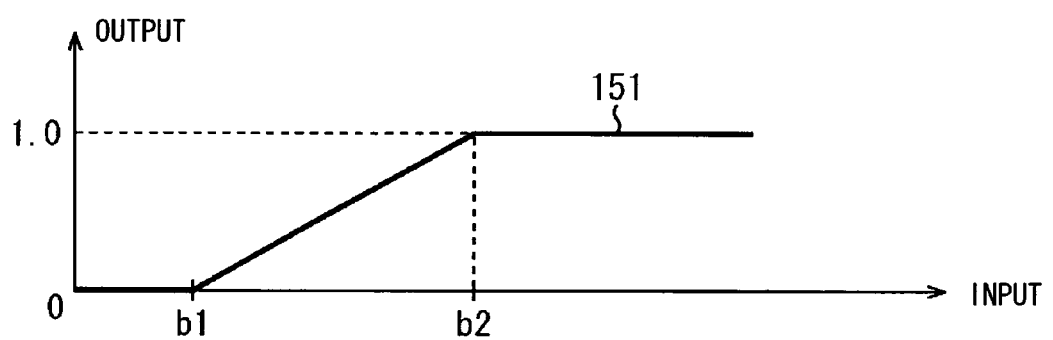
FIG. 28 A diagram showing an example of the characteristic of an adjustment amount value calculator in the ALTI unit of FIG. 24.

Specifically, for example, the adjustment amount value calculator 109 holds a function of the characteristic expressed by a curve 151 in FIG. 28, assigns the normalized quadratic differential value (=b/h) from the divider 108 as an input parameter to the function, and supplies an output of the function (output of FIG. 28) as the adjustment amount c to the multipliers 110 and 111.

That is, as easily understood from the shape of the curve 151 of FIG. 28, when the normalized quadratic differential value (=b/h) is smaller than a predetermined value b1, the possibility of noise is regarded as high, and the adjustment amount c (output) becomes zero. In this case, as will be described later, the candidates ADDL and ADDR are adjusted by being multiplied by zero as the adjustment amount c, so that each of the adjusted candidates ADDL and ADDR becomes zero. Therefore, the correction amount ADD also becomes zero, and the input pixel value N of the target pixel is not corrected.

Further, when the normalized quadratic differential value (=b/h) exceeds the predetermined value b1 and increases, the adjustment amount c (output) also increases gradually. In this case, as will be described later, each of the candidates ADDL and ADDR is adjusted by being multiplied by the adjustment amount c which is less than 1, so that each of the adjusted candidates ADDL and ADDR becomes smaller than the original value. Therefore, the correction amount ADD becomes one of the candidates ADDL and ADDR which became smaller than the original values. The corrected pixel value of the target pixel becomes larger than the average pixel value La of left pixels or smaller than the average pixel value Ra of right pixels.

Further, when the normalized quadratic differential value (=b/h) becomes a predetermined value b2 or larger, the adjustment amount c (output) becomes 1 hereafter. In this case, as will be described later, each of the candidates ADDL and ADDR is adjusted by being multiplied with 1 as the adjustment amount c, so that each of the adjusted candidates ADDL and ADDR becomes the original value (that is, not adjusted). Therefore, the correction amount ADD becomes one of the candidates ADDL and ADDR remaining as the original values. As described above, the corrected pixel value of the target pixel becomes the average pixel value La of left pixels or the average pixel value Ra of right pixels.

As described above, in the present embodiment, the adjustment amount c is determined using the function of the characteristic expressed by the line 151 of FIG. 28, to which the normalized quadratic differential value (=b/h) is input as a parameter. Consequently, by adjusting the correction amount ADD with the adjustment amount c (to be accurate, by adjusting the candidates ADDL and ADDR of the correction amount), the edge portion in the output signal (the frame to be processed) of the adder 96 can be made gentle. Specifically, in the LTI of related art, the pixel value of the target pixel is corrected by switching of a hard switch (simple replacement of the pixel value). There is consequently an issue that the edge portion in the output signal may not be made gentle. However, by employing the ALTI unit 81 of the embodiment, the issue can be solved.

Referring again to FIG. 24, the detailed description of the correction amount determining unit 95 will be continued. Specifically, the correction amount determining unit 95 is provided with the multipliers 110 and 111 in order to execute the adjusting process in the step S28 in FIG. 27. In other words, an adjusting unit 123 constructed by the multipliers 101 and 111 executes the adjusting process in the step S28.

The multiplier 110 multiplies the candidate ADDL from the subtractor 101 with the correction amount c from the adjustment amount value calculator 109, and supplies the resultant multiplied value as the adjusted candidate ADDL to a discriminator 113.

The multiplier 111 multiplies the candidate ADDR from the subtractor 102 with the correction amount c from the adjustment amount value calculator 109, and supplies the resultant multiplied value as the adjusted candidate ADDR to the discriminator 113.

In addition, the correction amount determining unit 95 is also provided with a fixed value generator 112 and the discriminator 113 in order to execute the correction amount selecting process in the step S29 in FIG. 27. In other words, a correction amount selecting unit 124 constructed by the fixed value generator 112 and the discriminator 113 executes the correction amount selecting process in the step S29.

In the embodiment, the fixed value generator 112 usually generates "0" as shown in FIG. 24 and supplies it to the discriminator 113.

To the discriminator 113, output signals of the subtractors 103 and 104, the adder 105, the multipliers 110 and 111, and the fixed value generator 112 are supplied. The discriminator 113 selects (determines), as the correction amount ADD, predetermined one of "0" from the fixed value generator 112, the corrected candidate ADDL from the multiplier 110, and the corrected candidate ADDR from the multiplier 111 on the basis of a predetermined selecting condition using output signals of the subtractors 103 and 104 and the adder 105, and supplies the correction amount ADD to the adder 96.

Concretely, for example, in a plane using the pixel values as the vertical axis and using pixel positions in the horizontal direction as the horizontal axis, a straight line connecting a first point indicative of the average pixel value La of left pixels and a third point indicative of the average pixel value Ra of right pixels is set as a boundary line. The selecting condition of the embodiment is specified that the corrected candidate ADDR is selected as the correction amount ADD in the case where the change direction of the boundary line is an upward direction and a second point indicative of the average pixel value Na of the target pixel is disposed on the upper side of the boundary line. On the contrary, the selecting condition of the embodiment is specified that the corrected candidate ADDL is selected as the correction amount ADD in the case where the change direction of the boundary line is an upward direction and the second point is disposed on the lower side of the boundary line.

In this case, the discriminator 113 can recognize the change direction of the boundary line and the positional relation between the boundary line and the second point on the basis of the output signals of the subtractors 103 and 104 and the adder 105.

Therefore, for example, in the case where the discriminator 113 recognizes that the change direction of the boundary line is an upward direction and the second point is disposed on the upper side of the boundary line on the basis of the output signals of the subtractors 103 and 104 and the adder 105, the discriminator 113 selects (determines) the corrected candidate ADDR from the multiplier 111 as the correction amount ADD and supplies it to the adder 96.

On the other hand, for example, in the case where the discriminator 113 recognizes that the change direction of the boundary line is an upward direction and the second point is disposed on the lower side of the boundary line on the basis of the output signals of the subtractors 103 and 104 and the adder 105, the discriminator 113 selects (determines) the corrected candidate ADDL from the multiplier 110 as the correction amount ADD and supplies it to the adder 96.

It is also assumed that, in the case where the target pixel is positioned in a location other than an edge portion for example, selection of 0 as the correction amount ADD is specified as a selecting condition of the embodiment. In this case, when the discriminator 113 recognizes that all of the output signals of the subtractors 103 and 104 and the adder 105 are almost zero, that is, when the average pixel value La of left pixels, the input pixel value N of the target pixel, and the average pixel value Rc of right pixels are almost the same or the like, the discriminator 113 recognizes that the target pixel is positioned in a location other than the edge portion, selects (determines) "0" from the fixed value generator 112 as the correction amount ADD, and supplies it to the adder 96.

As an embodiment of the ALTI unit 81, the ALTI unit 81 having the functional configuration of FIG. 24 has been described above. As long as processes equivalent to the above-described series of processes can be executed, any functional configuration may be used as the functional configuration of the ALTI unit 81. Concretely, for example, the ALTI unit 81 may have a functional configuration shown in FIG. 29. That is, FIG. 29 shows an example of a detailed functional configuration different from FIG. 24 of the ALTI unit 81.

Figure 29:
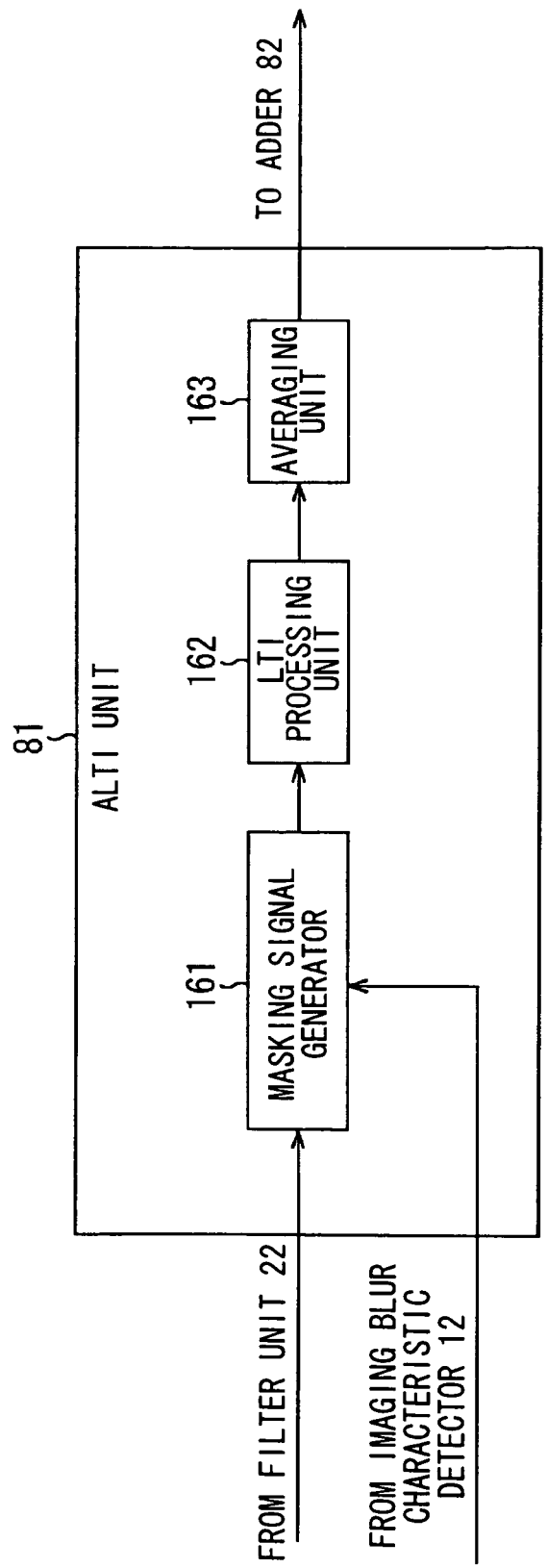
FIG. 29 A block diagram showing another example different from FIG. 12 of the functional configuration of the ALTI unit in the imaging blur compensating unit of FIG. 23.

In the example of FIG. 29, the ALTI unit 81 is configured to have a masking signal generator 161, an LTI processor 162, and an averaging unit 163.

The masking signal generator 161 receives the output signal of the filter unit 22 as own input signal and sequentially sets, as the target pixel, each of the pixels constructing the frame to be processed in the input signal. The masking signal generator 161 searches pixels on the left and right sides of the target pixel by the number of pixels corresponding to the half of the travel speed from the target pixel, and performs masking process on signals indicative of the pixel values of the number of pixels corresponding to the travel speed. The travel speed of the target pixel is supplied from the imaging blur characteristic detector 12 as described above. The masked signals are supplied from the masking signal generator 161 to the LTI processor 162.

The LTI processor 162 performs the LTI process on each of the masked signals and supplies, as an output signal, the resultant signal to the averaging unit 163.

The averaging unit 163 averages signals of the number corresponding to the number of search times in the masking signal generator 161, in the output signals of the LTI processor 162 and supplies the resultant signal as an output signal of the ALTI unit 81 to the adder 82 on the outside.

Referring to FIGS. 24 to 29, the details of the ALTI unit 81 in the imaging blur compensating unit 23 in FIG. 23 have been described above.

Next, referring to FIGS. 30 and 31, details of the gain controller 83 in the imaging blur compensating unit 23 in FIG. 23 will be described.

Figure 30:
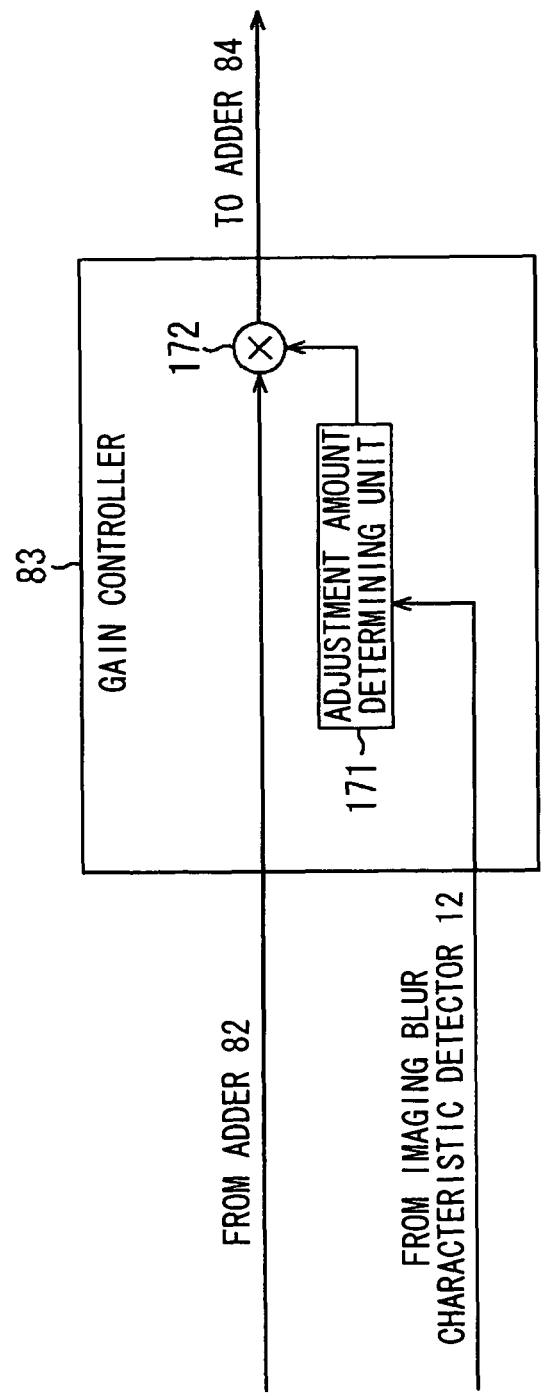
FIG. 30 A block diagram showing an example of the functional configuration of the gain controller in the imaging blur compensating unit in FIG. 23.

FIG. 30 shows an example of the detailed functional configuration of the gain controller 83. FIG. 31 shows the characteristic of an adjustment amount determining unit 171 which will be described later in the gain controller 83 in FIG. 30.

In the example of FIG. 30, the gain controller 83 is configured to have the adjustment amount determining unit 171 and a multiplier 172.

Figure 31:
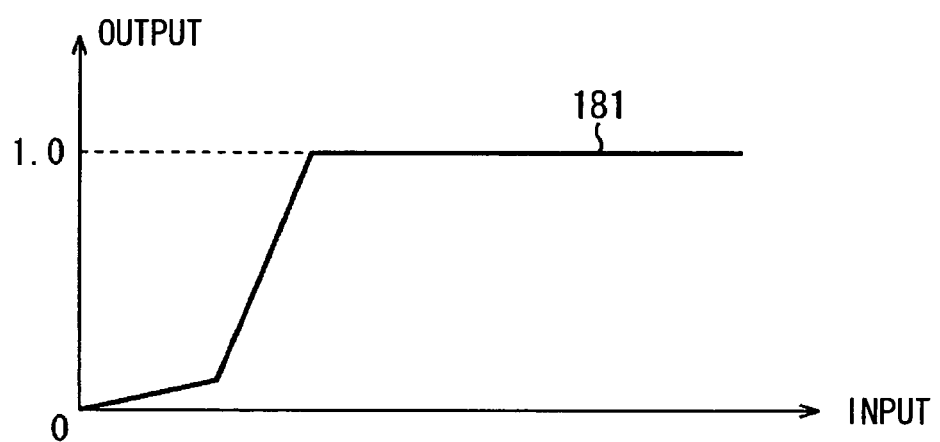
FIG. 31 A diagram showing an example of the characteristic of the adjustment amount determining unit in the gain adjusting unit in FIG. 30.

The adjustment amount determining unit 171 holds a function expressed by a curve 181 in FIG. 31, assigns travel speed in the target pixel supplied from the imaging blur characteristic detector 12 as an input parameter to the function, and supplies an output of the function (output of FIG. 31) as an adjustment amount to the multiplier 172. In other words, the adjustment amount determining unit 171 has the characteristic expressed by the curve 181 of FIG. 31.

To the multiplier 172, an adjustment amount from the adjustment amount determining unit 171 and, in addition, an output signal of the adder 82 are also supplied. As obvious from the functional configuration of FIG. 23, an output signal of the adder 82 is a candidate of a final correction amount added to an input pixel value of a target pixel for the imaging blur compensating unit 23, in the adder 84. Specifically, the multiplier 172 multiplies the candidate of the final correction amount with the adjustment amount from the adjustment amount determining unit 171 and supplies the resultant multiplied value, as the final adjustment amount, to the adder 84.

That is, as easily understood from the shape of the line 181 in FIG. 31 and the functional configuration of FIG. 23 of the imaging blur compensating unit 23, the gain controller 83 prevents the final correction amount of the pixel value of the target pixel to be excessively influenced by the process result (hereinafter called as ALTI) of the ALTI unit 81 when the travel speed is low. When the travel speed is low, deterioration in the gain due to imaging blur is small, and it is sufficient to increase the attenuated gain by the filter unit 22 in FIGS. 17 and 20. That is, it is sufficient to output the output signal of the filter unit 22 as a final output signal of the imaging blur compensating unit 23 without performing much correction on the output signal.

Referring to FIGS. 17 to 31, an example of the imaging blur suppression processor 13 in the video signal processor 4B in FIG. 13 has been described above.

However, the functional configuration of the imaging blur suppression processor 13 is not limited to the example of FIG. 17, but may be variously modified. Concretely, for example, FIGS. 32 and 33 show two examples of the functional configuration of the imaging blur suppression processor 13 to which the present invention is applied, and the two examples are different from the example of FIG. 17.

Figure 32:
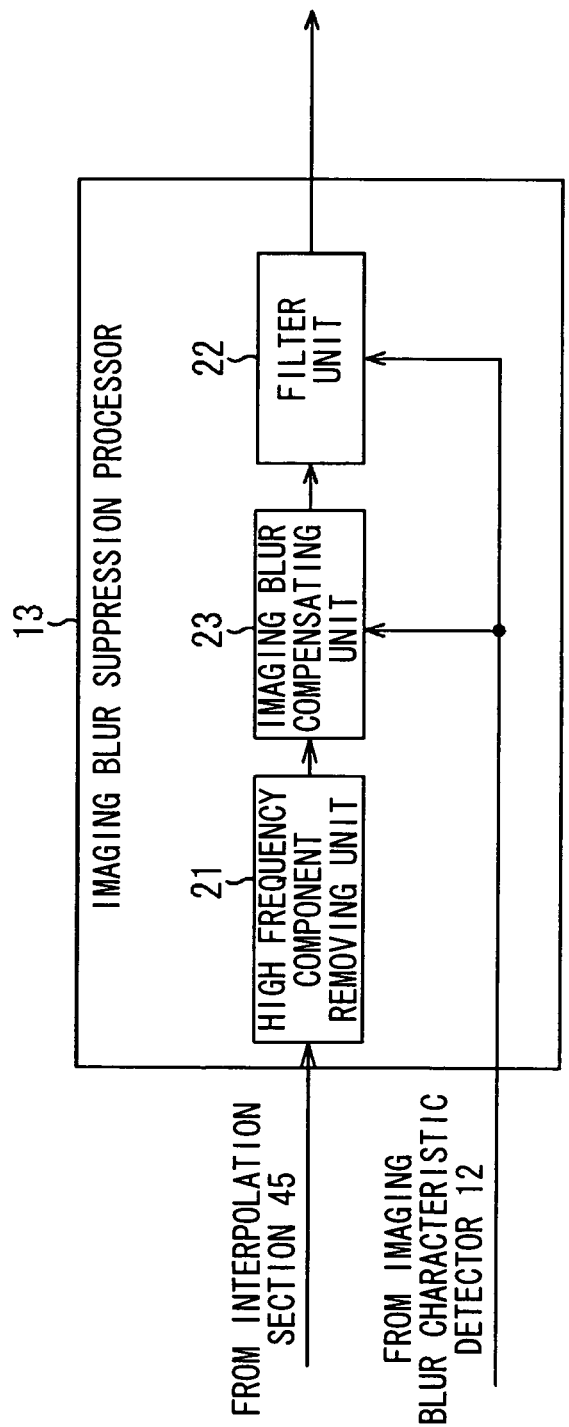
FIG. 32 A block diagram showing an example different from FIG. 17 of the functional configuration of the imaging blur suppression processor in the video signal processor of FIG. 13.
Figure 33:
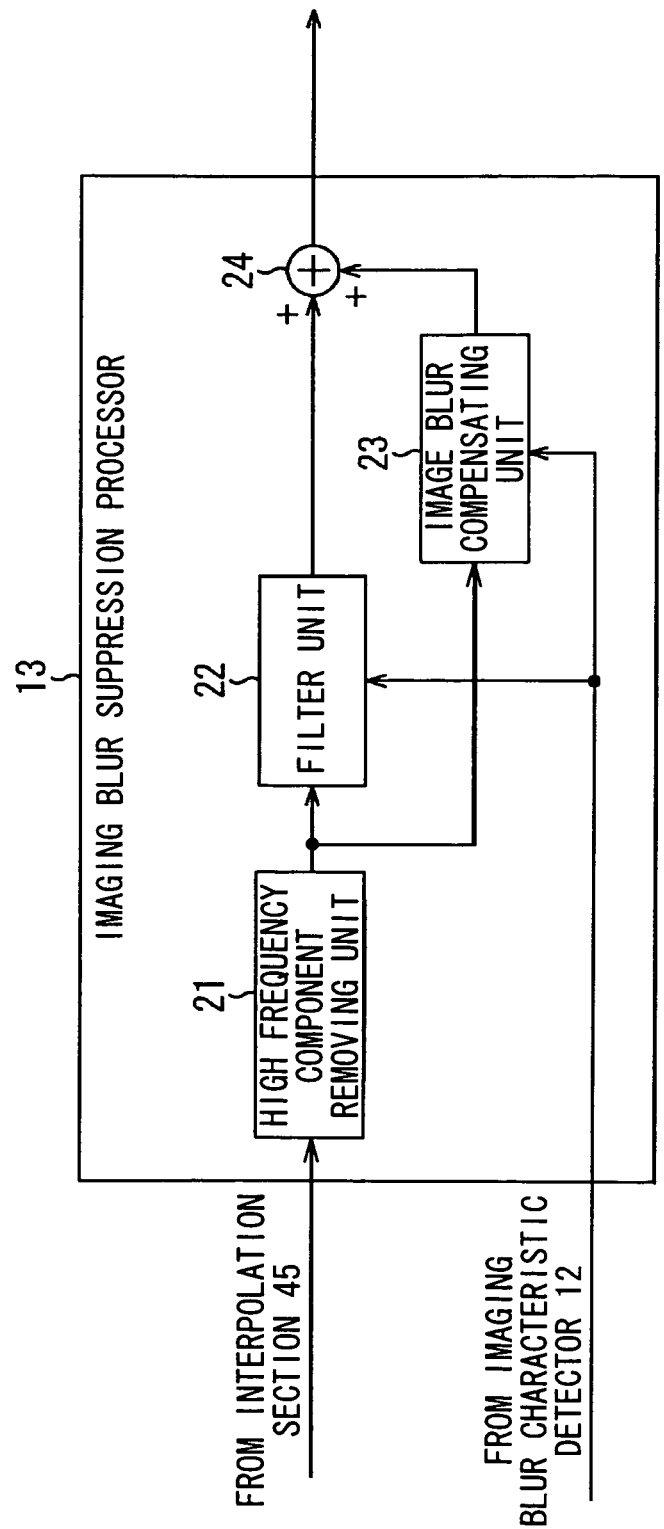
FIG. 33 A block diagram showing an example different from FIGS. 17 and 32 of the functional configuration of the imaging blur suppression processor in the video signal processor of FIG. 13.

In the example of FIG. 32, in a manner similar to the example of FIG. 17, the imaging blur suppression processor 13 is configured to have the high frequency component removing unit 21, the filter unit 22, and the imaging blur compensating unit 23.

Also in the example of FIG. 32, in a manner similar to the example of FIG. 17, an output signal of the interpolation section 45 is supplied as an input signal to the imaging blur suppression processor 13 to the high frequency component removing unit 21. An output signal of the imaging blur characteristic detector 12 is supplied to the filter unit 22 and the imaging blur compensating unit 23.

However, in the example of FIG. 32, an output signal of the high frequency component removing unit 21 is supplied to the imaging blur compensating unit 23. An output signal of the imaging blur compensating unit 23 is supplied to the filter unit 22. An output signal of the filter unit 22 is output as an output signal indicative of the final process result of the imaging blur suppression processor 13 to the outside.

In other words, in the example of FIG. 32, the disposing positions of the filter unit 22 and the imaging blur compensating unit 23 are opposite to those in the example of FIG. 17. That is, the order of disposing positions of the filter unit 22 and the imaging blur compensating unit 23 (the process order) is not limited. Either of the units may be disposed first.

Further, in the example of FIG. 33, like in the examples of FIGS. 17 and 32, the imaging blur suppression processor 13 is provided with the high frequency component removing unit 21, the filter unit 22, and the imaging blur compensating unit 23 and further, in addition to the functional blocks, is also provided with an adder 24.

Also in the example of FIG. 33, like in the examples of FIGS. 17 and 32, an output signal of the interpolation section 45 is supplied as an input signal for the imaging blur suppression processor 13 to the high frequency component removing unit 21. Further, an output signal of the imaging blur characteristic detector 12 is supplied to each of the filter unit 22 and the imaging blur compensating unit 23.

However, in the example of FIG. 33, an output signal of the high frequency component removing unit 21 is supplied to each of the filter unit 22 and the imaging blur compensating unit 23. Output signals of the filter unit 22 and the imaging blur compensating unit 23 are supplied to the adder 24. The adder 24 adds the output signal of the filter unit 22 and the output signal of the imaging blur compensating unit 23, and outputs the resultant addition signal as an output signal indicative of the final process result of the imaging blur suppression processor 13 to the outside.

In other words, the filter unit 22 and the imaging blur compensating unit 23 are arranged in series in the examples of FIGS. 17 and 32 but are arranged in parallel in the example of FIG. 33. That is, the filter unit 22 and the imaging blur compensating unit 23 may be arranged in series or in parallel. However, if both of the filter unit 22 and the imaging blur compensating unit 23 use a line memory, by arranging the filter unit 22 and the imaging blur compensating unit 23 in parallel as shown in the example of FIG. 33, the line memory can be shared. As a result, an effect such that the circuit scale (by the amount of the line memory) can be reduced is produced.

As described above, at the time of reducing a blur of a moving body at the time of image capturing (imaging blur) by image process, in the conventional technique, the process is performed uniformly irrespective of the stationary state and the degree of the blur amount. In contrast, in the present invention, for example, by using the imaging blur suppression processor 13, a travel vector (travel speed) is calculated, and an enhancement amount is changed according to the state of a moving image. Thus, without making ringing occur, the blur can be reduced. Further, in the LTI of related art, the signal is switched by the hard switch, so that a processed image is often broken. However, the imaging blur suppression processor 13 has the ALTI unit 81 as a component. Consequently, a signal can be gently switched and, as a result, breakage of the processed image can be suppressed.

In addition, in the above-described example, for simplicity of explanation, the direction of the travel vector (travel direction) is the horizontal direction. However, even when the travel direction is another direction, the imaging blur suppression processor 13 can basically perform similar processes as the series of processes described above. Specifically, regardless of the travel direction, the imaging blur suppression processor 13 can correct the pixel value of the target pixel so as to suppress the imaging blur. Concretely, for example, it is sufficient for the ALTI unit 81 in the functional configuration of FIG. 24 to enter the pixel values of n pixels arranged successively in the travel direction (for example, the vertical direction) using the target pixel as a center in the arrangement order to the DL unit 91-1. In the other functional blocks as well, operations are similarly performed.

Incidentally, in the above-described example, at the time of correcting the pixel values, the imaging blur suppression processor 13 uses the travel speed (the absolute value of the travel vector) as a parameter. Other than the travel speed, as long as the parameter shows the characteristic of an imaging blur, an arbitrary parameter can be used.

Concretely, for example, the imaging blur suppression processor 13 can use, as a parameter showing the characteristic of an imaging blur, shutter speed of a camera at the time of capturing a moving image to be processed can be used. The reason is that, for example, as shown in FIG. 34, when the shutter speed varies, the degree of an imaging blur also varies by the amount of time Ts in the diagram.

Figure 34:
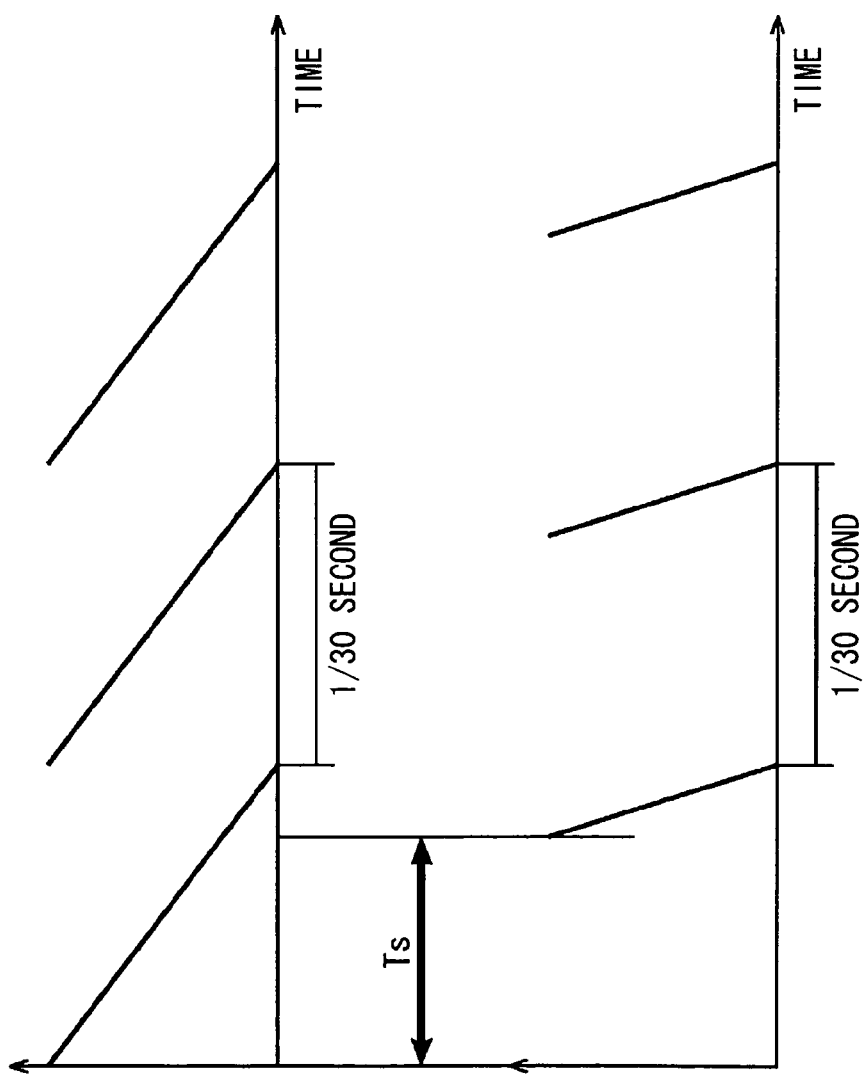
FIG. 34 A diagram illustrating shutter speed of a camera and the characteristic of an imaging blur.

Specifically, in FIG. 34, the upper diagram shows the case where the shutter speed is ⅟30 second which is the same as the frame speed. The lower diagram shows the case of the shutter speed of (⅟30-Ts) second that is faster than the frame speed. In both of the diagrams of FIG. 34, the horizontal axis expresses the time base, and the vertical axis expresses the ratio of shutter open time. For example, the ratio of the shutter open time is expressed as $(Ts/Vs) \times 100[\%]$ where the shutter speed is Va [seconds] (Va is an arbitrary value of 0 or larger), the ratio of first time when the shutter is open is set as 0%, the ratio of second time after lapse of V [seconds] from the first time and the shutter is closed is set as 100%, and time from the first time to present time is expressed as Ta [seconds] (Ta is an arbitrary positive value from 0 to V or less). In this case, in the vertical axis of the diagrams in FIG. 23, the value which is in contact with the time base is 100[%], and the maximum value (the highest value on each of straight lines) is 0[%]. That is, the ratio of the shutter open time increases toward the bottom in the vertical axis of the diagrams in FIG. 34.

It is assumed that one detecting element in a camera now corresponds to a pixel in a frame, for example. In this case, as shown in the upper diagram of FIG. 34, when the shutter speed is ⅟30 second, an integrated value of light incident in ⅟30 second in which the shutter is open is output as a pixel value of the corresponding pixel from one detecting element in the camera. On the other hand, when the shutter speed is (1/30-Ts) second, an integrated value of light incident in (1/30-Ts) second in which the shutter is open is output as a pixel value of the corresponding pixel from one detecting element in the camera.

That is, the shutter speed corresponds to light accumulation time (exposure time) in a detecting element. Therefore, for example, when a moving object crossing a predetermined element exists in a real space, light different from light corresponding to the object, for example, light of the background incident on the detecting element at the shutter speed of 1/30 second is larger than that at the shutter speed of (1/30-Ts) second by the amount of time Ts [second]. Thereby, the ratio that the light accumulation value of the background or the like different from the object mixed in the pixel value output from one detecting element at the shutter speed of 1/30 second is higher than that at the shutter speed of (1/30-Ts) second. As a result, the degree of an imaging blur increases.

The description above is summarized as follows. The lower the shutter speed becomes, the higher the degree of image blur becomes. It can be therefore said that the shutter speed expresses a characteristic of an imaging blur. Therefore, the shutter speed can be used as a parameter expressing a characteristic of an imaging blur as well as the travel speed.

In addition, in the case where the shutter speed is used as a parameter showing a characteristic of an imaging blur, the imaging blur characteristic detector 12 in FIG. 13 can detect the shutter speed of each frame by analyzing header information added to a moving image (data) supplied from the interpolation section 45 and the like, and supply the shutter speed as a parameter expressing a characteristic of the imaging blur to the imaging blur suppression processor 13. The imaging blur suppression processor 13 can properly correct each pixel value by executing, for example, the series of processes using the shutter speed in place of the travel speed. The functional configuration of the imaging blur suppression processor 13 in the case of using the shutter speed can be basically the same as that in the case of using the travel speed. That is, the imaging blur suppression processor 13 described with reference to FIGS. 17 to 31 can properly correct a pixel value by executing the series of processes using the shutter speed as a parameter value.

The video signal processor 4B having the configuration shown in FIG. 13 has been described above as an example of the video signal processor of the embodiment. However, the video signal processor of the embodiment is not limited to the example of FIG. 13 but may have other various configurations.

Concretely, for example, each of FIGS. 35 to 38 shows a block diagram of a part of a video signal processor as a modified example of the embodiment.

Figure 35:
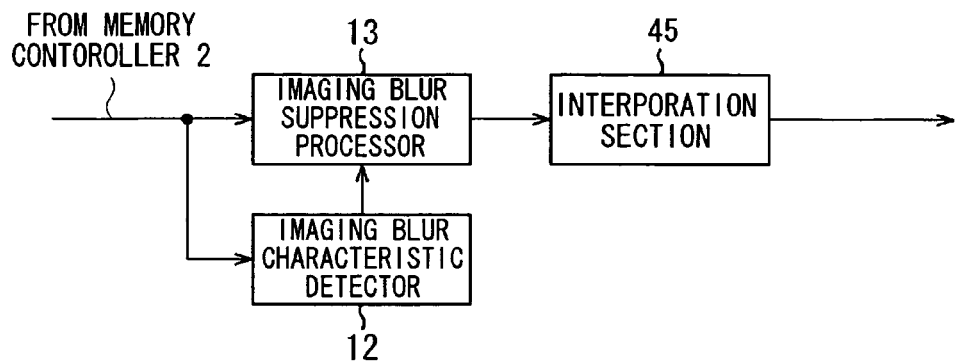
FIG. 35 A block diagram showing an example different from FIG. 13 of the configuration of a part of a video signal processor according to the second embodiment.

For example, a video signal, processor of FIG. 35 is configured to have, like the video signal processor 4B of FIG. 13, the interpolation section 45, the imaging blur characteristic detector 12, and the imaging blur suppression processor 13.

However, in the video signal processor of FIG. 35, an object of the correction process of the imaging blur suppression processor 13 is a moving image which is input to the video signal processor, that is, a moving image before it is subject to the high frame rate converting process of the interpolation section 45. Consequently, the imaging blur characteristic detector 12 detects the value of a parameter showing a characteristic of the imaging blur in the moving image prior to the high frame rate converting process of the interpolation section 45 and supplies the detection result to the imaging blur suppression processor 13.

Therefore, as the image process of the video signal processor of FIG. 35, the processes in the steps S1, S3, S4, S2, and S5 in the image processes in FIG. 15 are executed in the order.

Figure 36:
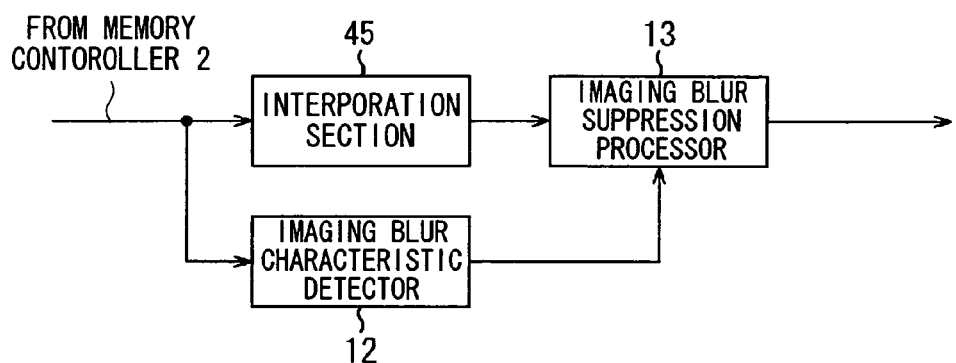
FIG. 36 A block diagram showing an example different from FIGS. 13 and 35 of the configuration of a part of the video signal processor of the second embodiment.

In addition, for example, a video signal processor of FIG. 36 is configured to have, like the video signal processor 4B of FIG. 13 and the video signal processor of FIG. 35, the interpolation section 45, the imaging blur characteristic detector 12, and the imaging blur suppression processor 13.

In the video signal processor of FIG. 36, an object of the correction process of the imaging blur suppression processor 13 is a moving image obtained by performing the high frame rate converting process of the interpolation section 45 on the input moving image like in the video signal processor 4B of FIG. 13. Consequently, the imaging blur suppression processor 13 performs a correcting process on the moving image subjected to the high frame rate converting process.

However, the imaging blur characteristic detector 12 in the video signal processor of FIG. 36 detects a parameter showing a characteristic of the imaging blur in the input moving image, that is, in the moving image prior to the high frame rate converting process of the interpolation section 45 and supplies the detection result to the imaging blur suppression processor 13. That is, the imaging blur suppression processor 13 of the video signal processor of FIG. 36 corrects each pixel value using the value of the parameter detected in the moving image prior to the high frame rate converting process.

Therefore, as the image process of the video signal processor of FIG. 36, the processes executed in a flow similar to that of the imaging process of FIG. 15, that is, the processes in the steps S1, S2, S3, S4, and S5 are executed in the order. However, the process in step S3 is a process of "detecting the value of a parameter showing a characteristic of the imaging blur from a moving image prior to the high frame rate converting process, that is, from each of frames constructing a moving image entered by the process in the step S1".

Figure 37:
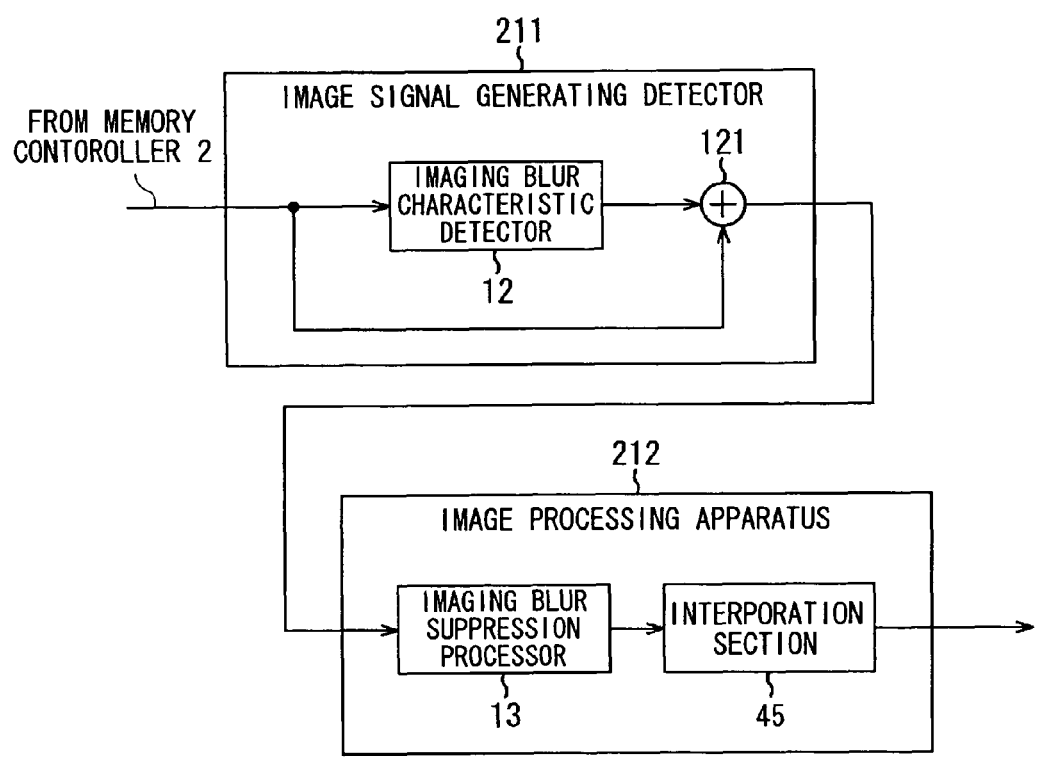
FIG. 37 A block diagram showing an example different from FIGS. 13, 35, and 36 of the configuration of a part of the video signal processor of the second embodiment.
Figure 38:
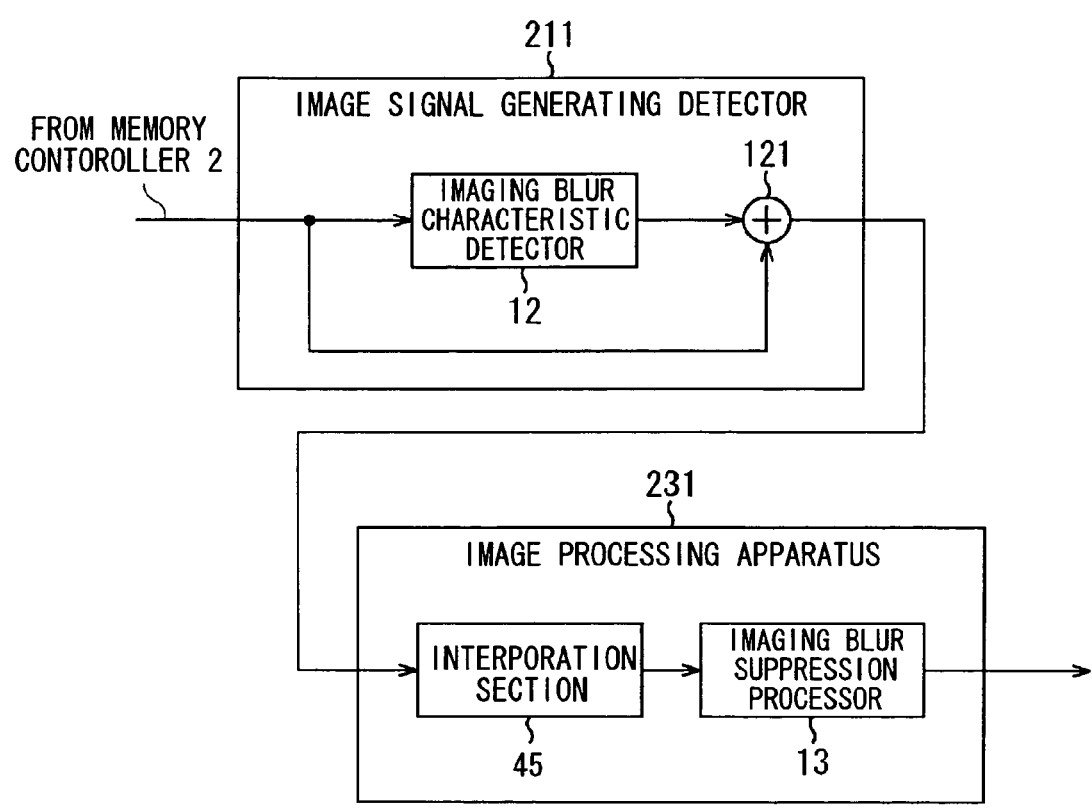
FIG. 38 A block diagram showing an example different from FIGS. 13, 35, 36, and 37 of the configuration of a part of the video signal processor of the second embodiment.

In contrast to the video signal processors of FIGS. 35 and 36, each of video signal processors of FIGS. 37 and 38 is configured to have the interpolation section 45 and the imaging blur suppression processor 13 and does not include the imaging blur characteristic detector 12 as a component.

Specifically, as shown in FIGS. 37 and 38, the imaging blur characteristic detector 12 is provided together with a superimposing unit 221 in another video signal processor 211 (hereinbelow, called an image signal generating apparatus 211 as described in the drawing). A moving image entered to the image signal generating apparatus 211 is supplied to the imaging blur characteristic detector 12 and the superimposing unit 221. The imaging blur characteristic detector 12 detects the value of a parameter expressing a characteristic of an imaging blur from the moving image and supplies it to the superimposing unit 221. The superimposing unit 221 superimposes the value of the parameter indicative of the characteristic of the imaging blur on the moving image and outputs a resultant signal.

Therefore, to the video signal processor of FIG. 37 and the video signal processor of FIG. 38, the moving image (signal) on which the value of the parameter expressing the characteristic of the imaging blur is superimposed is supplied from the image signal generating apparatus 211.

Therefore, for example, in the video signal processor of FIG. 37, the imaging blur suppression processor 13 separates the value of the parameter expressing the characteristic of the imaging blur and the moving image from each other, and corrects each of the pixel values on the basis of the separated value of the parameter expressing the characteristic of the imaging blur with respect to each of the frames constructing the separated moving image.

Next, the interpolation section 45 performs the high frame rate converting process on the moving image corrected by the imaging blur suppression processor 13 and outputs the resultant moving image, that is, the moving image converted to the high frame rate and corrected.

Therefore, as the image process of the video signal processor of FIG. 37, the processes in the steps S1, S4, S2, and S5 in the image processes in FIG. 15 are executed in the order.

In contrast, for example, in the video signal processor of FIG. 38, the interpolation section 45 separates the value of the parameter expressing the characteristic of the imaging blur and the moving image from each other, performs the high frame rate converting process on the separated moving image, and supplies the resultant moving image, that is, the moving image converted to high frame rate to the imaging blur suppression processor 13. At this time, the value of the parameter showing the characteristic of the imaging blur separated by the interpolation section 45 is also supplied to the imaging blur suppression processor 13.

Next, the imaging blur suppression processor 13 corrects each of the pixel values on the basis of the value of the parameter expressing the characteristic of the imaging blur with respect to each of the frames constructing the moving image converting to high frame rate, and outputs the resultant moving image, that is, the moving image corrected and converted to high frame rate.

Incidentally, in the above description on the imaging blur suppression processor 13, for simplicity of explanation, the travel direction (the direction of the travel vector) is the horizontal direction. Consequently, as a pixel used in the case of performing the above-described various processes such as the filtering and correction on the target pixel, pixels neighboring the target pixel in the horizontal direction are used. In this case, a process using pixels neighboring the target pixel in a predetermined direction will be called a process in the predetermined direction. That is, the above-described example relates to the process in the horizontal direction.

However, as described above, any direction in a two-dimensional plane can be the travel direction. Naturally, the imaging blur suppression processor 13 can execute the various processes in the same manner in any direction in a two-dimensional plane such as the vertical direction as the travel direction. However, to perform the process in the case where the travel direction is the vertical direction (or the process in the case where the travel direction is an oblique direction, which is a combination process of the process in the vertical direction and the process in the horizontal direction), the imaging blur suppression processor 13 has to employ, for example, the configuration of FIG. 39 in place of the configuration of FIG. 17, the configuration of FIG. 40 in place of the configuration of FIG. 32, and the configuration of FIG. 41 in place of the configuration of FIG. 33.

Figure 39:
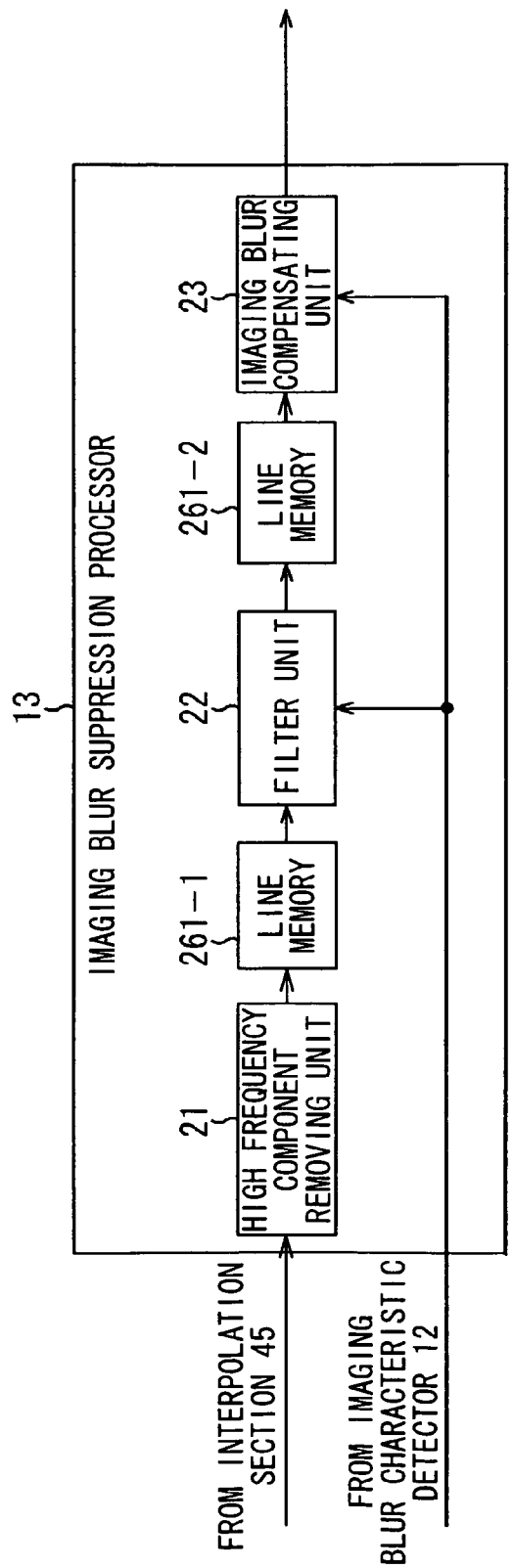
FIG. 39 A block diagram showing an example different from FIGS. 17, 32, and 33, of the functional configuration of the imaging blur suppression processor in the video signal processor of FIG. 13.
Figure 40:
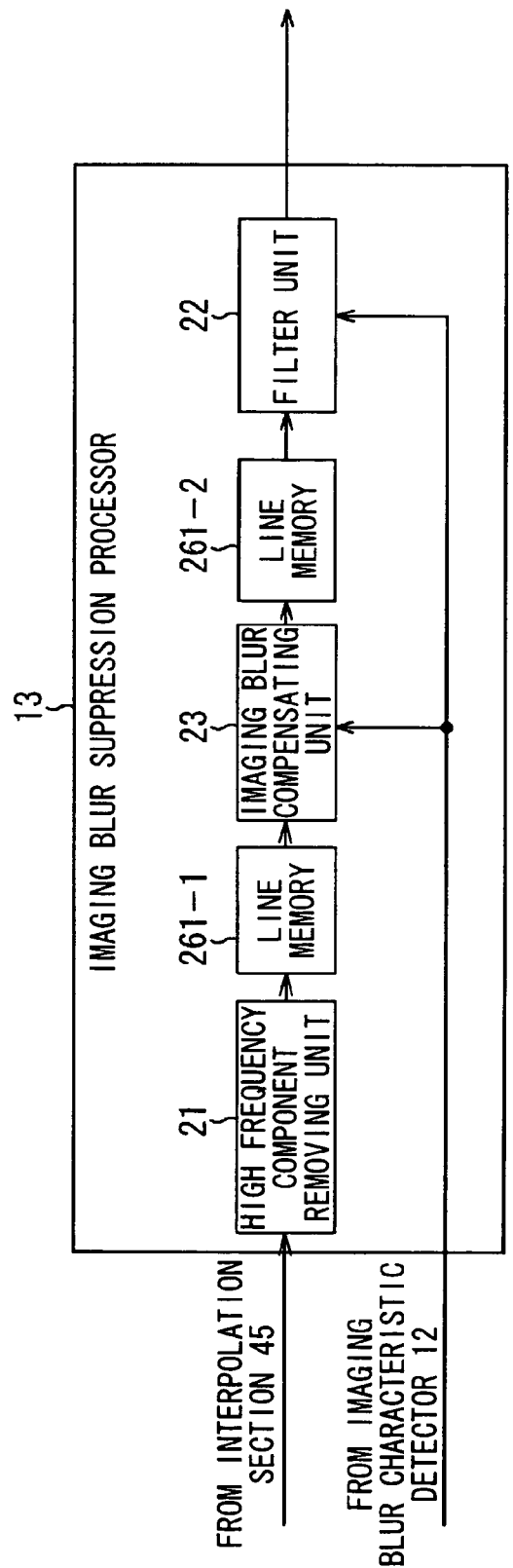
FIG. 40 A block diagram showing an example different from FIGS. 17, 32, 33, and 39, of the functional configuration of the imaging blur suppression processor in the video signal processor of FIG. 13.
Figure 41:
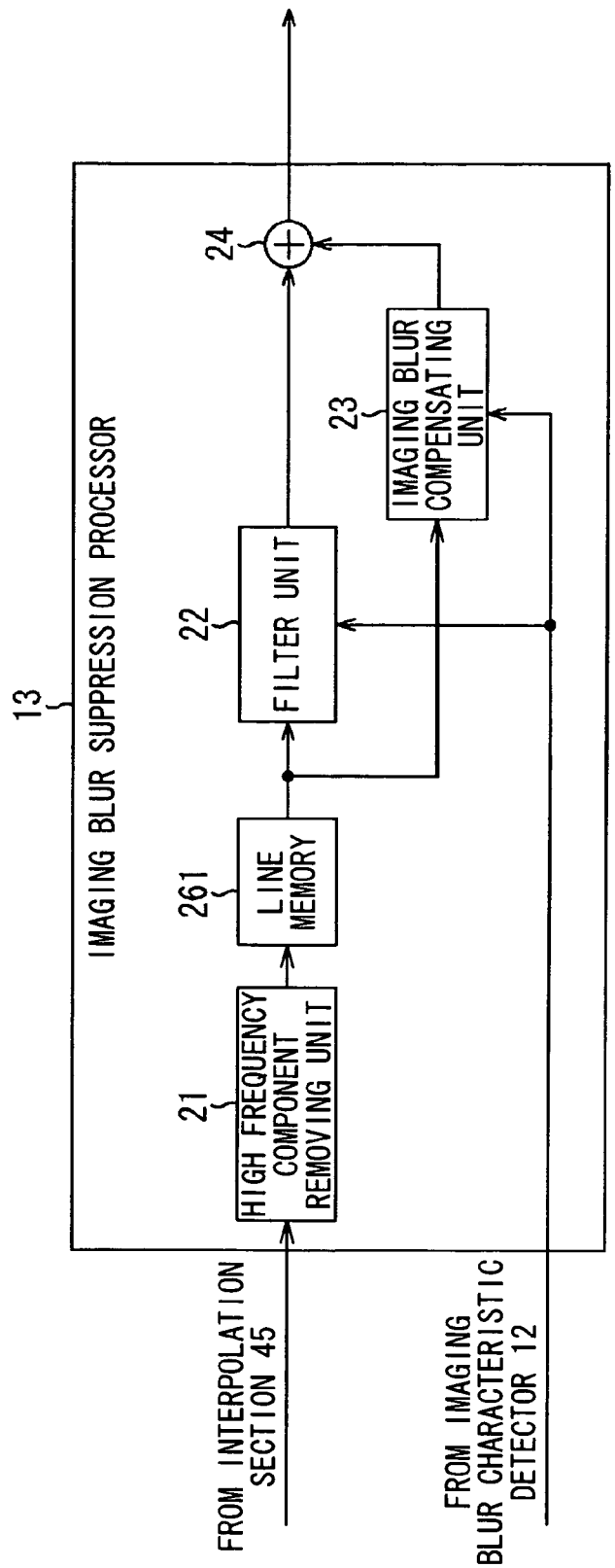
FIG. 41 A block diagram showing an example different from FIGS. 17, 32, 33, 39, and 40, of the functional configuration of the imaging blur suppression processor in the video signal processor of FIG. 13.

That is, FIGS. 39 to 41 show three examples of the functional configuration of the imaging blur suppression processor 13 to which the present invention is applied, which are different from the above-described examples.

In FIGS. 39, 40, and 41, the same reference numerals as those in FIGS. 17, 32, and 33 are designated to corresponding parts (blocks). Their description will be the same so that it will not be repeated.

In the imaging blur suppression processor 13 of FIG. 39, to enable a process in the vertical direction in the configuration of the example of FIG. 17, a line memory 261-1 is further provided at the preceding stage of the filter unit 22, and a line memory 261-2 is provided at the preceding stage of the imaging blur compensating unit 23.

Similarly, in the imaging blur suppression processor 13 of FIG. 40, to enable a process in the vertical direction in the configuration of the example of FIG. 32, the line memory 261-1 is further provided at the preceding stage of the imaging blur compensating unit 23, and the line memory 261-2 is provided at the preceding stage of the filter unit 22.

On the other hand, in the imaging blur suppression processor 13 in the example of FIG. 41, to enable a process in the vertical direction in the configuration of the example of FIG. 33, only one common line memory 261 is further provided at the preceding stage of the imaging blur compensating unit 23 and the filter unit 22.

As described above, by employing the imaging blur suppression processor 13 in the example of FIG. 41, as compared with the case employing the configuration example of FIG. 39 or 40, the number of line memories can be reduced without deteriorating the effect of the image blur suppression. That is, by employing the configuration of the example of FIG. 41 as the configuration of the imaging blur suppression processor 13, as compared with the case employing the configuration of the example of FIG. 39 or 40, the circuit scale of the imaging blur suppression processor 13 can be reduced and, moreover, the circuit scale of the video signal processor 4B of FIG. 13 can be reduced.

Figure 42:
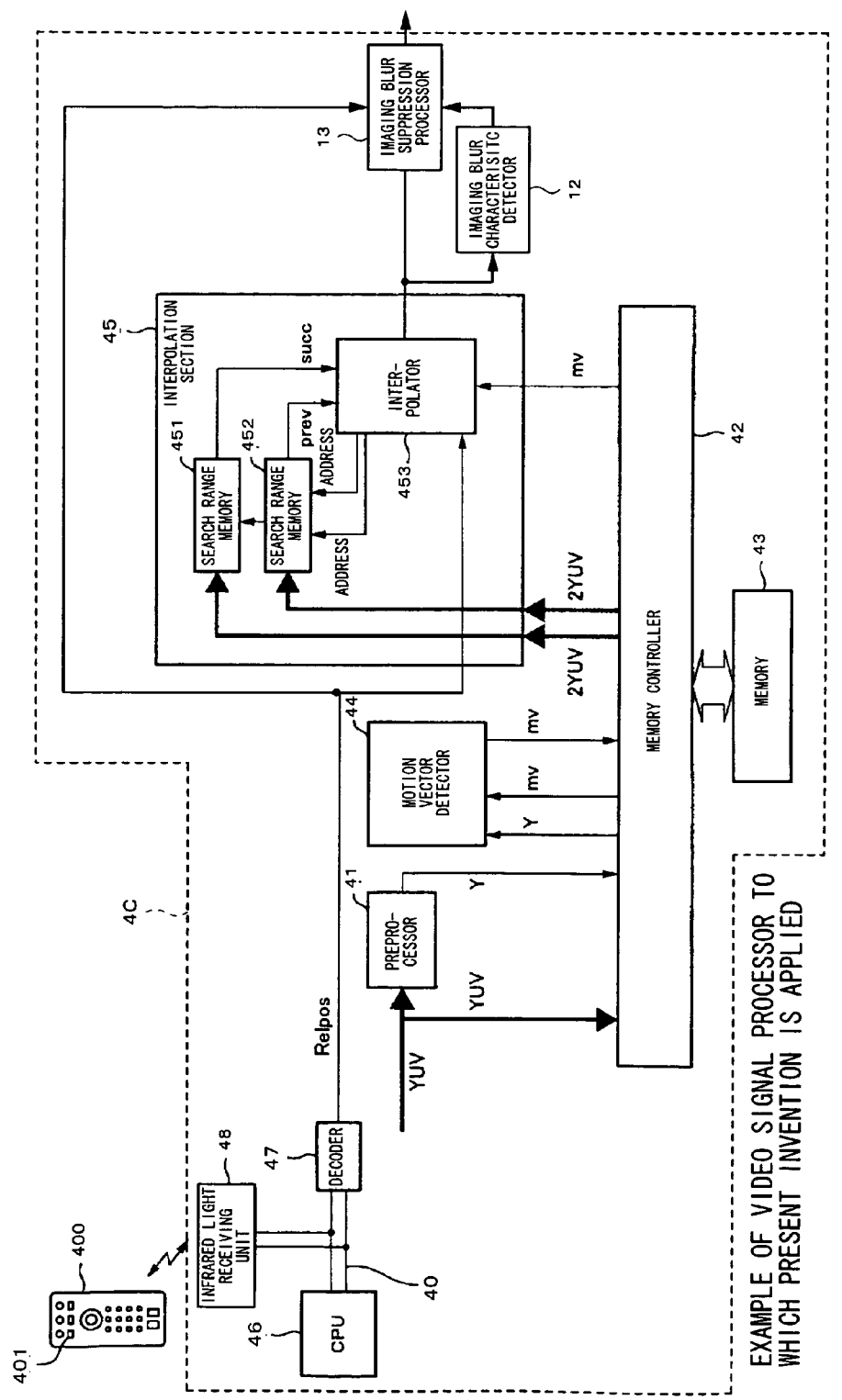
FIG. 42 A block diagram showing the configuration of a video signal processor according to a modified example of the second embodiment.

In addition, in the embodiment, for example, like in a video signal processor 4C shown in FIG. 42, an interpolation position parameter Relpos output from the decoder 47 may be supplied not only to the interpolator 453 but also to the imaging blur suppression processor 13. In such a configuration, the imaging blur suppression processor 13 can change the degree in the imaging blur suppression process in accordance with the distance of the interpolation position to a video image of an original frame in each of interpolation frames, which is set by the interpolation section 45. Therefore, the degree of reducing the imaging blur can be changed according to non-uniformity of arrangement of interpolation frames (strength of a judder). By finely adjusting the degree of suppression of a hold blur in a display image and the degree of suppression of an imaging blur, the picture quality at the time of watching a movie or the like can be improved.

In the high frame rate converting process executed in the various embodiments, the combination of the first frame rate (frame frequency) of an input video signal and the second frame rate (frame frequency) of an output video signal is not limited but may be an arbitrary combination. Concretely, for example, 60 (or 30) [Hz] is employed as the first frame rate of an input video signal, and 120 [Hz] can be employed as the second frame rate of an output video signal. For example, 60 (or 30) [Hz] is employed as the first frame rate of an input video signal and 240 [Hz] can be employed as the second frame rate of an output video signal. For example, 50 [Hz] corresponding to the PAL (Phase Alternation by Line) system is employed as the first frame rate of an input video signal, and 100 [Hz] or 200 [Hz] can be employed as the second frame rate of an output video signal. For example, 48 [Hz] corresponding to the telecine is employed as the first frame rate of an input video signal, and a predetermined frequency equal to or higher than 48 [Hz] can be employed as the second frame rate of an output video signal.

In addition, by performing the high frame rate converting process in the various embodiments on the input video signal conformed with an existing television system or the like, existing contents can be displayed with high grade.

[Third Embodiment]

A third embodiment of the present invention will now be described.

Figure 43:
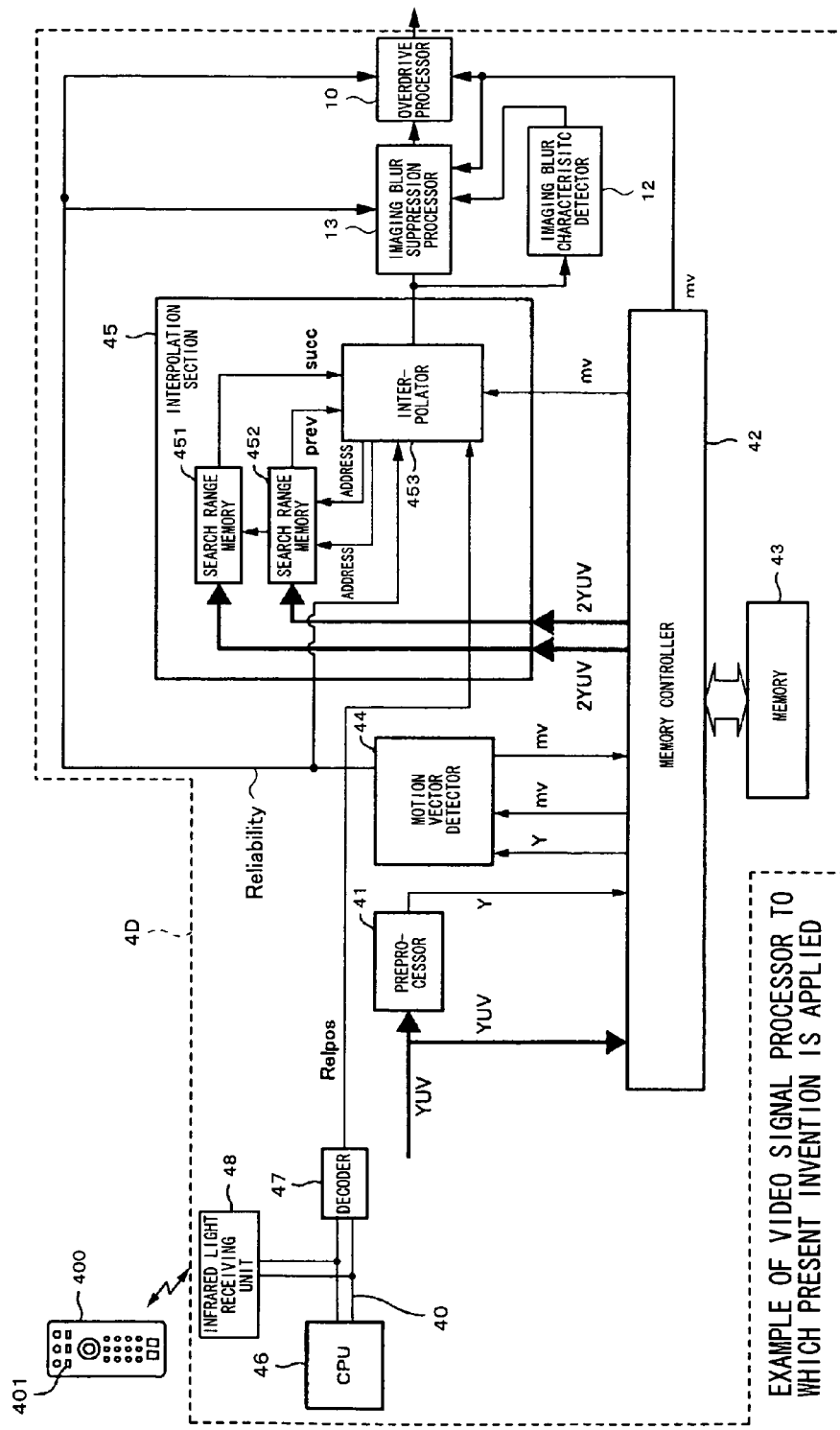
FIG. 43 A block diagram showing an example of the configuration of a video signal processor according to a modified example of a third embodiment of the invention.

FIG. 43 shows an example of the configuration of a video signal processor (video signal processor 4D) in the third embodiment. In this case, the same reference numerals are designated to the same components as those in the foregoing embodiments and their description will not be repeated.

The video signal processor 4D is obtained by further providing the video signal processor 4B described in the second embodiment with an overdrive processor 10 and performs video signal processes in the interpolation section 45, the imaging blur suppression processor 13, and the overdrive processor 10 in consideration of the reliability in detection of a motion vector mv in the motion vector detector 44. In addition, in the case of detecting a motion vector also in the imaging blur characteristic detector 12, reliability in detection of the motion vector may be considered. In the embodiment, the case where the imaging blur suppression processor 13 and the overdrive processor 10 perform a video signal process using the motion vector mv detected by the motion vector detector 44 will be described below.

The overdrive processor 10 performs an overdrive process on a video signal supplied from the imaging blur suppression processor 13 by using the motion vector mv detected by the motion vector detector 44. Concretely, the overdrive processor 10 makes the degree of the overdrive process increase as the motion vector mv increases, and makes the degree of the overdrive process decrease as the motion vector mv decreases. By such an overdrive process, a motion blur and a hold blur in a display image can be suppressed.

Figures 44, 45:
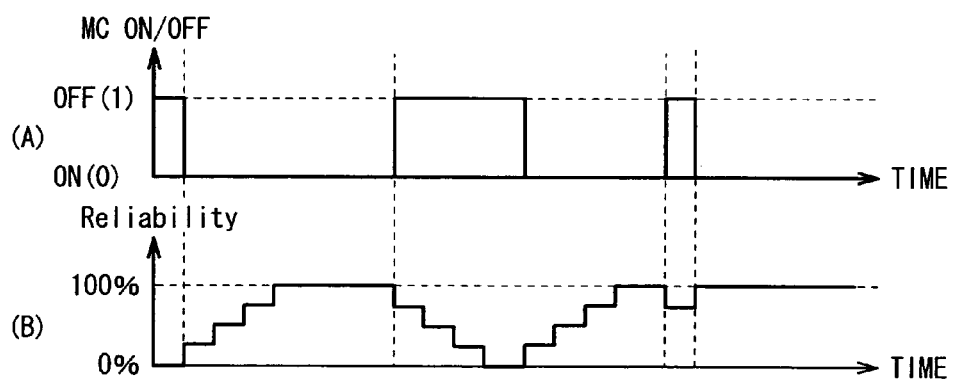
FIG. 44 A diagram showing an example of the relation between the presence/absence of detection of a motion vector and reliability.
FIG. 45 A timing waveform chart showing an example of the relation between the presence/absence of detection of a motion vector and reliability.

Here, with reference to FIGS. 45 and 46, the reliability in detection of the motion vector mv will be described in detail. FIGS. 44 and 45 show an example of the relation between the presence/absence (MC ON/OFF signal) in detection of the motion vector mv and the reliability.

In FIG. 44, in the case where the value of MC ON/OFF signal is "0" (ON; the case where the motion vector can be detected) and does not change and in the case where the value changes from "1" (OFF; the case where no motion vector can be detected such as the case where the value is out of the search range (block matching range) of the motion vector) to "0", the value of reliability increases to "P (preceding value)+Y (change amount)". On the other hand, in the case where the value of the MC ON/OFF signal changes from "0" to "1" and in the case where the value is "1" and does not change, the value of reliability decreases to "P−Y".

With the configuration, for example, as shown in FIG. 45, during a period in which the value of the MC ON/OFF signal is "0", the reliability gradually increases from 0% to 100%. On the other hand, during a period in which the value of the MC ON/OFF signal is "1", the reliability gradually decreases from 100% to 0%.

By considering the reliability in detection of the motion vector mv, in the interpolation section 45, the imaging blur suppression processor 13, and the overdrive processor 10, it is set so that the process amount of the video signal process increases as the reliability increases, and the process amount of the video signal process decreases as the reliability decreases.

Concretely, the overdrive processor 10 sets so that as the reliability increases, the degree of the overdrive process increases and, on the other hand, as the reliability decreases, the degree of the overdrive process decreases. Meanwhile, it is also possible to change the degree of the overdrive process in accordance with the distance of the interpolation position toward the video image of the closer original frame which is set in each of interpolation frames by the interpolation section 45 (to vary the degree of reduction in a motion blur and a hold blur in accordance with nonuniformity of the positions of interpolation frames (degree of a judder)), and to perform the overdrive process in consideration of the reliability as well.

Further, the imaging blur suppression processor 13 sets so that the degree of the imaging blur suppression process increases as the reliability increases and, on the other hand, the degree of the imaging blur suppression process decreases as the reliability decreases. For example, like in the video signal processor 4C shown in FIG. 42 in the second embodiment, the degree in the imaging blur suppression process may be changed in accordance with the distance of the interpolation position toward a video image of the closer original frame in interpolation frames, which is set by the interpolation section 45 (the degree of reducing the imaging blur is changed according to nonuniformity of positions of interpolation frames (strength of a judder)) and, in addition, the imaging blur suppressing process may be performed in consideration of such reliability.

Further, the interpolation section 45 changes the position of setting the interpolation position toward to a video image of the closer original frame in each of interpolation frames in consideration of reliability in detection of the motion vector mv. Thereby, nonuniformity of positions of interpolation frames (strength of a judder) can be changed in consideration of reliability in detection of the motion vector mv.

Figure 46:
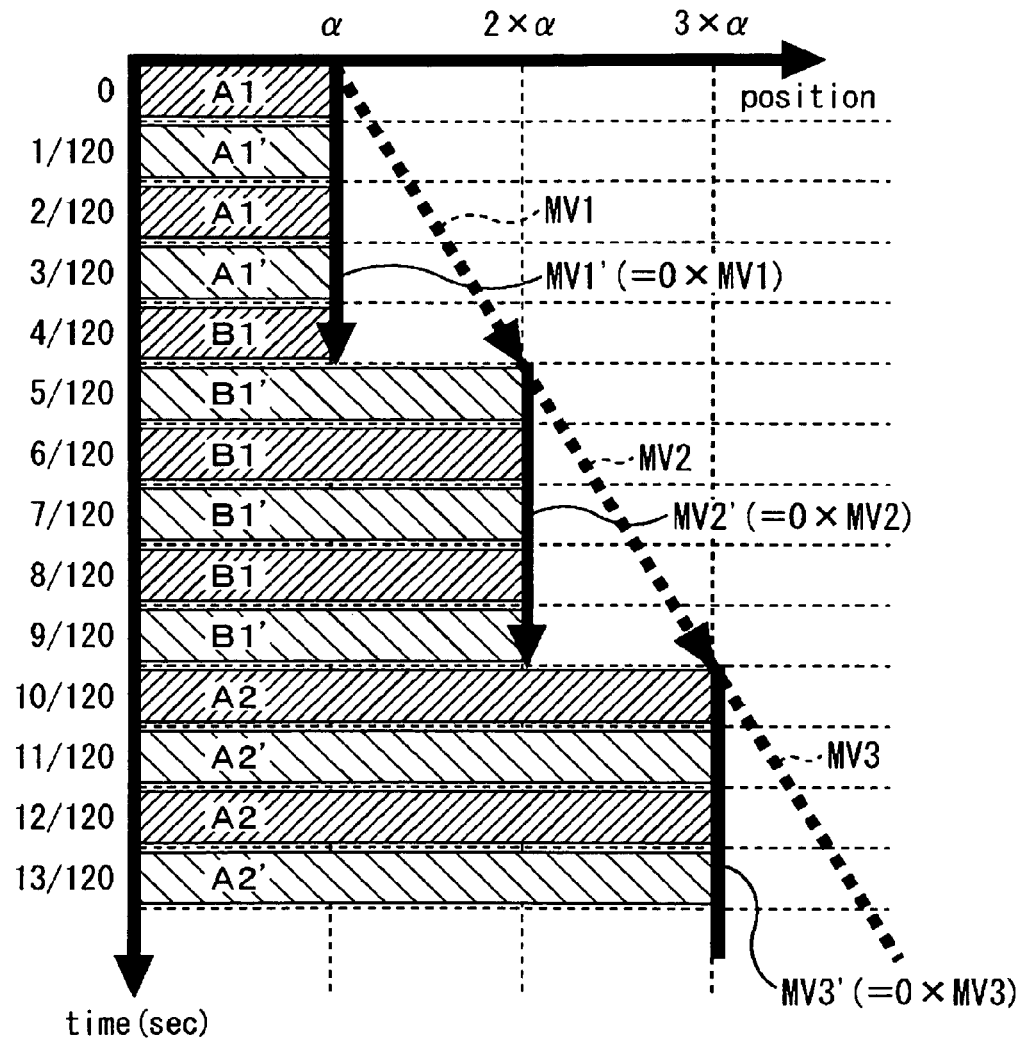
FIG. 46 A timing chart showing an example of a change in a gain multiplied with a motion vector according to reliability.
Figure 47:
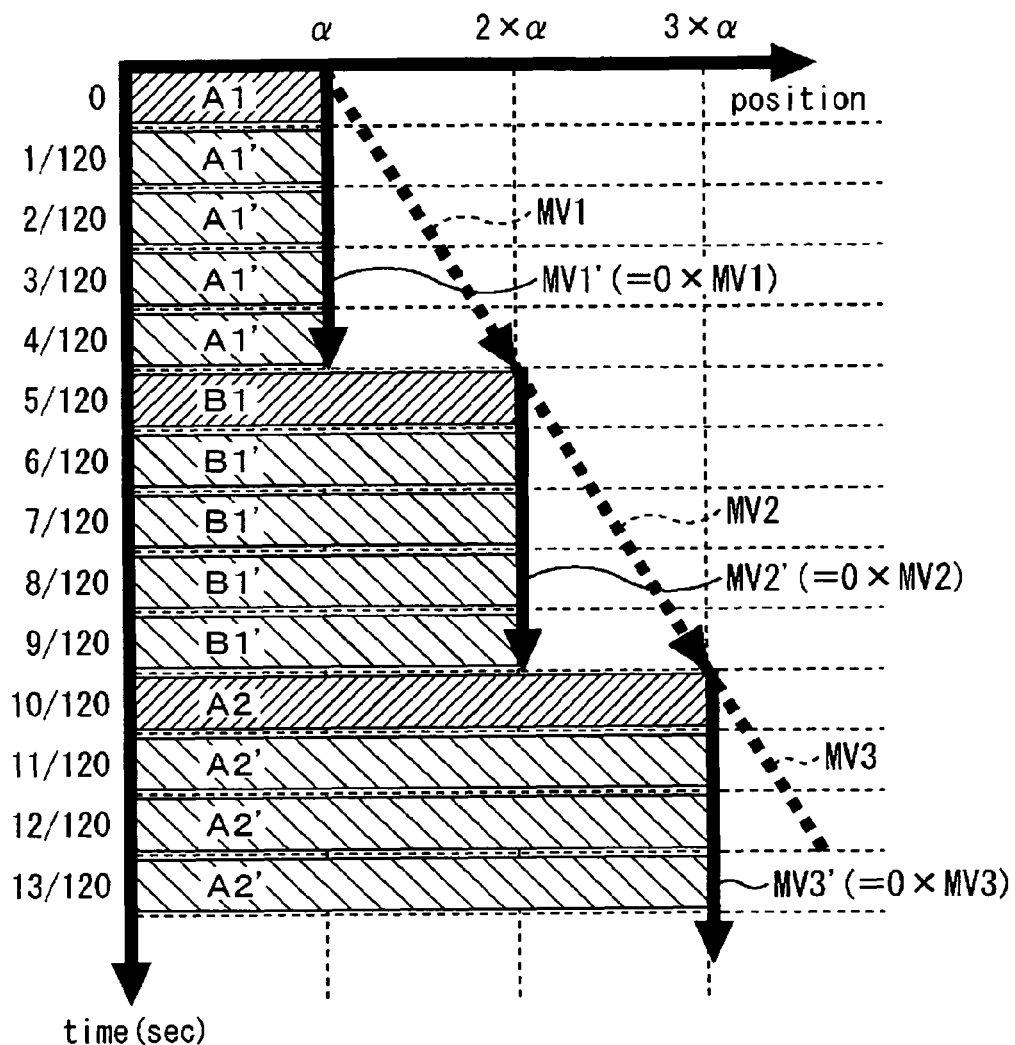
FIG. 47 A timing chart showing another example of a change in a gain multiplied with a motion vector according to reliability.

Meanwhile, in the case of converting the frame rate of a video signal by adding M interpolation frames (M is an integer of 1 or larger) obtained by interpolating video images of original frames between the original frames neighboring along the time base using motion compensation in place of the interpolation section 45, for example, a frame rate converting process in consideration of reliability may be performed as shown in FIG. 46 (in the case of a 3:2 pulldown signal) and FIG. 47 (in the case of a 24 Hz film source signal).

Concretely, it may be set so that as the reliability increases, the gain multiplied with motion vectors MV1 to MV3 at the time of frame rate conversion increases, and, on the other hand, as the reliability decreases, the gain multiplied with the motion vectors MV1 to MV3 at the time of frame rate conversion decreases.

In such a manner, in the embodiment, the video signal process in the interpolation section 45, the imaging blur suppression processor 13, and the overdrive processor 10 is performed in consideration of the reliability in detection of the motion vector mv by the motion vector detector 44. It is set so that as the reliability increases, the process amount of the video signal process increases and, on the other hand, as the reliability decreases, the process amount of the video signal process decreases. Consequently, in the case of performing the video signal process using the motion vector, even when the motion vector lies out of the motion vector search range (block matching range), the video signal process according to the detection precision of a motion vector can be performed. Therefore, at the time of performing a predetermined video signal process, deterioration in the picture quality due to the motion vector detection precision can be suppressed.

[Fourth Embodiment]

A fourth embodiment of the present invention will now be described.

Figure 48:
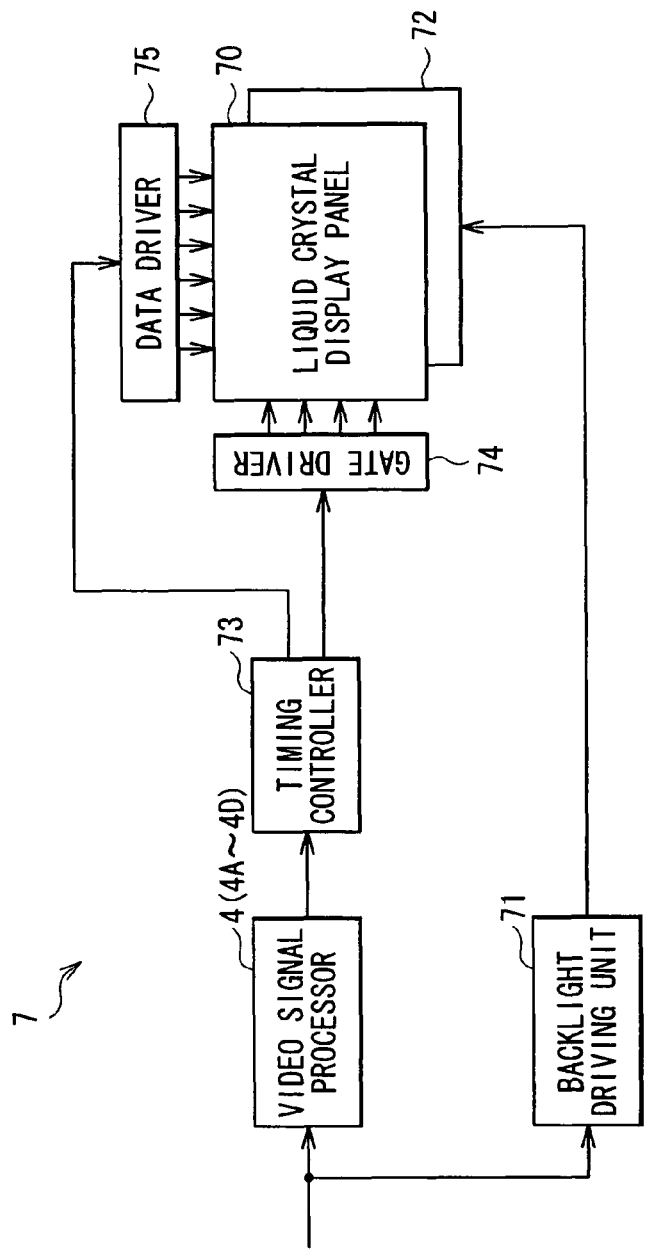
FIG. 48 A block diagram showing an example of the configuration of an image display apparatus according to a fourth embodiment of the present invention.

FIG. 48 shows an example of the configuration of an image display apparatus (a liquid crystal display 7). In this case, the same reference numerals are designated to the same components as those in the foregoing embodiments and their description will not be repeated.

The liquid crystal display 7 displays a video image on the basis of a video signal subjected to the video signal process in the video signal processor 4 (or any one of the video signal processing apparatuses 4A to 4D) described in the first to third embodiments, and is a hold-type display apparatus. Concretely, the liquid crystal display 7 has the video signal processor 4 (4A to 4D), a liquid crystal display panel 70, a backlight driving unit 71, a backlight 72, a timing controller 73, a gate driver 74, and a data driver 75.

The backlight 72 is a light source of emitting light to the liquid crystal display panel 70 and includes, for example, a CCFL (Cold Cathode Fluorescent Lamp) and an LED (Light Emitting Diode).

The liquid crystal display panel 70 modulates irradiation light from the backlight 72 on the basis of a video signal. The liquid crystal display panel 70 includes a transmission-type liquid crystal layer (not shown), a pair of substrates (a TFT substrate and an opposite electrode substrate which are not shown) sandwiching the liquid crystal layer, and polarizing plates (not shown) laminated on each of the TFT substrate and the opposite electrode substrate on the side opposite to the liquid crystal layer.

The data driver 75 supplies a drive voltage based on the video signal to each of the pixel electrodes in the liquid crystal display panel 2. The gate driver 74 line-sequentially drives the pixel electrodes in the liquid crystal display panel 2 along not-shown horizontal scan lines. The timing controller 73 controls the data driver 75 and the gate driver 74 on the basis of the video signal supplied from the video signal processor 4 (4A to 4D). The backlight driving unit 71 controls the turn/on and turn/off operation of the backlight 72 (performs turn-on driving on the backlight 72) on the basis of the video signal supplied to the video signal processor 4 (4A to 4D).

The liquid crystal display 7 of the embodiment is constructed to perform a black inserting process of inserting a black display area into a display screen of the liquid crystal display panel 2 in accordance with at least one of the video signal in an original frame and luminance of a viewing environment for user. Concretely, for example, the black inserting process is performed for inserting a black display area into the display screen in the liquid crystal display panel 2 when the video signal in the original frame is a cinema signal (film signal). More concretely, the backlight driving unit 71 switches between turn-on and turn-off of the backlight 72 so that the process of inserting the black display area on the display screen in the liquid crystal display panel 2 is performed. In addition, the backlight driving unit 71 determines, for example, whether the video signal in an original frame is a cinema signal or not by using contents information of the original frame included in an EPG (Electronic Program Guide) or on the basis of the frame rate of the original frame.

Figure 49:
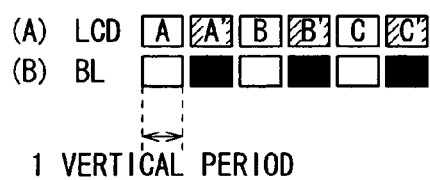
FIG. 49 A timing chart showing an example of a black inserting process (blinking process) on the frame unit basis by a backlight driving unit illustrated in FIG. 48.
Figure 50:
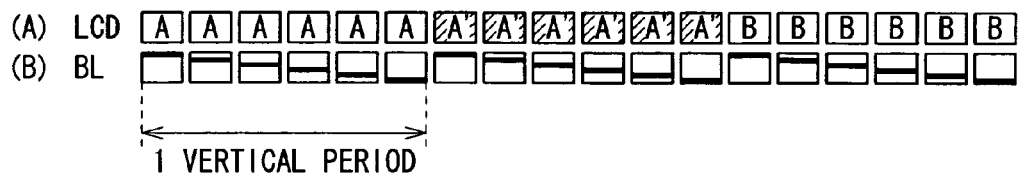
FIG. 50 A timing chart showing an example of the black inserting process (blinking process) on the black insertion line unit basis by the backlight driving unit illustrated in FIG. 48.
Figure 51:
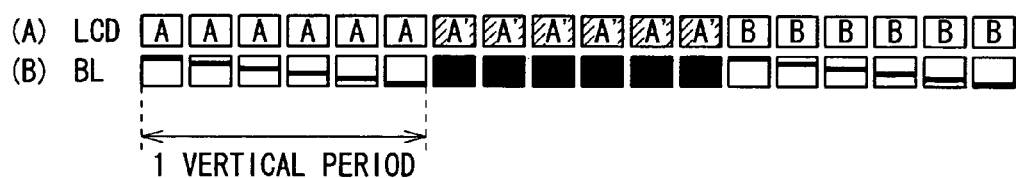
FIG. 51 A timing chart showing an example of the black inserting process (blinking process) in combination of the black insertion line unit basis and the frame unit basis by the backlight driving unit illustrated in FIG. 48.

The black inserting method is performed as follows. For example, the black inserting process is performed on the frame unit basis as shown in FIGS. 49(A) and (B). For example, the black inserting process is performed by black insertion line unit composed of a predetermined number of horizontal scan lines in the original frame as shown in FIGS. 50(A) and (B). For example, as shown in FIGS. 51(A) and (B), the black inserting process is performed by a combination of the black insertion line unit basis and the frame unit basis. In each of FIGS. 49 to 51 (and FIGS. 52 to 55), (A) shows the substance of the video image (original frames A to C and interpolation frames A' to C') in the liquid crystal display panel 2 (LCD), and (B) shows the light-on state of the backlight 72. The horizontal axis in the diagram denotes time.

In the case of the black inserting process on the frame unit basis shown in FIG. 49, an entire frame is lighted on or off, so that the hold improvement effect increases. In the case of the black inserting process on the black insertion line unit basis shown in FIG. 50, display luminance can be adjusted by setting a black insertion ratio which will be described later, and the frame rate increases falsely. Consequently, as compared with the case of the frame unit basis, flicker is less visible. In the case of the combination of the frame unit and the black insertion line unit shown in FIG. 51, moving image response becomes the highest.

In addition, in the case including the black inserting process on the black insertion line unit basis as shown in FIGS. 50 and 51, the black inserting process may be performed by a plurality of black insertion lines away from each other. In such a configuration, adjustment of the black insertion ratio and display luminance which will be described below is facilitated.

Further, for example, as shown in FIGS. 52 to 55, when performing the black inserting process, the backlight driving unit 71 may perform switching drive so that an areal ratio of a black display area in an entire display screen (=black insertion ratio) can be varied by changing the thickness of a black insertion line (the number of horizontal scan lines constructing a black insertion line). In such a configuration, the effect of reducing a hold blur is produced and the display luminance can be adjusted.

Further, the backlight driving unit 71 may perform the switching drive so that the luminance of the black display region is variable when performing the black inserting process. In such a configuration, while reducing a hold blur, the display luminance can be adjusted. Both of the black insertion ratio and luminance of the black display area may be variable.

In addition, in the case of making at least one of the black insertion ratio and the luminance of the black display region variable, the black insertion ratio and the luminance of the black display region may be changed in multiple stages or changed continuously. In the case of making such changes, reduction in the hold blur and adjustment of the display luminance is facilitated.

In such a manner, in the embodiment, the black inserting process of inserting a black display area into a display screen in the liquid crystal panel 2 is performed in accordance with the substance of the video signal in an original frame and brightness of the viewing environment for user. Thus, a hold blur can be reduced according to the circumstances.

Figure 56:
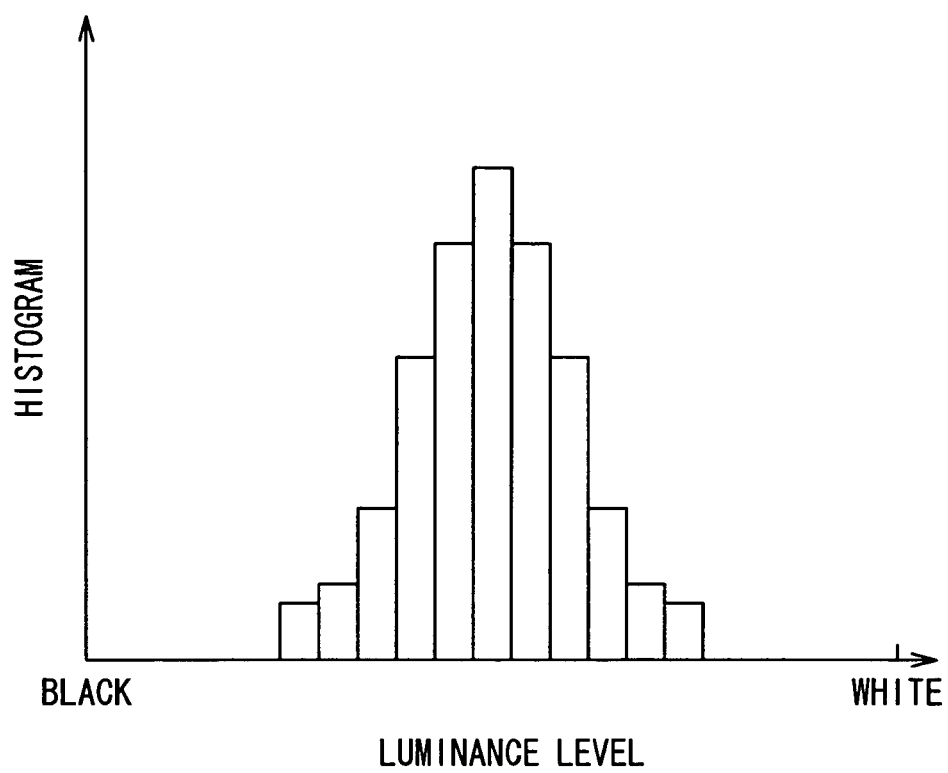
FIG. 56 A characteristic diagram showing an example of a luminance histogram distribution of an entire screen.

In addition, for example, as shown in FIG. 56, according to a luminance histogram distribution in an original frame, whether the black inserting process is performed or not may be determined and the black insertion ratio and the luminance of the black display area may be changed. In such a configuration, there is a case such that decrease in the display luminance is not conspicuous, for example, in a dark image. In such a case, the adjustment of placing priority on the effect of reducing a hold blur can be performed by determining that the black inserting process is performed or increasing the black insertion ratio or decreasing the luminance of the black display area.

Further, according to the magnitude of a motion vector in an original frame detected by the motion vector detector 44 or the like, the black insertion ratio and the luminance of the black display area may be changed. In such a configuration, for example, adjustment such as suppression of a judder can be performed by increasing the black insertion ratio or decreasing luminance of the black display area in the case such that, for example, motion of a video image is large.

Figure 57:
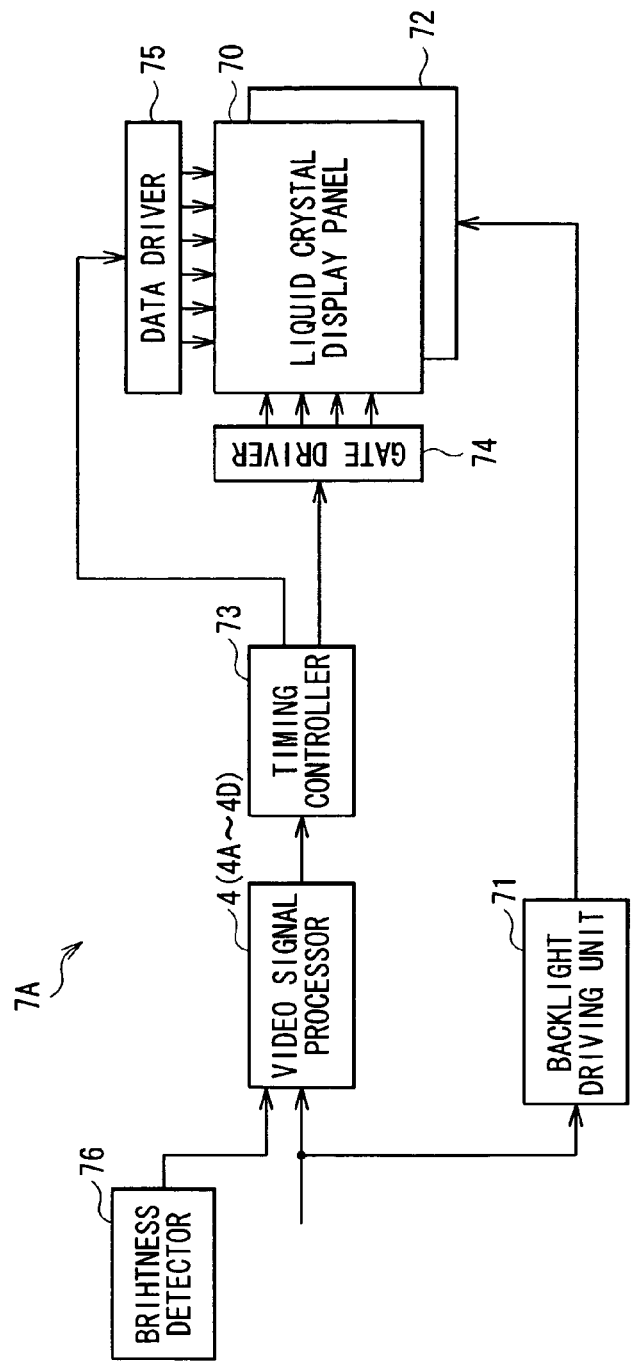
FIG. 57 A block diagram showing an example of the configuration of an image display apparatus according to a modified example of the fourth embodiment.

Further, for example, like in the liquid crystal display 7A shown in FIG. 57, by providing a brightness detector 76 for detecting brightness of the user's viewing environment (constructed by, for example, an illuminance sensor) or the like, whether the black inserting process is performed or not may be determined or the black insertion ratio and the illuminance of the black display area may be changed according to the detected brightness of the user's viewing environment. In such a configuration, there is a case such that decrease in the display luminance is not conspicuous depending on the brightness of the viewing environment (for example, in the case where the viewing environment is dark). In such a case, the adjustment of placing priority on the effect of reducing a hold blur can be performed by determining that the black inserting process is performed or increasing the black insertion ratio or decreasing the luminance of the black display area.

In addition, in the case of providing the brightness detector 76, according to the detected brightness of the user's viewing environment, for example, the degree of the imaging blur suppressing process by the imaging blur suppression processor 13 and degree of setting the interpolation position nearer to a video image of a closer original frame in each of the interpolation frames by the interpolation section 45 may be changed. In the case of changing the degree of the imaging blur suppressing process by the imaging blur suppression processor 13, there is a case that an imaging blur is not conspicuous depending on the brightness of the viewing environment (for example, in the case where the viewing environment is a dark state). In such a case, the adjustment of decreasing the degree of the imaging blur suppressing process can be performed. In the case of changing the degree of setting the interpolation position nearer to a video image of a closer original frame by the interpolation section 45, when a judder is not conspicuous depending on the brightness of the viewing environment (for example, in the case where the viewing environment is a dark state), by setting the interpolation position nearer to the original frame, judder feeling remains. In such a manner, for example, adjustment of creating realism peculiar to a movie is realized.

Furthermore, the embodiment has been described by the case where the hold-type image display apparatus is a liquid crystal display and the black inserting process (blinking process) is performed by the switch driving of the backlight driving unit 71. However, for example, in the case where image display apparatus is a light-emitting display apparatus other than a liquid crystal display (such as an organic EL display apparatus), the black inserting process may be performed by providing a black inserting processor (not shown) for performing a black inserting process on a video signal of an original frame in the video signal processor, and performing the video signal process by the black inserting processor.

Meanwhile, in the embodiment, whether the black inserting process can be executed or not, a change in the black insertion ratio, a change in illuminance in the black display area, and the like may be set by an operation of the user by providing, for example, predetermined operation means (setting means).

Further, the video signal processor in the embodiment is not limited to the video signal processor 4 (or any one of the video signal processors 4A to 4D) described in the first to third embodiments. Another video signal processor may be employed as long as it performs a predetermined video signal process on a plurality of original frames along the time base.

Further, the series of processes (or a part of the processes) described in the first to fourth embodiments can be executed by hardware or software.

Figure 58:
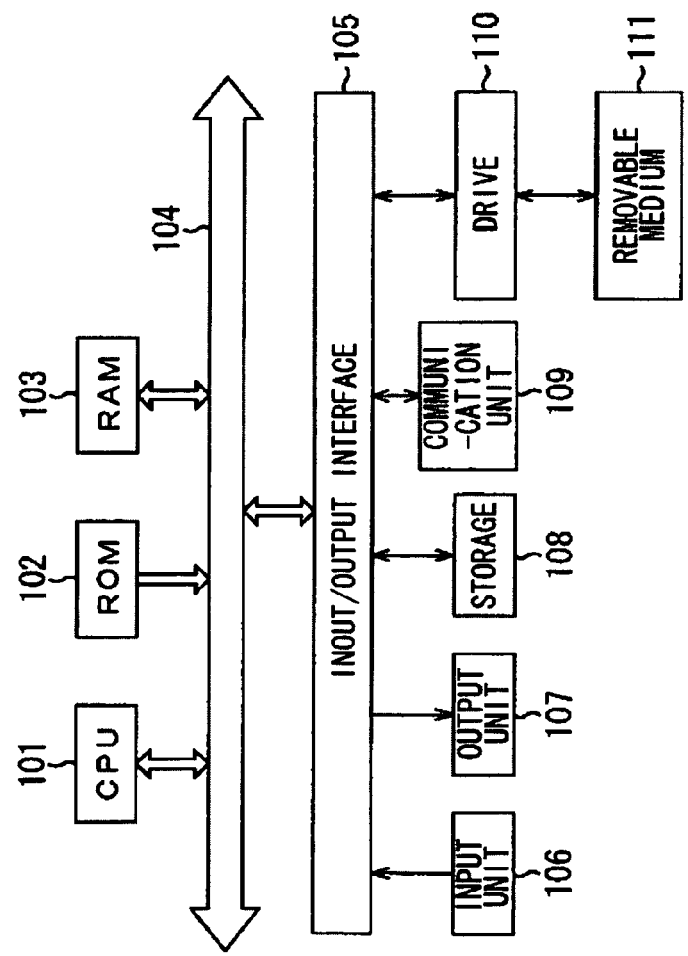
FIG. 58 A block diagram showing an example of a hardware configuration of all or part of a video signal processor to which the present invention is applied.

In this case, all of the video signal processors 4 and 4A to 4D, the backlight driving unit 71, and the timing controller 73 or a part of them (for example, the imaging blur suppression processor 13 or the like) can be constructed by, for example, a computer as shown in FIG. 58.

In FIG. 58, a CPU (Central Processing Unit) 301 executes various processes in accordance with a program recorded on a ROM (Read Only Memory) 302, or a program loaded from a storage 308 to a RAM (Random Access memory) 303. In the RAM 303, data necessary for the CPU 301 to execute various processes is also properly stored.

The CPU 301, ROM 302, and RAM 303 are connected to each other via a bus 304. To the bus 304, an input/output interface 305 is also connected.

To the input/output interface 305, an input unit 306 including a keyboard, a mouse, and the like, an output unit 307 such as a display, a storage 308 constructed by a hard disk or the like, and a communication unit 309 including a modem, a terminal adapter, and the like are connected. The communication unit 309 performs communication process with other devices via networks including the Internet.

As necessary, a drive 310 is connected to the input/output interface 305. A removable recording medium 311 such as a magnetic disk, an optical disk, a magneto-optic disk, or a semiconductor memory is properly inserted to the drive 310. A computer program read from the removable recording medium 311 is installed in the storage 308 as necessary.

In the case of executing a series of processes by software, a program constructing the software is installed from a network or a recording medium to, for example, a computer assembled in dedicated hardware or a general personal computer or the like capable of executing various functions by installing various programs.

The recording medium including such a program is not limited to the removable recording medium (package medium) 211 such as a magnetic disk (including a floppy disk), an optical disk (including a CD-ROM (Compact Disk-Read Only memory) and a DVD (Digital Versatile Disk)), a magneto-optic disk (including an MD (Mini-Disk)), or a semiconductor memory. It may be the ROM 302 in which a program is recorded, a hard disk included in the storage 308, or the like which is provided to the user in a state where it is pre-assembled in an apparatus body.

Meanwhile, in the specification, the steps describing a program to be recorded on a recording medium include, obviously, not only processes performed in time series in the order, but also processes which are not necessarily performed in time series but are executed in parallel or individually.

Further, as described above, in the specification, the term system refers to an entire apparatus constructed by a plurality of processing apparatuses and processors.

Further, the configurations and the like described in the foregoing embodiments and modified examples are not limited to the above-described combinations but can be arbitrarily combined.

The invention claimed is:

1. An image display apparatus characterized by comprising:
   interpolation position setting means for converting frame rate of a video signal by adding multiple interpolation frames between first and second original frames neighboring each other along a time base of the video signal, the multiple interpolation frames being obtained from video images in the first and second original frames by using motion compensation, the interpolation position setting means using a motion detection vector and an interpolation position parameter to generate each of the multiple interpolation frames, the interpolation position setting means being configured to receive an interpolation position adjustment indicator in response to user input so that interpolation positions of the video images in the multiple interpolation frames are set to a deviated position which is closer to the nearest video image in either the first or second original frame rather than interpolation positions equally spaced between the first and second original frames along the time base; and display means for displaying a video image on the basis of video signals in the first and second original frames and video signals in the multiple interpolation frames in which the interpolation positions of the video images are set by the interpolation position setting means.

2. The image display apparatus according to claim 1, characterized in that the interpolation position setting means comprises:

operating means for selecting an interpolation position of a video image in each of the multiple interpolation frames from two or more positions including the position closer to the nearest video image in the original frames; and control means for setting the interpolation position selected by the operating means as an interpolation position of the video image in each of the multiple interpolation frames.

3. The image display apparatus according to claim 2, characterized in that the operating means is means for switchably selecting the interpolation position of the video image in each of the multiple interpolation frames from a plurality of positions including the deviated position.

4. The image display apparatus according to claim 2, characterized in that the operating means is means for selecting the interpolation position of the video image in each of the multiple interpolation frames so that the interpolation position may be successively changed within a predetermined range including the deviated position.

5. The image display apparatus according to claim 1, characterized in that the interpolation position setting means converts frame rate of a video signal which is telecine-converted from a film to a television system.

6. A video signal processor, comprising:

interpolation position setting means for converting frame rate of a video signal by adding multiple interpolation frames between first and second original frames neighboring each other along a time base of the video signal, the multiple interpolation frames being obtained from video images in the first and second original frames by using motion compensation, the interpolation position setting means using a motion detection vector and an interpolation position parameter to generate each of the multiple interpolation frames, the interpolation position setting means being configured to receive an interpolation position adjustment indicator in response to user input so that interpolation positions of the video images in the multiple interpolation frames are set to a deviated position which is closer to the nearest video image in either the first or second original frame rather than interpolation positions equally spaced between the first and second original frames along the time base.

7. A video signal processing method, comprising:

receiving an interpolation position adjustment indicator in response to user input; and converting a frame rate of a video signal by adding multiple interpolation frames in between first and second original frames neighboring each other along time base, the multiple interpolation frames being obtained from video images in the first and second original frames by using motion compensation, wherein the conversion uses a motion detection vector and an interpolation position parameter to generate each of the multiple interpolation frames, wherein interpolation positions of the video images in the multiple interpolation frames are set to a deviated position, based on the received interpolation position adjustment indicator, which is closer to the nearest video image in either the first or second original frame rather than interpolation positions equally spaced between the first and second original frames along the time base.

* * * * *